United States Patent [19]
Timm et al.

[11] Patent Number: 6,055,268
[45] Date of Patent: *Apr. 25, 2000

[54] MULTIMODE DIGITAL MODEM

[75] Inventors: William C. Timm, McKinney; Walter Y. Chen, Plano; Gene A. Frantz, Missouri City; Domingo G. Garcia, Plano; Xiaolin Lu, Dallas; Dennis G. Mannering; Michael O. Polley, both of Garland; Terence J. Riley, Rockwall; Donald P. Shaver; Song Wu, both of Dallas; Alan Gatherer, Richardson; Paul E. Schurr, Plano; Douglas B. Weiner, The Colony, all of Tex.

[73] Assignee: Texas Instruments Incorporated, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/667,267

[22] Filed: Jun. 20, 1996

Related U.S. Application Data

[63] Continuation-in-part of application No. 08/645,020, May 9, 1996.

[51] Int. Cl.⁷ .............................. H03H 7/30; H03H 7/40; H03K 5/159
[52] U.S. Cl. ........................................... 375/229; 375/231
[58] Field of Search .................................. 375/229, 231, 375/295, 296; 455/68, 69

[56] References Cited

U.S. PATENT DOCUMENTS

| | | | |
|---|---|---|---|
| Re. 31,253 | 5/1983 | Weinstein | 179/170.2 |
| 4,087,654 | 5/1978 | Mueller | 179/170 |
| 4,247,940 | 1/1981 | Mueller et al. | 375/14 |
| 4,464,545 | 8/1984 | Werner | 179/170 |

(List continued on next page.)

OTHER PUBLICATIONS

Crespo, P., et al., *Pole–Zero Decision Feedback Equalization for the Digital Subscriber Loop* Globecom '90, IEEE Global Telecomm. Conf. & Exhibit, San Diego, CA, Dec. 2–5, 1990, "Communications: Connecting the Future"; CH2827–4/90/0000–11666, 1990 IEEE, pp. 1166–1171.

Sistanizadeh, K., *Analysis and Performance Evaluation Studies of High Bit Rate Digital Subscriber Lines (HDSL) Using QAM and PAM Schemes With Ideal Decision Feedback Equalization (DFE) Within a Carrier Serving Area (CSA)*, Globecom '90, IEEE Global Telecomm. Conf. & Exhibit, San Diego, CA, Dec. 2–5, 1990, "Communications: Connecting the Future"; CH2827–4/90/0000–1172, 1990 IEEE.

(List continued on next page.)

*Primary Examiner*—Stephen Chin
*Assistant Examiner*—Mohammad Ghayour
*Attorney, Agent, or Firm*—Warren L. Franz; C. Alan McClure; Richard L. Donaldson

[57] ABSTRACT

A modem communication system with receiving and transmission paths includes a direct equalizer system having an adaptive filter (1532) in the transmission path to compensate for frequency distortion of the communication channel. The transmitter filter coefficients are adapted by a filter coefficient calculator (1528), under control of a data detector (1526) which detects incoming data in the receiving path. A switch (1534) is controlled by status of a transmit output data buffer to multiplex either the training sequence or output data into the transmission path. When the buffer is idle, the training sequence generator (1540) is linked to a digital-to-analog (D/A) converter (1536) and line driver (1538). The receiving path includes an isolation switch (1520), a receiver amplifier (1522) and a slicer (1524). The receiver correlates the received training sequence with a known training sequence and updates the equalizer filter coefficients using an adaptation algorithm, such as a least mean squared algorithm. A first embodiment utilizes a high speed digital programmable filter (1532). Another embodiment utilizes a data buffer (1533) which is periodically filled with data filtered by a digital signal processor (DSP).

4 Claims, 41 Drawing Sheets

U.S. PATENT DOCUMENTS

| | | | |
|---|---|---|---|
| 4,489,416 | 12/1984 | Stuart | 375/13 |
| 4,682,358 | 7/1987 | Werner | 379/411 |
| 4,800,573 | 1/1989 | Cupo | 375/14 |
| 4,924,492 | 5/1990 | Gitlin et al. | 379/93 |
| 5,008,903 | 4/1991 | Betts et al. | 375/60 |
| 5,052,000 | 9/1991 | Wang et al. | 371/43 |
| 5,251,328 | 10/1993 | Shaw | 455/73 |
| 5,285,474 | 2/1994 | Chow et al. | 375/13 |
| 5,317,596 | 5/1994 | Ho et al. | 375/14 |
| 5,400,322 | 3/1995 | Hunt et al. | 370/19 |
| 5,436,930 | 7/1995 | Brewer et al. | 375/295 |
| 5,461,640 | 10/1995 | Gatherer | 375/231 |
| 5,479,447 | 12/1995 | Chow et al. | 375/260 |
| 5,509,028 | 4/1996 | Marque-Pucheu | 375/211 |
| 5,574,990 | 11/1996 | Flanagan | 455/115 |
| 5,579,535 | 11/1996 | Orlen et al. | 455/33.1 |
| 5,710,792 | 1/1998 | Fukawa et al. | 375/229 |
| 5,710,981 | 1/1998 | Kim et al. | 455/69 |

OTHER PUBLICATIONS

Veeneman, D., et al., *ADSL for Video and Data Service*, ICC '95 Seattle, WA, Communications—Gateway to Globalization, 1995 IEEE Int'l Conf. on Comm., Jun. 18–22, 1995; 0–7803–2486–2/95, 1995 IEEE.

Cook, John, *Splitter for VDSL*, T1E1.4 Contribution, American Nat'l Standards Institute Telecommunications Committee (ANSI/T1), Jan. 22–25, 1996, Irvine, CA Meeting, 10 pages.

Honig, M.L., et al., *Suppression of Near– and Far–End Crosstalk by Linear Pre– and Post–Filtering*, IEEE Journal on Selection Areas in Comm., vol. 10, No. 3, Apr. 1992, pp. 614–629.

Cioffi, J.M., et al., *Detailed DMT Transmitter Description for ADSL*, ANSI T1E1.4 Committee Contribution No. 93–084, Chicago, Apr. 1993, pgs.

Cioffi, J.M., et al., *DMT Specification Overview for ADSL*, ANSI T1E1.4 Committee Contribution No. 93–083, Chicago, Apr. 1993, pgs.

Chow, J.S., *Finite–Length Equalization for Multi–Carrier Transmission Systems*, Ph.D. Dissertation, Stanford University, California, Jun. 1992.

Chow, J.S., et al., *Equalizer Training Algorithms for Multicarrier Modulation Systems*, 1993 Int'l Conf. on Communications, Geneva, May 1993, pp. 761–765.

Chow, J.S., et al., *Recommended Training Sequence for Time–domain Equalizers (TQE) With DMT*, ANSI T1E1.4 Committee Contribution No. 93–968, pgs.

The Applied Technologies Group, AT&T Paradyne, *ADSL, SDSL, HDSL, Copper Phone Line Technologies for Multimedia*, Pocket Guide, One Apple Hill, #316, Natick, MA 01760 pp. 1–41.

AT&T Paradyne, News Release, *Bell Atlantic Supports AT&T Paradyne's GlobeSpan™ Technology*, Largo, Florida, Nov. 1, 1995, 34 pages.

Maxwell, Kim, *Study Project: ADSL Issue II—Variable Rate ADSL*, Independent Editions, Apr. 22, 1996, 1057 University Ave., Palo Alto, CA 94301, T1E1.4/95–129, 2 pages.

Starr, Tom, *Project: ADSL—Rate Adaptive DSL*, Apr. 22, 1996, Colorado Springs, Ameritech, 2000 W. Ameritech Drive, Rm. 3C52, Hoffman Estates, IL 60196, pp. 1–5.

Keyes, Philip J., *ADSL Standard Project—Proposal for Annex to ADSL Standard*, Apr. 22, 1996, Col. Springs, CO, Bell South Telcomm., 3535 Colonnade Pkwy, Rm W1D1, Birmingham, AL 35243, 3 pgs.

Cook, John, *Telephony Transmission and Splitters, Passive and Active*, T1E1.4 Contribution, American Nat'l Standards Institute Telecomm. Comm. (ANSI/T1), Feb. 14–18, 1994 San Francisco Mtg, 14 pages.

Cioffi, J.M., et al., *Project: T1E1.4: ADSL—Rate Adaptation and the ANSI T1.413 DMT ADSL Data Rate Throttle*, Amati Comm. Corp., 1975 Mountain View, CA 94040, pp. 1–10.

Scholtz, W.H., et al., *Study Project: HDSL Study Project—Variable Bit Rate ADSL Using Carrierless AM/PM (CAP)*, Lucent Technologies, 101 Crawfords Corner Rd., Rm. 4L–322, Holmdel, NJ 07733–3030, pp. 1–4.

Lechleider, J.W., *The Capacity of Next–Impaired Subscriber Loops*, Bellcore, Globecom '90, IEEE Global Telecomm. Conf. & Exhibit, San Diego, CA, Dec. 2–5, 1990, "Communications: Connecting the Future"; CH2827–4/90/0000, 1990 IEEE.

ADSL Forum WWW Site, Dec., 1995: *About the ADSL Forum*, 8 pages.

ADSL Forum WWW Site, Dec., 1995: *ADSL—Twisted Pair Access to the Information Highway*, 4 pages.

ADSL Forum WWW Site, Dec., 1995: *VDSL—Fiber–Copper Access to the Information Highway*, 7 pages.

ADSL Forum WWW Site, Dec., 1995: *A Tutorial Glossary of Copper Access Transmission Terminology*, 10 pages.

ADSL Forum WWW Site, Dec., 1995: *The World is Already Wired for Multimedia Communications*, 2 pages.

ADSL Forum WWW Site, Dec., 1995: *Working Text: Interfaces and System Configurations for ADSL: Bit Synchronous Mode*, 15 pages.

ADSL Forum WWW Site, Dec., 1995: Daly, Tom (editor), *Study Project: Packet Mode Technical Group Working Text*, 12 pages.

Integrated Circuit Engineering Corporation, A Study of the MPU, MCU & DSP Markets, *Digital Signal Processors, Microprocessor 1996*, Editor: Bill McClean, Author: Jack Quinn, Scottsdale, AZ, pp. 12–19 to 12–33.

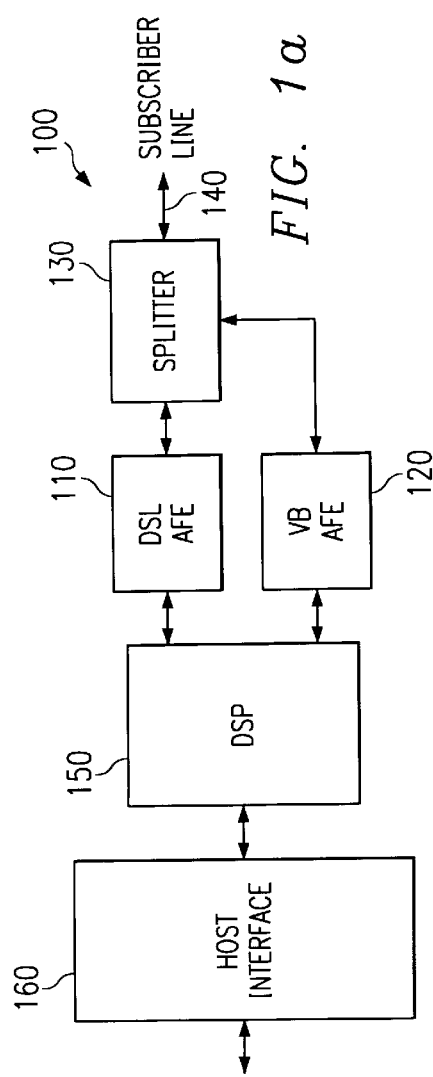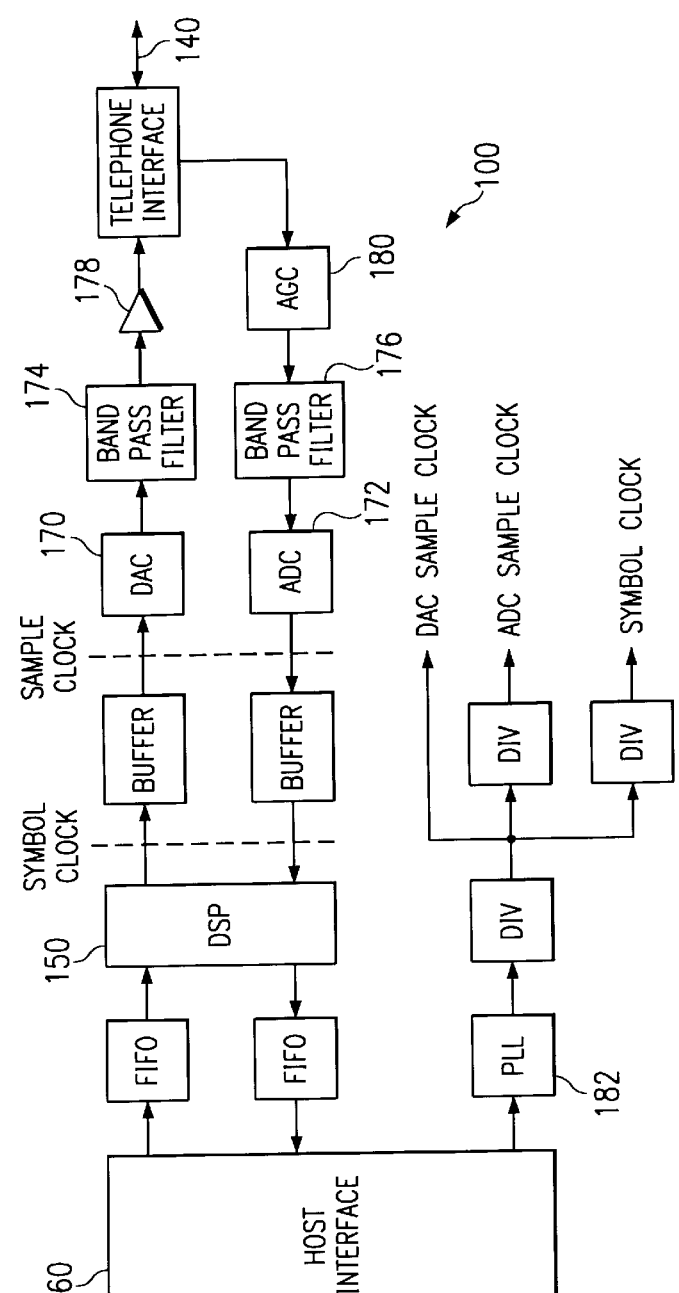
FIG. 1a
FIG. 1b

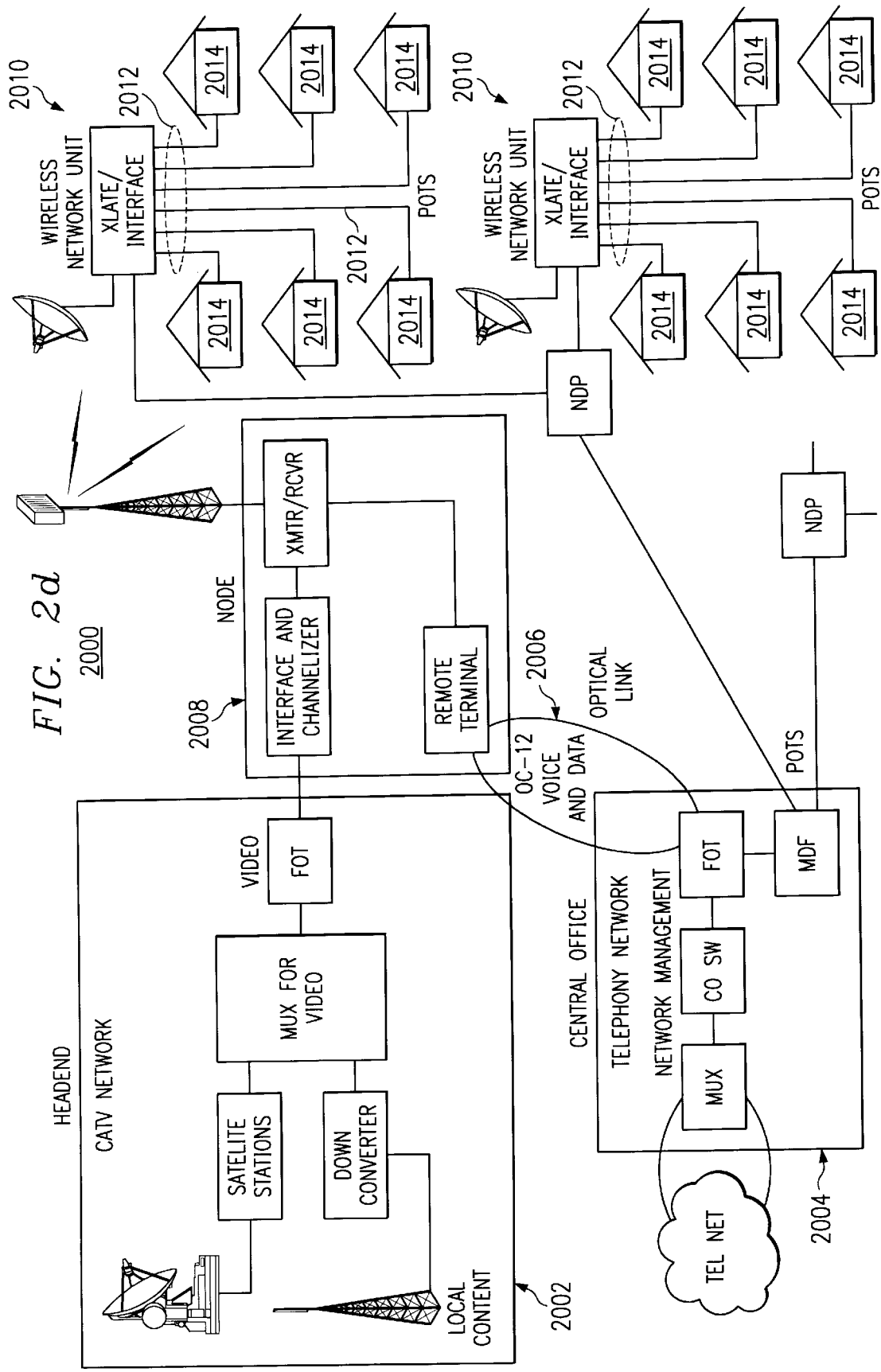

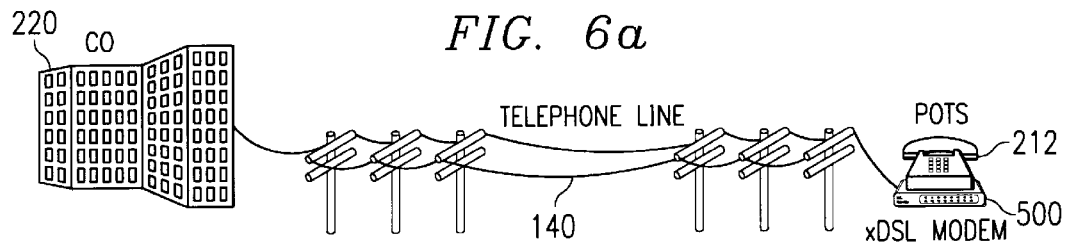

FIG. 7a
FIG. 7b
FIG. 7c

MULTIMODE DIGITAL MODEM

This is a continuation-in-part of application Ser. No. 08/645,020, filed May 9, 1996.

FIELD OF THE INVENTION

The present invention is related to multimode digital modems, and more particularly, to systems employing, methods for and hardware for multimode digital modems.

BACKGROUND OF THE INVENTION

A conventional voice-band modem can connect computer users end-to-end through the Public Switched Telephone Network (PSTN). However, the transmission throughput of a voice-band modem is limited to below about 40 Kbps due to the 3.5 KHz bandwidth enforced by bandpass filters and codes at the PSTN interface points. On the other hand the twisted-pair telephone subscriber loop of a computer user has a much wider usable bandwidth. Depending on the length of the subscriber loop, the bandwidth at a loss of 50 dB can be as wide as 1 MHz. Transmission systems based on the local subscriber loops are generally called Digital Subscriber Lines (DSL).

As consumer demand for interactive electronic access to entertainment (e.g. video-on-demand) and information (Internet) in digital format has increased, this demand has effectively exceeded the capabilities of conventional voice-band modems. Tin response, various delivery approaches have been proposed, such as optical fiber links to every home, direct satellite transmission, and wideband coaxial cable. However, these approaches are often too costly, and cheaper alternatives have emerged, such as the cable modem which uses existing coaxial cable connections to homes and various high bit rate digital subscriber line (DSL) modems which use the existing twisted-pair of copper wires connecting a home to the telephone company central office (CO).

Severed digital subscriber lines (DSL) technologies have been developed for different applications. The original 2B1Q Digital Subscriber Line technology has been used as the ISDN Basic Rate Access channel U-interface. The High-bit-rate digital subscriber lines (HDSL) technology has been used as the repeatertess T1 service.

An example of prior art use of DSL techniques is the Asymmetrical Digital Subscriber Line (ADSL) signaling for the telephone loop that has been defined by standards bodies as a communication system specification that provides a low-rate data stream from the residence to the CO (upstream), and a high-rate data stream from the CO to the residence (downstream). The ADSL standard provides for operation without affecting conventional voice telephone communications, e.g. plain old telephone service (POTS). The ADSL upstream channel only provides simple control functions or low-rate data transfers. The high-rate downstream channel provides a much higher throughput. This asymmetrical information flow is desirable for applications such as video-on-demand (VOD).

ADSL modems are typically installed in pairs, with one of the modems installed in a home and the other in the telephone company's central office servicing that home. The pair of ADSL modems are connected to the opposite ends of the same twisted-par and each modem can only communicate with the modem at the other end of the twisted-pair; the central office will have a direct connection from its ADSL modem to the service provided (e.g., movies, Internet, etc.). FIG. 2a heuristically illustrates an ADSL modem (FIG. 2a uses "DSL" rather than "ADSL" for the modem) installed in the central office and one in the consumer's home, either a personal computer or a TV set-top box. Because an ADSL modem operates at frequencies higher than the voice-band frequencies, an ADSL modem may operate simultaneously with a voice-band modem or a telephone conversation.

A typical ADSL-based system includes a server located at the CO capable of providing movies or other data-intensive content, and a set-top-box at the residence that can receive and reassemble the data as well as send control information back to the CO. Meaning display or use of the downstream content typically requires a sustained data rate through the modem. Due to the sustained data rate requirements, ADSL systems are primarily designed to function under certain operating conditions and only at certain rates. If a subscriber line meets the quality requirements, the ADSL modem can function, otherwise new line equipment must be installed, or line quality must be improved.

In particular, the ANSI standard ADSL calls for transmission of up to 6 million bits-per-second (Mbps) to a home (downstream) over existing twisted-pair and also for receipt of up to 640 thousand bits per second (Kbps) from the home (upstream).

An ADSL modem differs in several respects from the voice-band modems currently being used for digital communication over the telephone system. A voice-band modem in a home essentially converts digital bits to modulated tones in the voice-band (30 Hz to 3.3 KHz), and thus the signals can be transmitted as though they were just ordinary speech signals generated in a telephone set. The voice-band modem in the receiving home then recovers the digital bits from the received signal. The current ITU V-series voice-band modem standards (e.g. V.32 and V.34) call for transmission at bit rates of up to 33.6 Kbps; even these rates are far too slow for real-time video and too slow for Internet graphics. In contrast, an ADSL modem operates in a frequency range that is higher than the voice-band; this permits higher data rates. However, the twisted-pair subscriber line has distortion and losses which increase with frequency and line length; thus the ADSL standard data rate is determined by a maximum achievable rate for a length of subscriber lines, e.g. 9,000 feet (9 ft) for 26 gauge lines, or 12 kft for 24 gauge lines.

Voice-band modem data speeds are limited by at least the following factors: 1) the sampling rate of the line cards in the central office is only 8 KHz; 2) the low bit resolution of the A/D and D/A converters used on the line cards reduces dynamic range; and 3) the length of the subscriber line (twisted-pair) and any associated electrical impairments. Although an ADSL modem avoids the first two factors, it also suffers from subscriber line length limitations and electrical impairments. FIG. 4c illustrates how the capacity of a subscriber line decreases with increasing line length for the two existing wire sizes. A similar capacity decrease with length applies to any type of twisted-pair subscriber line modem.

FIG. 4a shows in block format a simple ADSL modem whose transmit hardware 30 includes the bit encoder 36, inverse fast Fourier transform 38, P/S 40, digital-to-analog converter 42, filter and line driver 44 for transmission and transformer 46. The receive portion 32 includes a transformer and filter 48, analog-to-digital converter 50, an equalizer for line distortion compensation 52, S/P 54, fast Fourier transform 56, and bit decoder 58. An echo cancellation circuit from the transmission portion to the reception portion may be included to suppress signal leakage. The ADSL standard uses discrete multitone (DMT) with the DMT spectrum divided into 256 4-KHz carrier bands and a quadrature amplitude modulation (QAM) type of constellation is used to load a variable number of bits onto each carrier band independently of the other carrier bands.

The number of bits per carrier is determined during a training period when a test signal is transmitted through the subscriber line to the receiving modem. Based on the measured signal-to-noise ratio of the received signal, the receiving modem determines the optimal bit allocation, placing more bits on the more robust carrier bands, and returns that information back to the transmitting modem.

The modulation of the coded bits is performed very efficiently by using a 512-point inverse fast Fourier transform to convert the frequency domain coded bits into a time domain signal which is put on the twisted-pair by a D/A converter using a sample rate of 2.048 Mhz (4×512K). The receiving ADSL modem samples the signal and recovers the coded bits with a fast Fourier transform.

Discrete multi-tone (DMT) has been chosen as the line code for the ADSL standard. A typical DMT system utilizes a transmitter inverse FFT and a receiver forward FFT. Ideally, the channel frequency distortion can be corrected by a frequency domain equalizer following the receiver FFT. However, the delay spread of the channel in the beginning of the receiver FFT block contains inter-symbol interference from the previous block. As this interference is independent of the current block of data, it can not be canceled just by the frequency domain equalizer. The typical solution adds a block of prefix data in front of the FFT data block on the transmitter side before the block of FFT data is sent to the D/A. The prefix data is the repeat copy of the last section of FFT data block.

On the receiver side, the received signal is windowed to eliminate the cyclic prefix data. If the length of the channel impulse response is shorter than the prefix length, inter-symbol interference from the previous FFT data block is completely eliminated. Frequency domain equalizer techniques are then applied to remove intra-symbol interface among DMT subchannels. However, since the channel impulse response varies on a case by case basis, there is no guarantee that the length of the impulse response is shorter than the prefix length. An adaptive time domain equalizer is typically required to shorten the length of the channel response within the prefix length.

Time domain equalizer training procedures have been studied previously, *Equalizer Training Algorithms for Multicarrier Modulation Systems*, J. S. Chow, J. M. Cioffi, and J. A. C. Bingham, 1993 International Conference on Communications, pages 761–765, Geneva, (May 1993) and the corresponding training sequence has been specified in ADSL standard and *Recommended Training Sequence for Time-domain Equalizers (TQE) with DMT*, J. S. Chow, J. M. Cioffi, and J. A. C. Bingham, ANSI T1E1.4 Committee Contribution number 93-086.

The following patents are related to DMT modems: U.S. Pat. No. 5,400,322 relates to bit allocation in the multicarrier channels; U.S. Pat. No. 5,479,447 relates to bandwidth optimization; U.S. Pat. No. 5,317,596 relates to echo cancellation; and U.S. Pat. No. 5,285,474 relates to equalizers.

Alternative DSL modem proposals use line codes other than DMT, such as QAM, PAM, and carrierless AM/PM (CAP). Indeed, ISDN uses a 2bit-1quaternary (2B1Q) four level symbol amplitude modulation of a carrier of 160 KHz or higher to provide more data channels.

CAP line codes typically use in-phase and quadrature multilevel signals which are filtered by orthogonal passband filters and then converted to analog for transmission. FIG. 4b shows a block diagram for the transmitter 321 and receiver 325 of a DSL modem using the CAP line code and including both an equalizer 750 and echo cancellation 327.

The following patents are related to CAP modems: U.S. Pat. No. 4,944,492 relates to multidimensional passband transmission; U.S. Pat. No. 4,682,358 relates to echo cancellation; and U.S. Pat. No. 5,052,000 relates to equalizers.

Modems using CAP or DMT, or other line codes, essentially have three hardware sections: (i) an analog front end to convert the analog signals on the subscriber line into digital signals and convert digital signals for transmission on the subscriber line into analog signals, (ii) digital signal processing circuitry to convert the digital signals into an information bitstream and optionally provide error correction, echo cancellation, and line equalization, and (iii) a host interface between the information bitstream and its source/destination.

However, these DSL modems have problems including: 1) higher bit rates for video that cause them to be complicated and expensive; 2) their bit rates are optimized for a fixed distance, making them inefficient for short subscriber loops and unusable for long subscriber loops; and 3) either DMT or CAP operates better for given different conditions (e.g. noise, etc.) that may or may not be present in a particular subscriber loop to which the DSL modem is connected.

Two way digital communication systems with high speed data transmission are being developed to provide interactive communication ability. From a wired perspective Hybrid Fiber Coax (HFC) is the primary architecture being tested. These systems can utilize a variety of digital modulation schemes, including Quadrature Amplitude Modulation (QAM), Vestigial Sideband (VSB) modulation and Quadrature Phase Shift Keying (QPSK) modulation to achieve efficient spectral communications. Systems trials to-date indicate an excessive amount of time and money are required to deploy these systems. Thus, two way systems being developed will require additional infrastructure to be built and additional customer residence (or premises) equipment to be added. As part of the return path, systems now have to deal with noise ingress problems upstream. Noise ingress requires the addition of special filters placed at the customer premises. Along with access to the customer premises, deployment of these systems cause disruptions in the residential and business community. This system infrastructure must be built out and bypass a customer premises prior to offering any connection for new high data rate one or two way services utilizing this new infrastructure.

An alternative wired system proposes utilizing copper infrastructure and high speed modems to transmit digital two way data. These systems can operate with several modulation schemes including Carrierless Amplitude/Phase (CAP), Discrete Multitone (DMT), DWMT and Subscriber Loop Carrier (SLC). Asymmetrical Digital Subscriber Loop (ADSL), Very-High-Data-Rate Digital Subscriber Line (VDSL) and High-Data-Rate Digital Subscriber Line (HDSL) modems currently under development will offer different data rates to carry communication signals to and from the customer premises. For copper wire based systems Limited bandwidth, signal attenuation resulting from the wire gauge and transmission distance all decrease such possible system data rates. Integration into the copper twisted pair network can be active or passive. To maintain the high data rates capabilities of these systems amplifiers will be required to maintain the signal strength and condition between communication points.

Digital wireless communication systems such as, Multi-channel Microwave Distribution Service (MMDS) operating at 2150–2162 MHz & 2500–2686 MHz, C-band satellite operating at 3700–4200 MHz, Ku-band Direct Broadcast Satellite (DBS) operating at 12200–12700 MHz, Very Small Aperture Terminals (VSAT) operating at 11700–12200 MHz and Local Multipoint Distribution Service (LMDS) operating in the 27500–29500 MHz band, are deployed or are under development. Wireless broadcast systems distribute signals from point to multipoint. Currently, these wireless systems rely on antennas mounted on the customer premises to establish the final communication link. Smaller antennas have made these systems more acceptable to customers. However, several issues arise with this method of distribution. Access to the customer premises, installation costs and antennas mounted at the premises are all undesirable factors from the customer point of view. From a system perspective the repetitive use of antennas, downconverters, tuners and decoders increase system deployment costs which are passed on to the consumer. Another factor limiting deployment of these systems in many residential neighborhoods is line of sight limitations.

However, these and other shortcomings of the prior art are overcome by the present invention.

SUMMARY OF THE INVENTION

The present invention provides a new high speed modem for use on standard telephone twisted-pair lines at lengths of up to 21,000 ft. This new modem will be referred to as MDSL, mid-band digital subscriber line. The MDSL modem of the present invention makes use of frequency division multiplexing (FDM) to separate the downstream and upstream transmitted signals. Although the modulation scheme for MDSL can be arbitrary, two specific modulation schemes that may be employed are QAM/CAP and Discrete Multitone (DMT). A startup procedure for achieving synchronization between the MDSL modem of the present invention at the central office (CO) and the MDSL modem at the remote user (RU) end is provided as part of the present invention.

One of the specific modulation schemes chosen for one implementation of MDSL is Carrierless AM/PM (CAP). CAP does not make use of a separate tone for synchronization. Synchronization is achieved using the transmitted data signal directly. At startup, a special data sequence is used to train equalizers in the CAP receiver before real data is transmitted.

The present invention provides a modem which supports both voice-band and above voice-band (DSL) functionality using preselected common circuitry. Preferred embodiments use a DSP to run either voice-band or above-voice-band modem software in combination with, either separate or combined analog front ends, and a common host interface (either serial or parallel). The same internal components may be employed for either the voice-band or the above-voice-band modem, and the modem may have an integral splitter to separate the voice-band for use by a telephone set.

The present invention provides a programmable Digital Signal Processor (DSP) implementation approach that allows different existing ADSL line codes, Discrete Multitone (DMT) and Carrierless AM/PM (CAP), to be implemented on the same hardware platform as a voice-band modem. With a DSP implementation, the desired transmission rate can also be negotiated in real time to accommodate line condition and service-cost requirements.

This line code and rate negotiation process can be implemented at the beginning of each communication session through the exchange of tones between modems at both ends. A four-step Mid-band Digital Subscriber Lines (MDSL) modem initialization process is used for line code and rate compatibility.

Although Digital Subscriber Line (DSL) signaling is used to convey digital data over existing twisted-pair copper telephone lines connecting the telephone company central office (CO) to residential subscribers, conventional DSL data modems are designed to provide service to a certain percentage of residential customers at a prescribed data rate. A new rate negotiation method of the present invention enables a variable-rate DSL (VRDSL) system. Using the rate negotiation method, the variable rate system adapts its throughput based on line conditions, computational capabilities, network accessibility, and application requirements. This service can be added to a telephone subscriber loop without disrupting the plain old telephone service (POTS). Hence, a voice-band modem connection can also be made available independent of the DSL connection.

The rate negotiation method provides systematic control for a DSL system that supports multiple rates. The data rates can be varied depending on modem cost, line conditions, or application requirements. The modem functions as a variable rate data link capable of supporting many different applications, including VOD, videophone, multiple ISDN links, and new network access applications. By considering the capability of a particular DSL connection, available computational power, and any special application program requirements, the data rate can be adapted by the negotiation method to a suitable level. This scheme provides symmetrical or asymmetrical data links and supports simultaneous applications requiring arbitrary mixes of symmetrical and asymmetrical links. A part of the symmetrical portion of the DSL transmission throughput can be used for telephone calls or video telephone calls. A part of the asymmetrical portion of the DSL transmission throughput can be used for internet access or VOD services. The rate negotiation method supports many different network applications using DSL.

The typical implementations of DSL modems, thus far, have supported only connectionless services between the subscriber and the network. However, since DSL is terminated at the local central office, a telephone-network friendly DSL interface is desirable. To facilitate multiple virtual service connections, an operations/signaling channel, similar to the ISDN D channel, is preferred for exchanging service and control messages. A preprocessor in the CO-end DSL modem is also necessary to collect operational messages before passing signaling and data packets to the CO control-channel server.

The DSL modem of the present invention supports connectionless as well as connection-oriented (switched) services.

The method of rate negotiation is preferably employed with a DSL system capable of a varying rate. An example is a viable-rate DSL (VRDSL) system that can provide a variable upstream transmission throughput up to 400 Kbps and a downstream transmission throughput of from 400 Kbps up to 2.048 Mbps. (However, the invention is not constrained to vary within the rates given by this example system.) With lower throughput, operation with poor line conditions is supported. Lower data rates also allow the design of less expensive modems for less demanding applications. This is consistent with the mid-band DSL (MDSL) design philosophy of the present invention, which can provide a symmetrical 400 Kbps link using the same hardware platform as a voice-band modem. With high downstream throughput, VRDSL can be made compatible with ADSL. Basically, the VRDSL rate negotiation method provides the capability to serve a range of price/performance DSL modems that can m maximize throughput based on individual line conditions and processing power. In VRDSL signaling, the POTS will still be available through the same telephone subscriber loop.

The host interface requirements for the Mid-band digital subscriber line (MDSL) software system is also a part of the present invention.

The software running under the host PC platform to control the MDSL network interface card was implemented as an NDIS 3.0 WAN mini-port driver; it works under Windows NT/Windows 95 together with existing networking drivers and applications.

The line connection management process for a mid-band digital subscriber lines (MDSL) provides a simple, efficient and flexible interface to manage the line connection between MDSL-C (MDSL in Central Office site) and MDSL-R (MDSL in residential site). MDSL uses four different line modes: leased line with single link (LLSL); leased line with multiple links (LLML); switched line with soft dial (SLSD); and switched line with hard dial (SLHD). The host interface for the LLSL mode, has three different line states: line drop, line disconnected and line connected. An internal state machine of the MDSL modem can record and monitor the line status and notify the state change to the other MDSL modem, as well as the host processor. The protocol used for exchanging line connection management messages of the present invention is a simplified point-to-point link control protocol.

The MDSL host interface includes the following basic functions: command/control communications between the host and MDSL, line connection management and send/receive data packet. The MDSL host interface provides a simple, user-friendly, efficient and low-cost interface to the host controller.

In a presently preferred embodiment, the host driver software for MDSL is implemented as an NDIS WAN miniport driver running under Windows 95/NT environment. The software controls and manages the Media Access Control (MAC) sublayer of the MDSL network system and working with NDIS wrapper and an upper layer protocol driver stack, any internet accessing application can be run transparently.

The present invention also provides a simple algorithm to train the time domain equalizer of an MDSL modem. By the same procedure, the FFT frame boundary is also reliably detected.

This invention also provides point-to-multipoint delivery of communication services and more particularly to distribution methods which integrate wire and wireless systems via modems into an efficient digital signal distribution network designated a Hybrid Wireless Wire-Line Network (HWWN). A key element included in this system architecture is the bandwidth management feature which provides for efficient use of the available spectrum based on user demands for data rates and channel transmission conditions.

The invention also provides a direct equalizer system with an adaptive filter in the transmitter for symmetrical dispersive transmission channels. The direct equalization approach avoids the use of an expensive high precision high sampling rate A/D converter and a high precision adaptive filter in the receiver. In the transmitting data path the adaptive filter only needs a precision equal to the symbol bit resolution. The filter coefficients are identified in the receiving path using a sign LMS algorithm (which only involves shift and addition operations). Thus, the direct equalizer system of the present invention is an inexpensive approach for the realization of high data rate transmission systems over symmetrical dispersive channels.

BRIEF DESCRIPTION OF THE DRAWINGS

Figures are schematic for clarity.

FIGS. 1a–e show a preferred embodiment multimode modem.

FIGS. 2a–h show preferred embodiment modem Central Office modems and distribution systems;

FIGS. 6a–f illustrate preferred embodiment initialization;

FIGS. 7a–f show preferred embodiment rate negotiation;

DETAILED DESCRIPTION

Overview of preferred embodiment modems

Figure 1C:
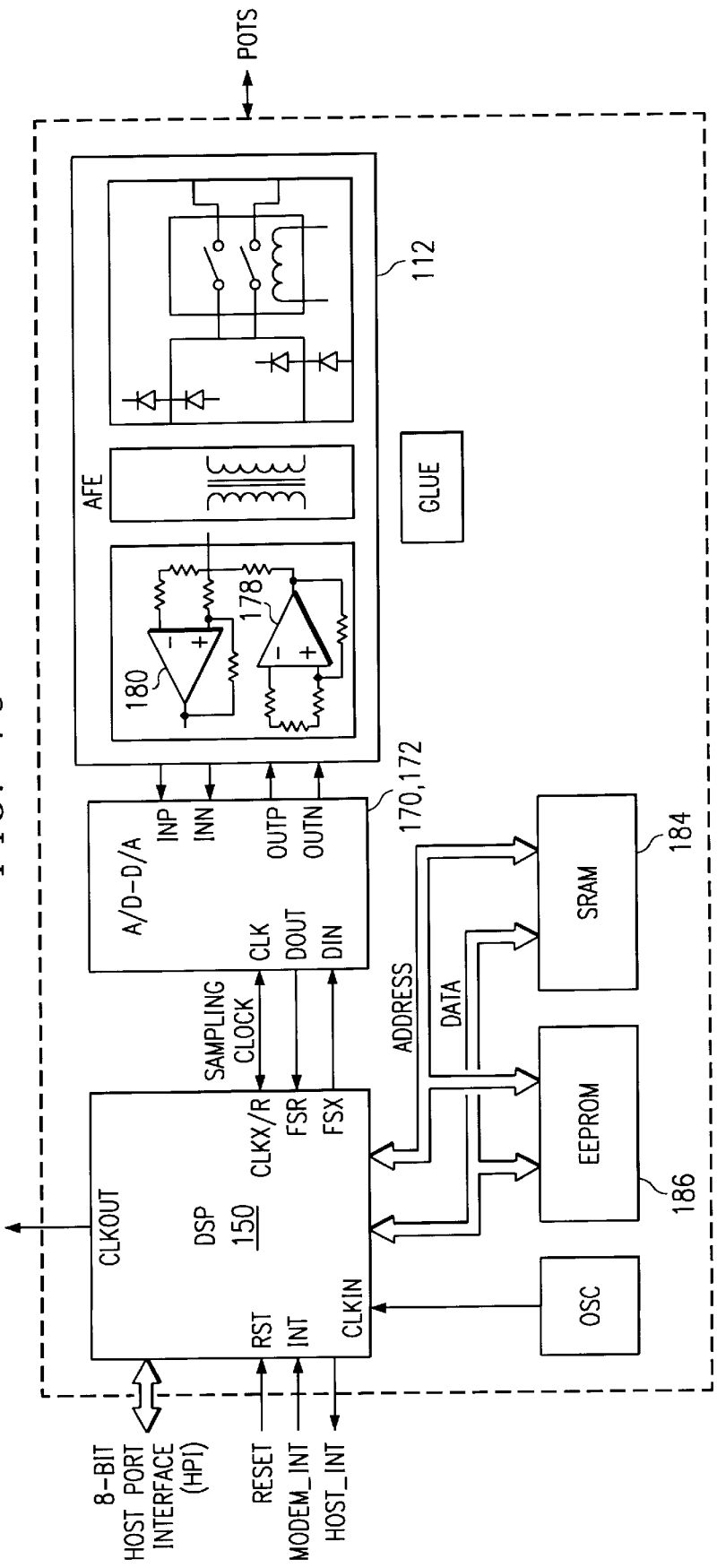

FIG. 1a shows a functional block diagram of a first preferred embodiment of a multimode modem 100 of the present invention. In FIG. 1a, modem 100 includes both a voice-band and DSL band data path to a single subscriber line (twisted-pair) 140, which connects to a telephone company central office. A voice-band analog front end (VB AFE) 110 transmits and receives at frequencies in the voice-band (30 Hz to 3.3 Khz), whereas the digital subscriber line analog front end (DSL AFE) 120 transmits and receives at frequencies above the voice-band (above 4 KHz). A Splitter 130 connects to the subscriber line 140 and separates the incoming signals into its voice-band and above-voice-band components. POTS (plain old telephone service) occurs in the voice-band and a telephone may be connected to the subscriber line directly or through the splitter 130.

Modem 100 utilizes a single programmable digital signal processor (DSP) 150 as part of the DSL band data path and as part of the voice-band data path, but typically uses two separate data input ports. Generally, the DSL band will have a much higher bit rate than the voice-band data path, so using separate DSP ports will be more convenient than using a single port with a buffered multiplexer; although the use of such a multiplexer is an alternative clearly within the scope of the present invention. For example, the DSL band operation modem 100 may employ an upstream (from residence to central office) frequency band centered at 100 KHz with a total bandwidth of slightly less than 200 KHz, and a downstream (from central office to residence) frequency band centered at 300 KHz and also of total bandwidth slightly less than 200 KHz; this frequency allocation provides for full duplex operation of modem 100. Generally multiple DSPs, instead of a single DSP, may be employed to increase functions performed or to increase performance. The DSP 150 is connected to a host interface circuit 160.

Modem 100 can select from multiple line codes and, further, modem 100 can perform as either a high-bit-rate DSL modem in frequencies above voice-band or as a voice-band modem (such as V.34), either simultaneously or consecutively just by switching programs being executed by the DSP 150. The various line code programs can be stored in the DSP onboard memory or in auxiliary memory not shown in FIG. 1a. Also, alternative line codes for the DSL modem operations (e.g., a CAP or a DMT line code) can be used, again depending upon the program executed by the DSP 150.

FIGS. 1b–c illustrate the DSL data path portion of modem 100 which includes analog-to-digital 172 and digital-to-analog 170 converters, filters 174, 176, a transmission driver 178, and a receiver amplifier 180. FIG. 1b additionally explicitly shows a phase locked loop 182 clock generator that synchronizes the modems' internal clocks with the clock signals from the host (or the central office). FIG. 1c omits the bandpass filters and instead shows various optional memory types, both SRAM 184 and nonvolatile EEPROM 186 which could hold line code programs. When modem 100 acts as a voice-band modem, the spitter 130 provides the voice-band frequencies to the voice-band analog front end 120.

Figure 1D:
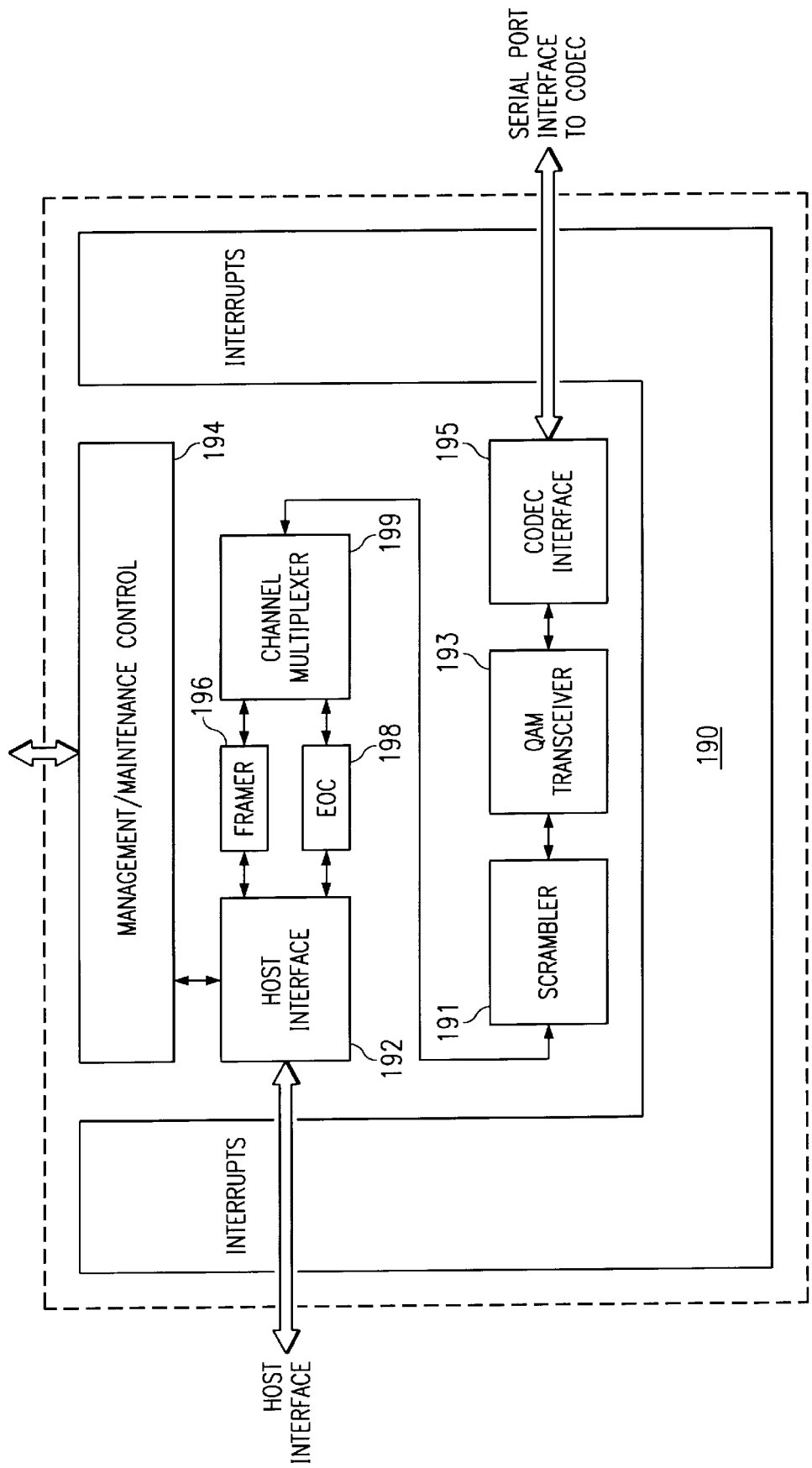

FIG. 1d illustrates the DSP software for modem 100 in DSL mode and includes (i) an optional kernel (operating system) 190 for the DSP, (ii) host interface 192, (iii) optional management maintenance control 194, (iv) framing 196, (v) embedded operations control 198, (vi) channel multiplexer 199 for multiplexing the embedded operations control with the data stream, (vii) scrambler logic 191 for bitstream scrambling (viii) the transceiver logic 193 such as a CAP or DMT logic which includes the bits-to-symbols conversions, equalization, echo cancellation, and (ix) modulator/demodulator 195 logic and optional forward error correction (FEC).

Figures 1E, 2A:
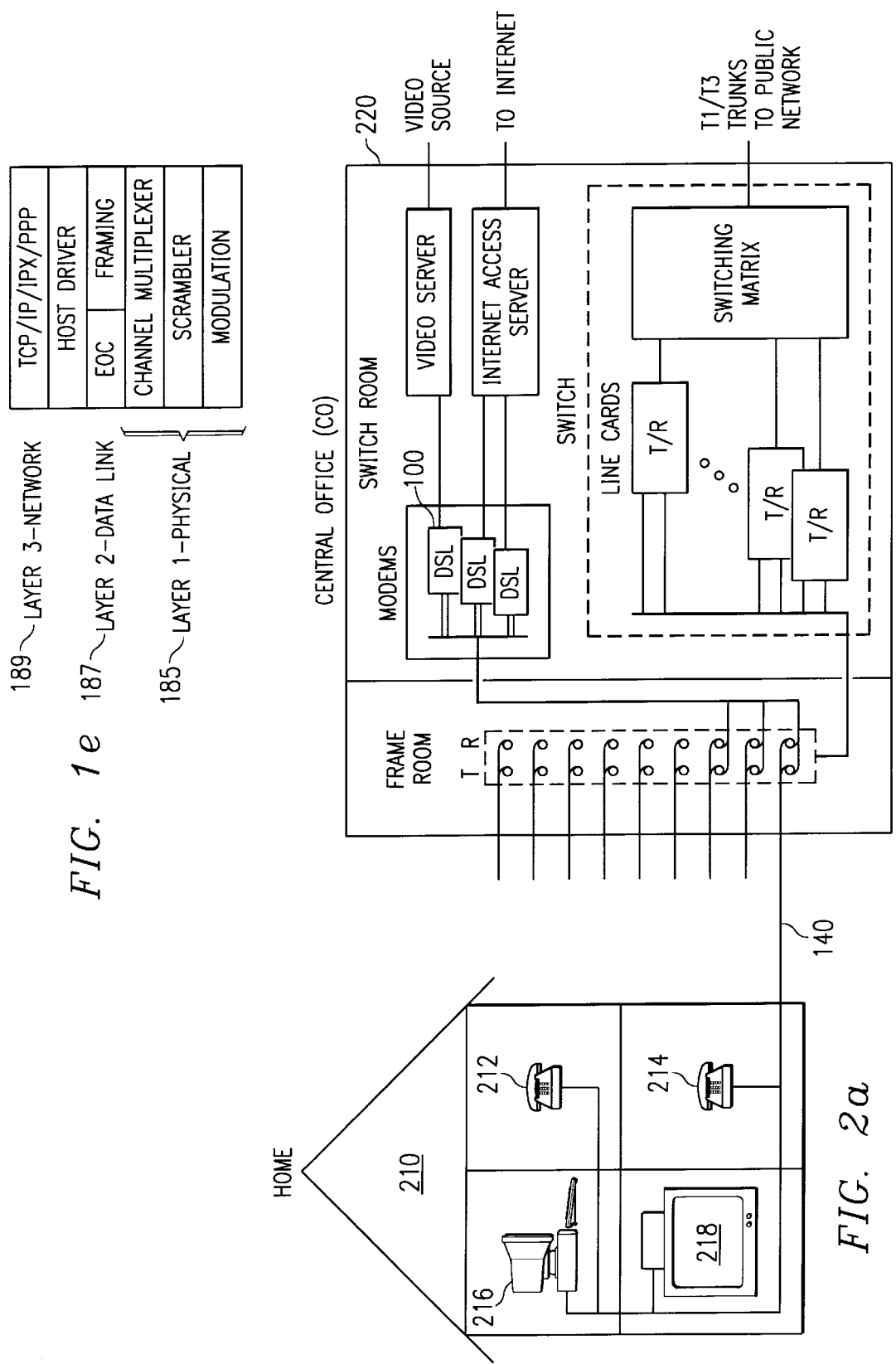

FIG. 1e illustrates the software protocol hierarchy for applications running on modem 100 interfacing with a host. The physical layer 185 (layer 1) includes the DSP software for modulation, bitstream scrambling, and multiplexing control signals with the data stream. The data link layer 187 (layer 2) in the DSP includes embedded operations control and framing. The network layer 189 (layer 3) in the host includes the modem driver (e.g. NDIS type for a Windows 95/NT) and transport protocols such as PPP (point-to-point protocol). Applications such as internet browsers interact with the transport protocols.

For voice-band modes of operation, modem 100 may use software similar to standard voice-band modems (e.g. V.34, etc.).

The present invention provides a new high speed modem 100 for use on standard telephone twisted-pear lines at lengths up to 21,000 ft. This new modem 100 will be referred to as MDSL, mid-band digital subscriber line. The MDSL modem 100 makes use of frequency division multiplexing (FDM) to separate the downstream and upstream transmitted signals. Although the modulation scheme for MDSL can be arbitrary, two specific modulation schemes that may be employed are QAM/CAP and Discrete Multitone (DMT). A startup procedure for achieving synchronization between the modem at the central office (CO) and the modem at the remote user (RU) end is provided as part of the invention.

One of the modulation schemes selected for one embodiment of the MDSL modem is Carrierless AM/PM (CAP). CAP can be considered as a special case of the more conventional Quadrature Amplitude Modulation (QAM). The main difference is that CAP performs most of its processing in the passband, while QAM performs most of its processing at baseband.

CAP does not make use of a separate tone for synchronization. Synchronization is achieved using the transmitted data signal directly. At startup, a special data sequence is used to train equalizers in the CAP receiver before real data is transmitted.

One embodiment uses Carrierless AM/PM (CAP) Modulation and Discrete Multiple-Tone Modulation on the same DSP platform to achieve 16 Kbps–384 Kbps upstream speed (from MDSL-R to MDSL-C) and 384 Kbps-2.048 Mbps downstream speed (from MDSL-C to MDSL-R). The MDSL-C can also be installed as a gateway or router to allow the MDSL-R access to local area networks. Examples of the application of MDSL are described later herein.

Prototype MDSL hardware was built upon an ISA card which can be plugged into a PC or other platform directly. This prototype contains the following components: TMS320C541 DSP to implement modulation/demodulation; network physical layer framing and interfacing with the HOST, 16-bit wide EEPROM and RAM; Combined D/A and A/D Converter capable of supporting the sampling rates, resolution, and other characteristics necessary for implementation of MDSL; Analog Front-End circuitry required for connection to a POTS interface; and an ISA bus interface circuit.

FIG. 2a shows modem 100 in a home 210 communicating with another modem 100 in the central office 220. This central office 220 modem 100 may have various capabilities and loads, and the subscriber loop 140 may be in a particular condition, so the modems execute an initialization process to select the line code (CAP, DMT or others), the bit-rate, and train the equalizers. Then the modems begin data communication.

Figure 2B:
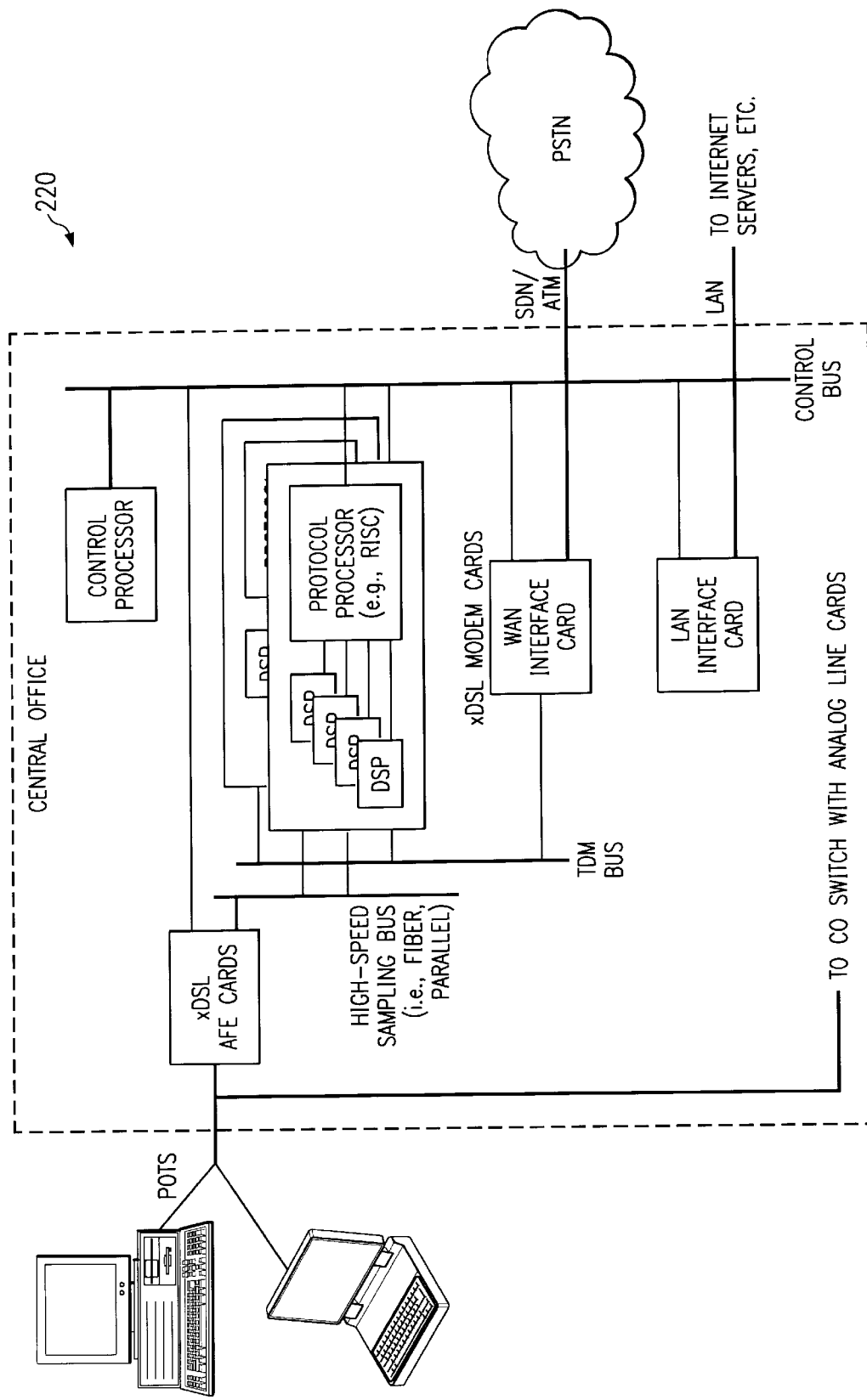
Figure 2C:
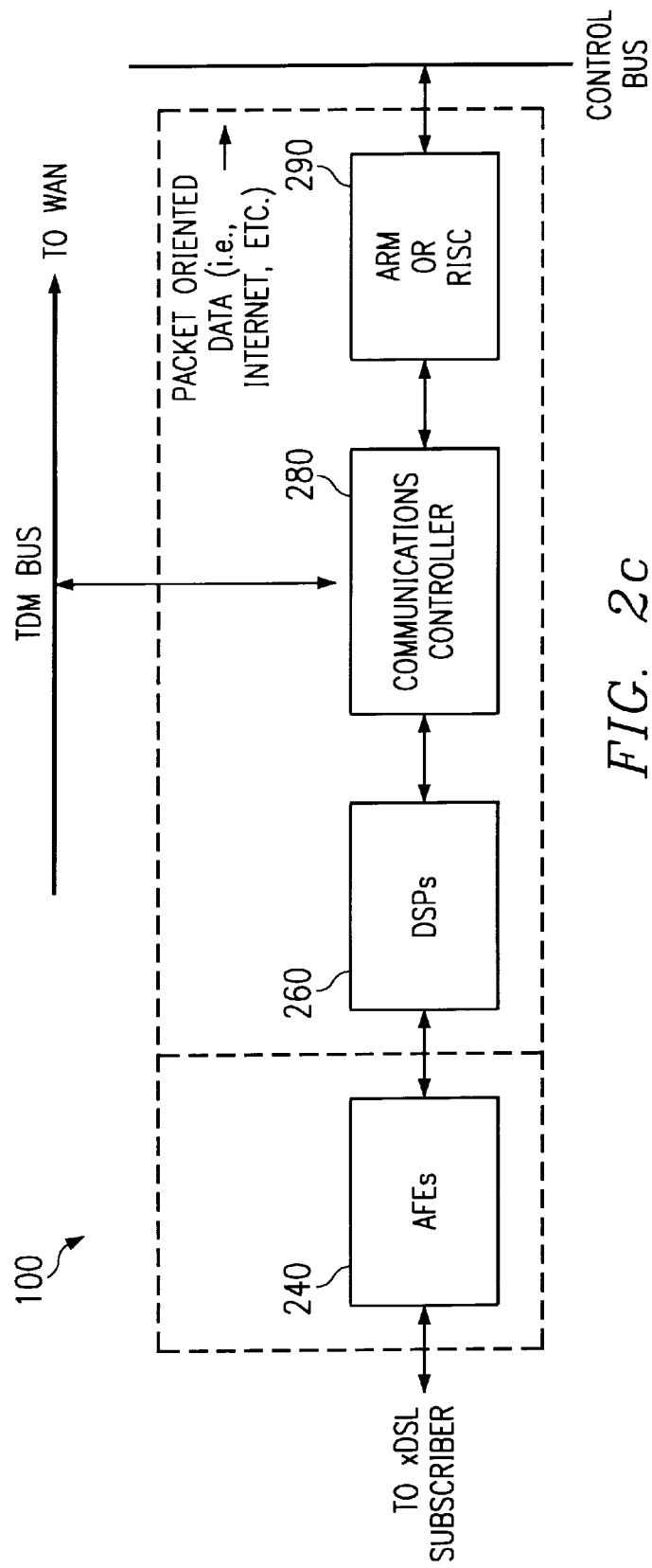

FIGS. 2b–c illustrate alternative central office connections to subscriber lines with DSL modems: each subscriber line has a DSL AFE (analog front end) and an analog switch connects an AFE output to a DSL processor, either a DSP similar to the DSP in the residence modem or a single DSP for multiple AFEs. The central office monitors the AFE outputs and a digital switch assigns an available DSP to communicate with the corresponding residence DSL modem. The central office polls the AFEs to find active modems in the residences. As FIGS. 2b–c show, the central office DSL modem connects to a remote access server on a local area network with packetized information (e.g., Internet) or a wide area network with constant bit rate data which is sent directly across the public switched telephone network trunk lines. The information sent by the residence modem would be identified or signaled via an out of band signaling method (e.g. similar to ISDN Q.931 signaling), rather than an off-hook signal, plus telephone number sent in the voice-band to the analog switching and line cards. FIG. 2c illustrates the major functional blocks of a central office DSL modem (the DSL band is already separated from the voice-band) as an AFE 240, DSP 260, Communications Controller 280 and ARM or RISC processor 290. The modem has a connection to both the constant bit rate transmissions (voice, video conferencing, etc.) being forwarded to a time division multiplexed (TDM) bus and packetized data (Internet, Intranet, private networks, etc.) being forwarded to a control bus (and then to the trunk lines). FIG. 2c depicts the terminology "xDSL" which may be ADSL or any other type of DSL modem. These various functions could be all performed in a single DSP 260.

The AFEs 240 could be separated from the central office 220 and placed in the pedestals connected to the central office via optical fiber or coaxial cable; each pedestal would tap off a bundle of subscriber lines with residences within a short distance, such as 5 kft or less. In this manner, the attenuation at high frequencies for long subscriber lines can be avoided.

Referring now to FIG. 2d there may be seen a simplified functional block diagram of an architecture of the present invention for a hybrid wireless wire-line network (HWWN) 2000. More particularly, an architecture and a method that distributes telephony, television and data signals via an integrated transmission network is depicted in FIG. 2d. Communication distribution begins at the headend 2002 or central office 2004. Signals are digitized and may be sent via an optical feeder link 2006 to a wireless distribution node 2008. Various techniques can be employed to modulate the RF carrier which is upconverted for transmission to the neighborhood. Remote terminals called Wireless Network Units (WNU) 2010 may be deployed in the neighborhood and use antennas to receive the Radio Frequency (RF) signals, translate them to Intermediate Frequencies (IF) then to a low carrier frequency signal coupled onto a Digital Subscriber Line (DSL) and transported via a Very-High-Data-Rate Digital Subscriber Line (VDSL) or MDSL on the twisted pair 2012 to a residence 2014. In a two-way system these antennas will be part of the return connection platform to transmit information back from the customer premises 2014 to the node 2008. Twisted copper pair lines or coaxial cables via high speed modems transmit or receive the digital signals initializing or completing the transmission network at the customer premises. Network control and routing functions are accomplished via an appropriate control channel. The present invention uniquely utilizes the capabilities of high speed modems and established wired and wireless distribution technology in an integrated transmission network. Additionally, bandwidth can be dynamically controlled and frequencies reused to optimize the transmission network. Based on user demands and detected interference the system management adjusts the data rates to optimize network performance. System management is achieved by passing information through the Operation Support System (OSS).

In accordance with the preferred embodiment Hybrid Wireless Wire-Line Network (HWWN), a method of broadband communication distribution combines the advantages of wireless distribution while integrating the digital signals back into the existing copper or coaxial network at a Wireless Network Unit (WNU) 2010. The final transmission link to the customer premises is made using a VDSL (or MDSL) line driver to the VDSL (or MDSL) receiver. System management is employed to dynamically adjust bandwidth based on customer data rate requirements. Information selection and channel quality are monitored and controlled via the control channel and Operation Support System (OSS). Various architectures link the network data communications systems together through the seven Open System Interconnect functional layers.

The HWWN method of distribution affords cost and performance advantages and eliminates many of the disadvantages of the other systems mentioned above. Specifically, by using a wireless point to multipoint system combined with modems, higher data rates can be provided over longer distances with reduced bit error rate (BER). Additionally, the wireless feature allows for a rapid deployment with increased capacity added on as required. Modems provide access to multiple customers from a wireless network unit. This integrated architecture increases customer access over systems offering direct distribution to the customer premises. Using this architecture a single wireless network unit can provide an interface to connect to several hundred customer premises. The network architecture of the present invention enables such features as higher speed World Wide Web access, video conferencing and supports 10 Base T Ethernet, 100 Base T Ethernet and Asynchronous Transfer Mode (ATM) connection to the customer premises at an effective cost.

Various architecture embodiments may be deployed using a variety of modulation techniques. For illustrative purposes, a higher level modulation scheme, such as 64 QAM will be utilized to make effective use of any available spectrum. In wireless systems degradation in the signal to noise resulting from things like multipath, and adjacent channel carrier can cause signal interference. Adaptive equalization can correct for some of these problems. Sectorized antennas at the transmitting node with alternating frequency and alternating antenna polarization can offer increased channel densities with reduced signal interference. To reduce interference caused by the return path, Quadrature Phase Shift Keying (QPSK) modulation may be incorporated with adaptive channel band control and spatial diversity to reduce system interference.

An hybrid integrated network, HWWN, embodiment may be configured from various distribution systems resulting in compatibility with a variety of satellite and terrestrial based systems including, but not limited to MMDS, C-Band satellites, Ku-Band DBS and VSAT and LMDS systems.

FIG. 2d is a block diagram of a presently preferred network embodiment comprised of a wireless point to multipoint system coupled into a conventional copper telephony system. Another network embodiment might employ a bus architecture for deployment into a coaxial system or with a satellite feeder as the node. The wireless system is made up of multiple nodes such as node 2008 in FIG. 2d. Enough Wireless Network Units 2010 are deployed to cover the desired service area. Terrestrial network deployment and integration depends on the location of the central office, headends, and access to node sites, buildings or towers. However, any actual configuration depends on the number of customers and the required data rates. At the central office, modems feed a concentrator and packetizer into the appropriate data stream. Multiple modems multiplexed at the central office send data stream via fiber optical terminal (FOT) over an optical link to a remote node site for transmission over the wireless node antenna. Similarly, the video headend integrates the video streams onto a FOT which links to the node for transmission over the wireless node antenna. WNU equipment receives the transmission and translates the signal down for distribution to the end customer.

Figure 2E:
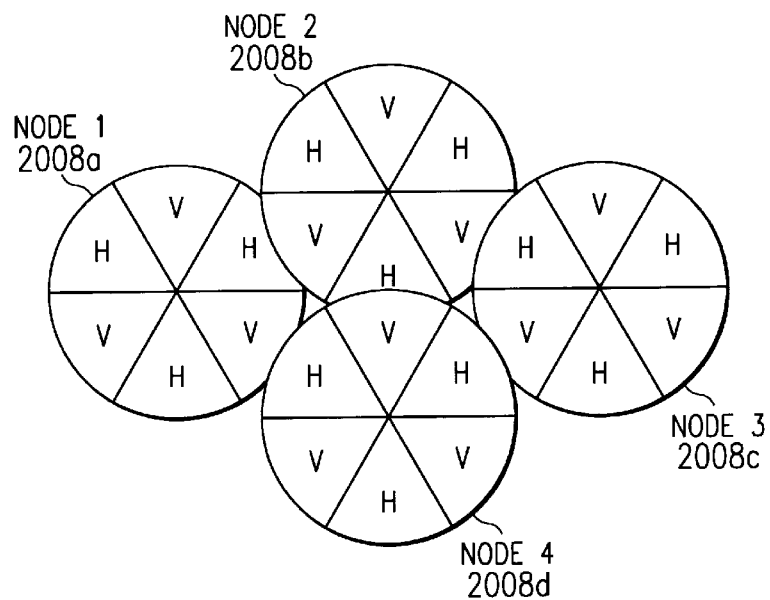

To establish effective communication using a higher level of modulation, such as for example but not limited to a 64 QAM modulation scheme, several techniques can be utilized to decrease the effect of interference. Referring to FIG. 2e the node 2008 antenna can be deployed to cover a complete 360° cell in a sectorized pattern. FIG. 2e shows 4 nodes 2008a–2008d, with a transmitting tower at the center of each circle. With each node tower or platform, antennas are arranged in sectors. For the purpose of this discussion sectors are shown as 60° sectors. This sectorized pattern is then repeated around the node and in the adjacent cells. These sectors may be deployed with alternating horizontal and vertical polarization and the communication area can provide coverage with significantly less interference. To further reduce the interference, transmit frequencies can be alternated from sectors. The disadvantage of this method is it decreases the number of channels available for transmission of information to the customers. The 60° sectors counters this effect by providing for a high level of frequency reuse and thus boosting the channel capacity.

line. To complete the downstream path the VDSL modem receives the digital signals and translates the signal back into information.

Figure 2G:
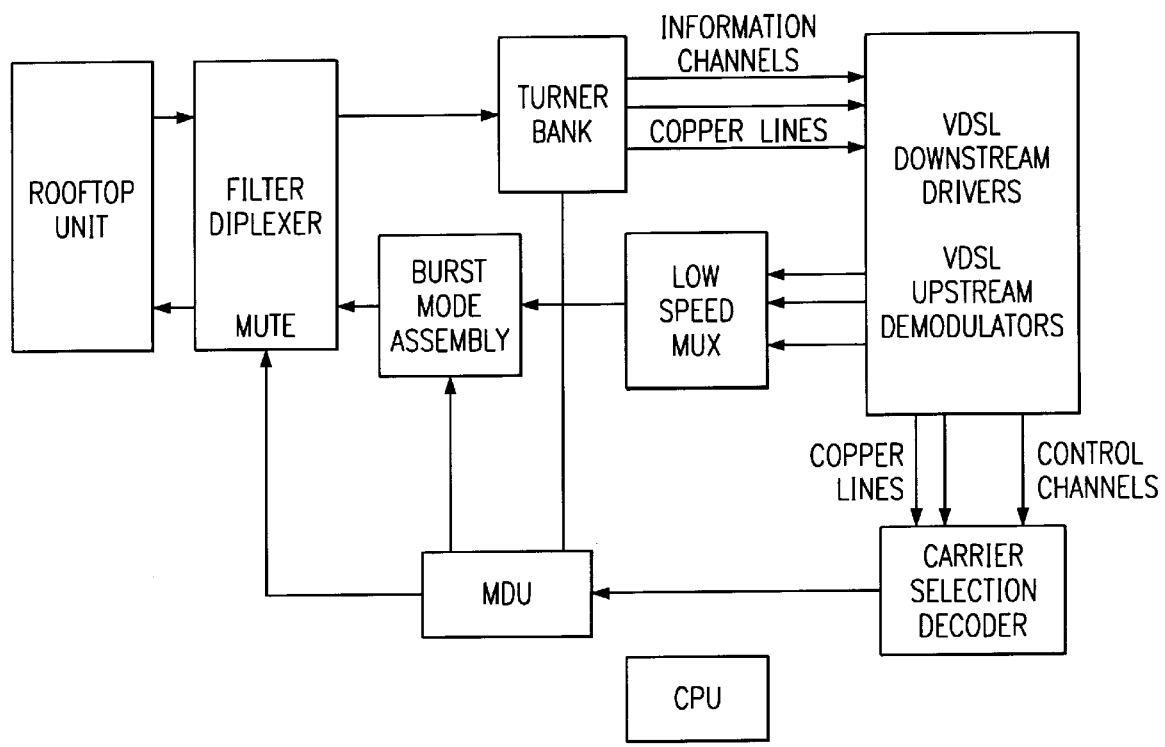
Figure 2F:
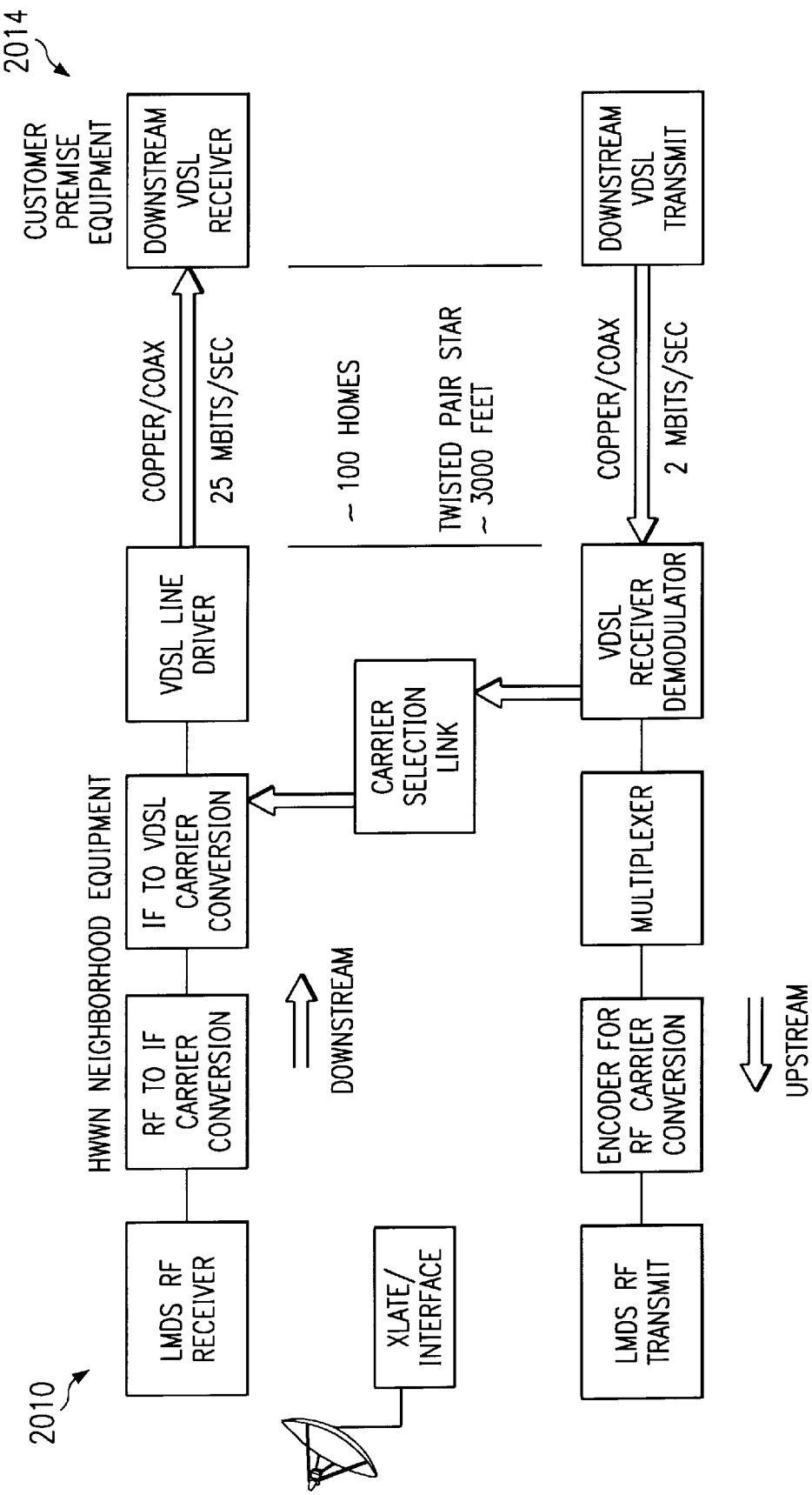

FIG. 2f also shows the upstream return path from the customer premises 2014 to the WNU 2010. The digital signals are sent upstream via the VDSL transmitter over the twisted copper pair and are received by the VDSL receiver located in the WNU. Digital upstream channels are multiplexed, encoded and converted to RF frequencies for transmission to the Node receiver.

FIG. 2g details the WNU 2010 operational blocks. The data coupled onto the existing copper line are transmitted via the Very-High-Data-Rate Digital Subscriber Line (VDSL) at baseband to and from the customer premises. The control channel has three primary functions 1) pass channel selection information, 2) allocate bandwidth and 3) analyze channel interference resulting in bit error rate. As part of the first function, tuners are located in the WNU to tune to the appropriate channel. Broadcast information can be shared via multiple VDSLs. This acts as a virtual tuner reduces

TABLE 1

Channel Capacity vs. Modulation Type

| Modulation Type | FEC Encoding | Theoretical Bandwidth Efficiency (b/Hz) | Practical Bandwidth Efficiency | Estimated #3 Mbps Channels | Practical # Chs. with System Factors | Sectorized # of Chs. |
|---|---|---|---|---|---|---|
| QPSK | R½ | 1 | 0.8 | 192 | 192 | 768 |
| QPSK | R⅔ | 1.3 | 1 | 240 | 240 | 960 |
| 16QAM | R¾ | 3 | 2.4 | 575 | 288 | 1152 |
| 64QAM | R⅚ | 5 | 4 | 960 | 480 | 1920 |
| 16VSB | R⅞ | 7 | 6 | 1440 | 720 | 2880 |

Table 1 shows channel capacity vs. modulation type and the effect of sectorizing. For illustrative purposes, a 3 Mbps transmission channel was selected. As can be seen in the table, higher levels of modulation such as 64 QAM with forward error correction coding, Reed-Solomon outer code for burst error protection and Trellis inner code at the symbol level, provide a higher bandwidth efficiency. The table shows the number of 3 Mbps channels that each modulation technique can support given a total bandwidth of 780 MHz. To reduce the interference and meet the higher system signal to noise ratio required for 64 QAM modulation, channel frequencies would most likely have to alternated from sector to sector. This would not be the case for a QPSK system due to the lower signal to noise requirements. Taking into account the alternating frequency plan for higher efficiency modulation schemes Table 1 shows the practical number of channels which can be obtained and concludes with the effect on channel capacity of deploying 6 sectors per node. Various other system factors including linearity, signal to noise ratio, effective isotropic radiated power (EIRP), and phase stability coupled with receiver noise figure, antenna size, system gain with adequate path link margin will determine which technique provides the most cost effective system.

FIG. 2f shows a block diagram of a WNU 2010 and the end customer modem equipment. Downstream RF channels carrying multiplexed subcarrier signals are selected and received at the antenna, converted to IF, demodulated and demultiplexed. Using a VDSL (or MDSL) line driver data is coupled via a splitter for separation of the voice and DSL signals. Data is sent via a low carrier frequency, Quadrature Amplitude modulated (QAM) signal over the twisted pair equipment costs. For the second channel control function, bandwidth allocation, data rate requests are sent via control signals to the WNU from the customer premises modem. The WNU forwards the request to the Node where capacity allocation is arbitrated and assigned. If insufficient system resources are available the system will negotiate other user rates in an attempt to complete the newly requested link. This information is managed at the network management layer and can be used to bill customers based on actual data rate used. Communications originating at the node utilize the management layer to determine the customer selected data rate and based on the communication segment requirements the node would only transmit on the channels required for the data rate. A fully populated node (all carrier frequency) could be realized using frequency diversity on the WNU and transmit node and spatial diversity at the WNU allowing for dynamic transmit and receive frequency allocation. This dynamic bandwidth allocation could be achieved through the use of variable or switched bandwidth filters thus reducing or eliminating the need for a guard band. Finally, function three analyzes the channel interference at any given time and improves the carrier to interference (C/I) by reducing the bandwidth. The effects of these last two techniques are to provide a system with a variable data rate capability resulting in a more efficient utilization of the spectrum.

The node receiver downconverts, demodulates, demultiplexes and interfaces the signals back into the switched telephone network for distribution. The control channel information is used to establish and prioritize communication link paths based on the type of information, arbitrate data rates, manages transmit and receive frequency separation and integrate the wireless into the OSS.

As mentioned previously multiple networks deployed today could benefit from this HWWN architecture. Since system architectures vary (e.g. one way vs two way communication, QPSK vs QAM, symmetric vs asymmetrical data), the impact of implementing a in conjunction with these different architectures will result in different benefits. For example a satellite system with one way transmission utilizing QPSK modulation could benefit from increased line-of-site, faster deployment, lower customer equipment costs, simplified installation and a two way path back to the telephony network. Current acquisition estimation for a DBS dish in the U.S. is a 67% probability. This means about 33% do not have a direct line of site to the broadcast satellite to acquire a signal. This deployment method of the present invention could improve the acquisition to greater than 90% provided copper lines are available and capable of handling the digital signals.

MMDS is a one way terrestrial video system. A HWWN could provide acquisition improvements similar to the satellite example. Again this embodiment could add two way high speed data capabilities and a second telephony line. Transmission of symmetrical payloads such as telephony require equal channel capacity in the transmit and receive modes. With the dynamic BER monitor and arbitrated data rates capability and digital compression techniques a HWWN system could be deployed which achieves two times capacity increases, or more. Some channel capacity could be used to support new applications such as high speed Internet connections. Additionally, the QAM modulation technique being considered for digital video MMDS systems could utilize sectorized nodes and manage channel allocation to reduce interference.

Figure 2H:
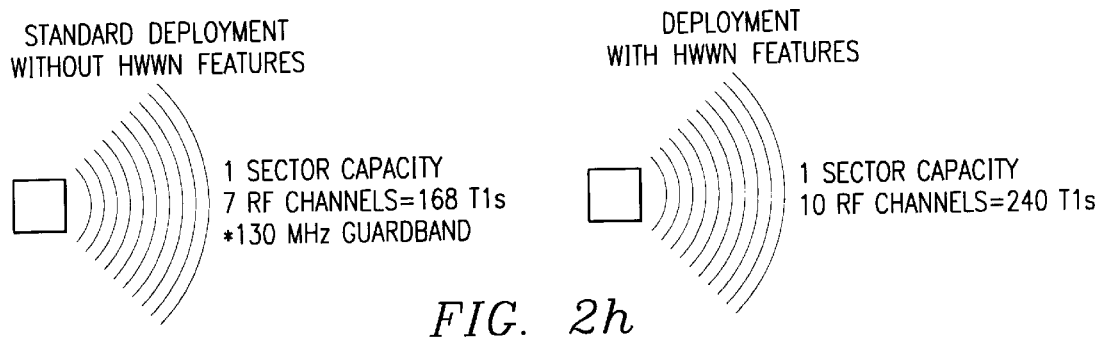

As a final embodiment, with a HWWN digital transmission architecture it is possible to develop a system to control and allocated the system bandwidth based on varying data capacity demands, type of information (data rates) and interference encountered. FIG. 2h summarizes such a system's capabilities. Assuming an 850 MHz frequency spectrum allocation, a QPSK modulation scheme with no concentration could provide 576 DSOs per 40 MHz RF channel. The data rate per 40 MHz channel is 37.056 Mbps accounting for overhead and pilot tones. Faster digital modems or sectorizing would increase these channel rates. A dynamically controlled HWWN system increases these rates by providing additional RF channel capacity. Based on utilization of the current spectrum typically allocated for guard band dynamic channel allocation could provide an additional 3 RF channels. A HWWN digital transmission embodiment employing QAM modulation and interference measurement and control capabilities could potentially provide several more RF channels to increase capacity or provide higher data rates.

In summary the HWWN of the present invention can provide increased applications at lower costs and the technology benefits of 1) increased spectrum efficiency and 2) reduce interference.

An alternative is for the central office to monitor each subscriber line with a DSL modem in the above-voice-band frequencies and when the line becomes active, an analog switch connects the subscriber line to a DSL modem in the central office. This mimics FIG. 2b except a simpler monitoring and an analog switch replace AFE monitoring and a digital switch. The same approach may also be used in conjunction with the local pedestal to shorten the subscriber line distance from residence DSL modem to the AFE on the central office end (physically located in the remote pedestal).

Figure 3A:
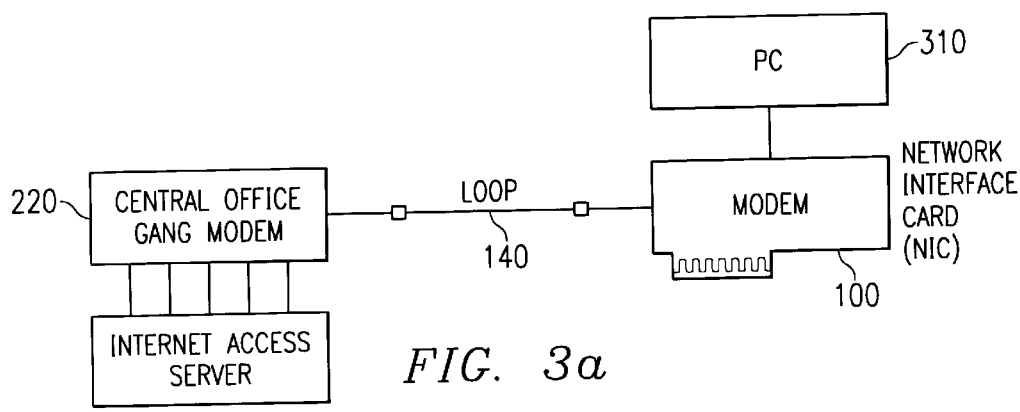
FIGS 3a–e show preferred embodiment modem applications and ISDN signaling.

FIG. 3a shows a system with modem 100 in a personal computer 310 running Windows 95 (or Windows NT) with standard protocol stacks communicating over a subscriber line 140 with a corresponding modem 100 in the central office 220, which may be connected to an Internet access server via an Ethernet (10/100 Base T) interface. Modem 100 allows for both POTS or voice-band modem communication with another voice-band modem at the same time as the DSL portion of modem 100 connects to the Internet over the DSL portion.

Figure 3B:
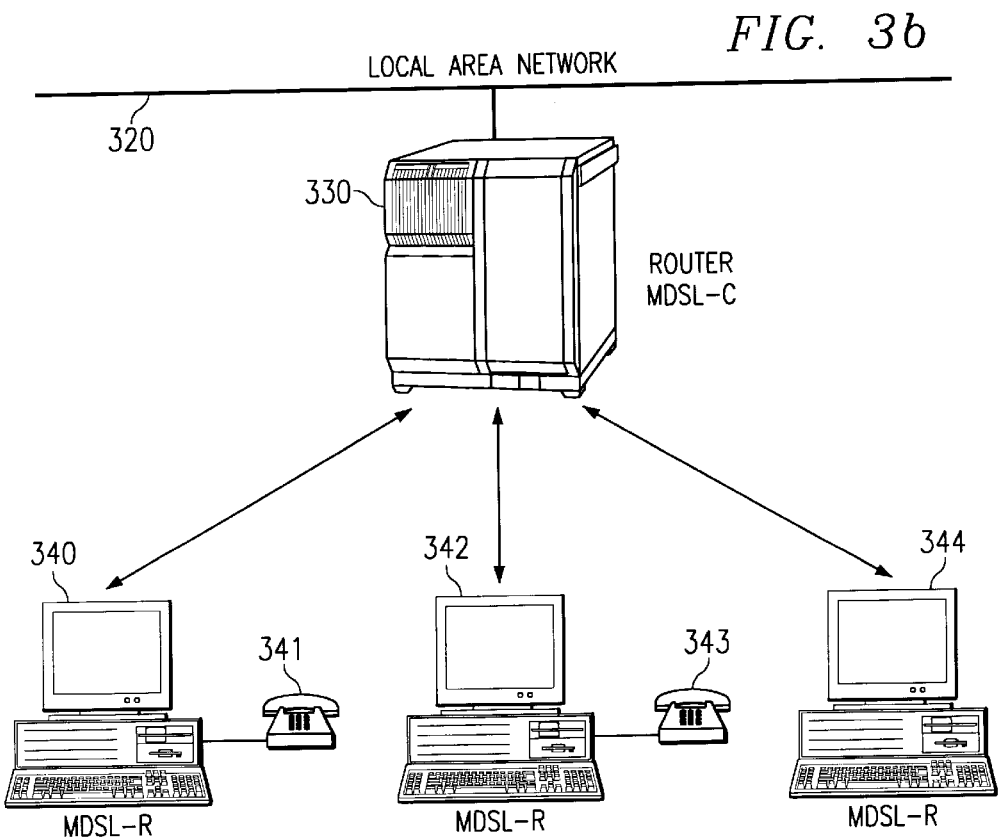

Similarly, FIG. 3b shows a DSL modem acting as a router 330 for a local area network (LAN) 320 and coupling to devices 340, 342, 344 with corresponding DSL modems.

Figure 3C:
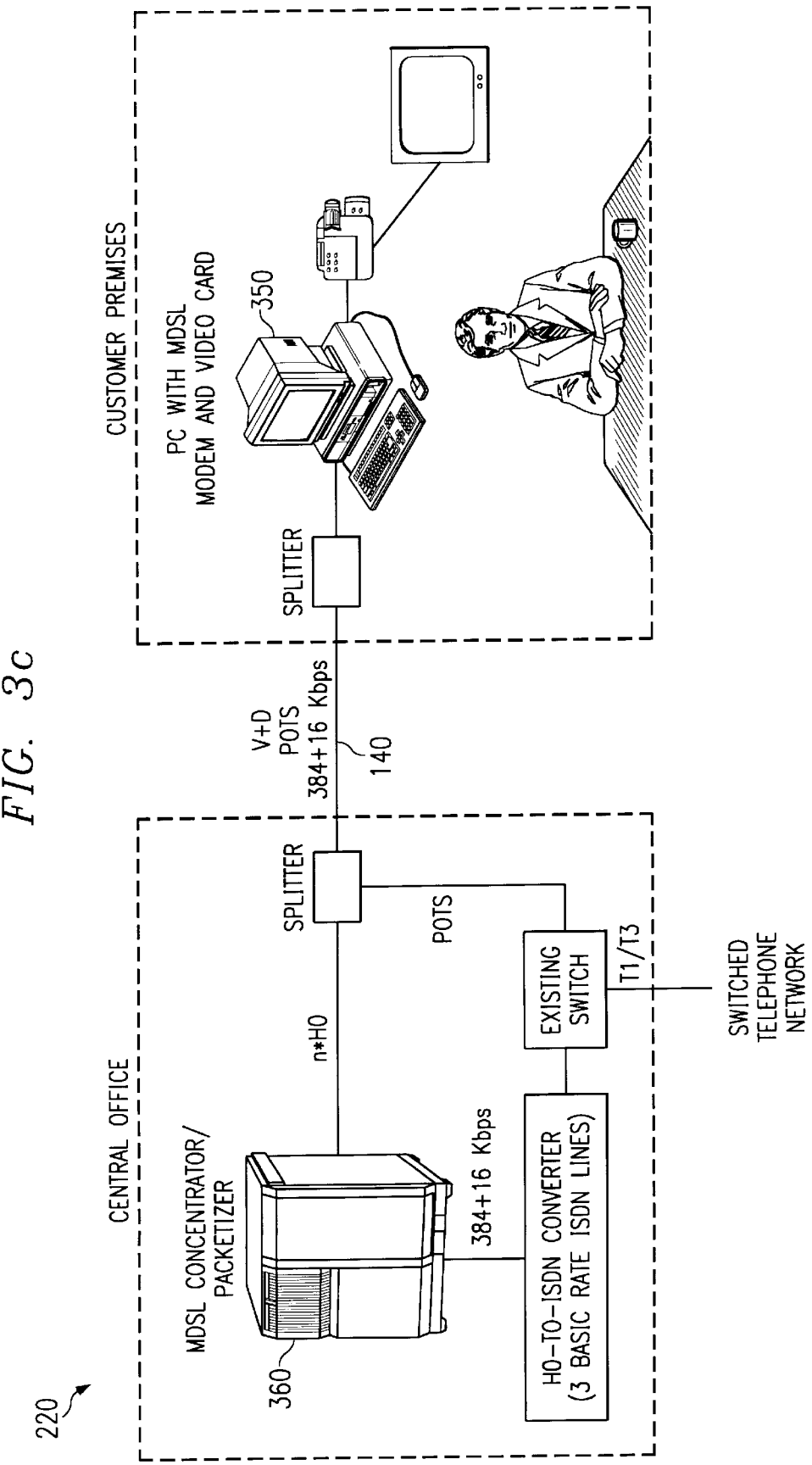

FIG. 3c shows half of a teleconferencing system based on modem 100 in a PC 350. Each teleconferencing end has modem 100 communicating at 384+16 Kbps with a modem in a central office 220. The central office modem transmits data between a concentrator and packetizer 360, and the packetizer converts to the 16 Kbps signaling channel into ISDN like signaling messages and applies the 384 Kbps stream to the T1/T3 service across the public switched telephone network. The central office 220 for the receiving party inverts these operations to feed the receiving modem 100. Traffic in the opposite directions proceeds similarly. Note that POTS can simultaneously be used with modems 100 for the voice in the teleconferencing. An analog delay can be inserted in the POTS output to synchronize with the video.

Figure 3D:
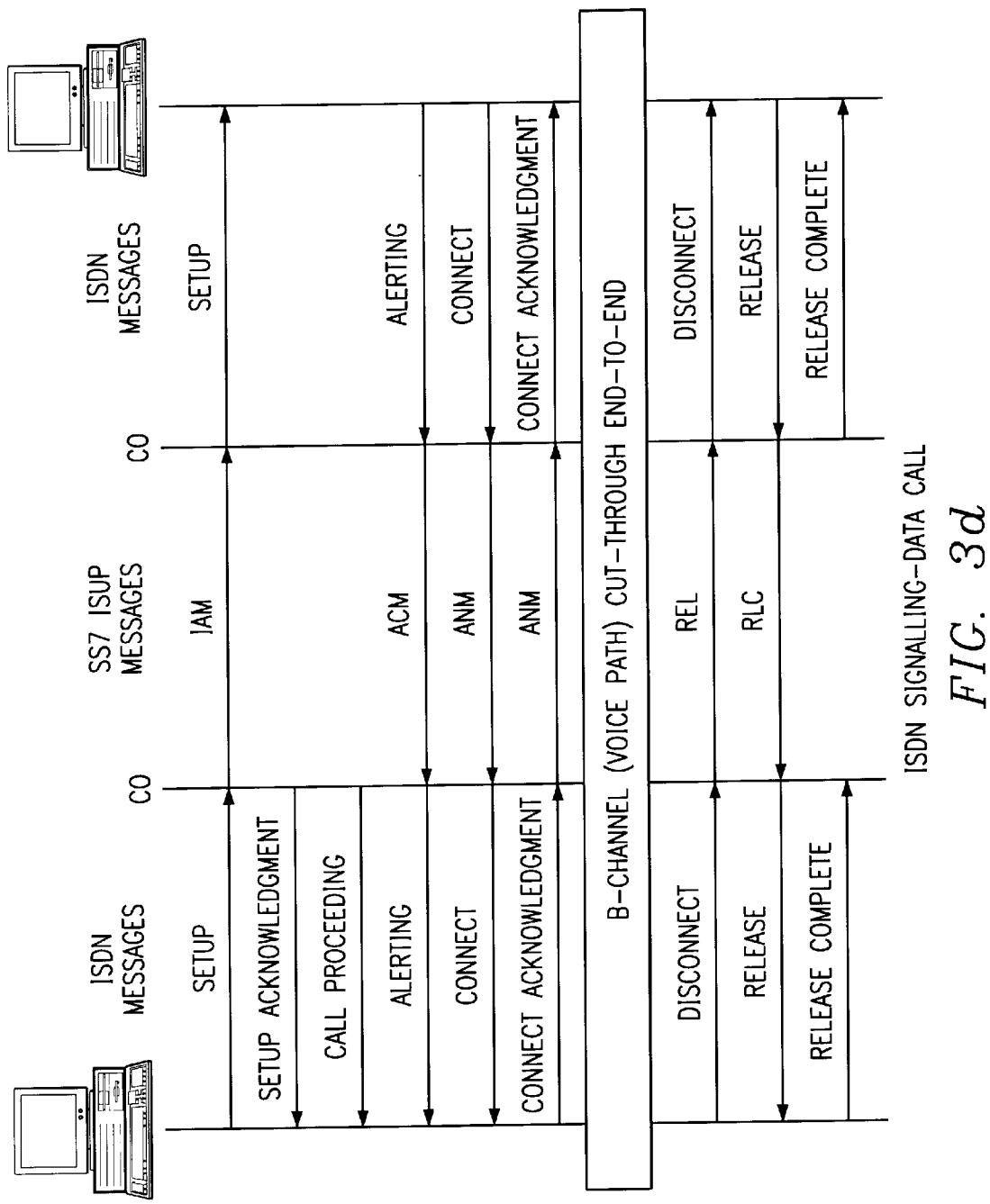
Figure 3E:
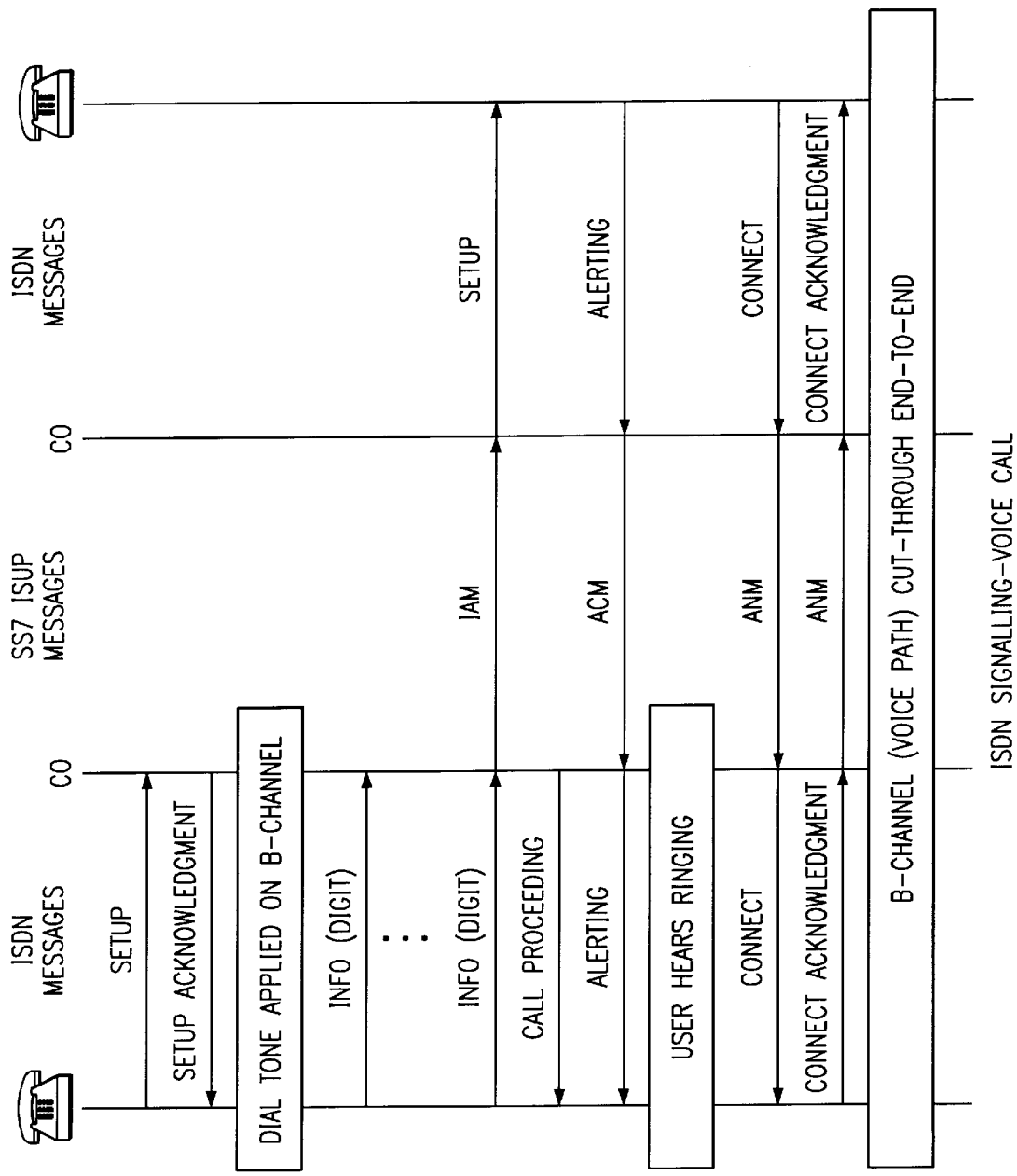

FIGS. 3d and 3e show ISDN-type signaling protocols and messages; modem 100 sends voice or data over the public switched telephone network. The SS7 network provides the backbone for carrying the ISDN user's part (ISUP) messages for call set-up and tear-down through the network.

Figure 5A:
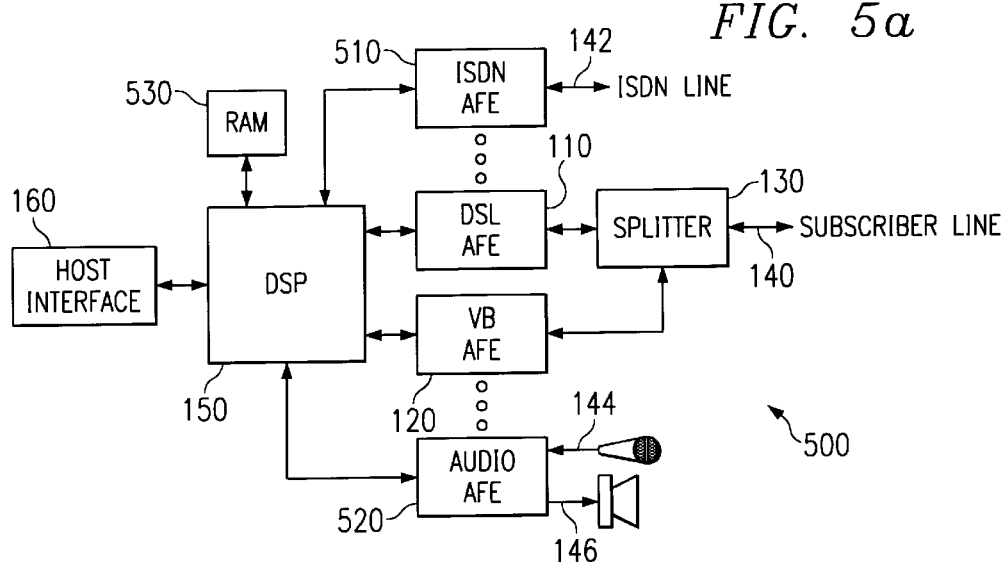
FIGS. 5a–b show another preferred embodiment modem.

FIG. 5a shows multimode modem 500, which includes the modem 100 features of both a DSL AFE 110 and a VB AFE 120, with a splitter 130 for subscriber line 140 connection together an ISDN front end 510 for connection to an ISDN line 142 plus an audio front end 520 for driving a speaker 146 and receiving a microphone 144 output as could be used for supporting a hands-free speakerphone. External RAM 530 may be nonvolatile (EEPROM or Flash EPROM) and/or volatile (SRAM or DRAM). The external RAM 530 may contain various programs for different line codes that may be used by the DSP 150. Such line codes may be DMT, QAM, CAP, PSK, FM, AM, PAM, DWMT, etc.

The transmit part of modem 100 consists of in-phase and quadrature passband digital shaping filters implemented as a portion of QAM transceiver logic; and the receive part consists of a fractionally spaced complex decision feedback equalizer (DFE) with in-phase and quadrature feedforward filters and cross-coupled feedback filters implemented as a portion of QAM transceiver logic. Optionally, the QAM transceiver logic may include a Viterbi decoder.

When modem 500 is active, modem 500 may provide voice-band modem functionality, DSL band modem functionality, ISDN functionality, audio functionality, other line code functionality, etc., or any combinations of the foregoing.

The present invention also includes a system where multiple like and different modems are simultaneously implemented in a single DSP hardware device. For example, voice-band (e.g., V.34), DSL, cable, terrestrial and other wireless and/or satellite modems are implemented simultaneously by the same DSP device. This is now becoming possible with increased processing capabilities of DSP devices. The advantages of this approach are to reduce overall system cost where the system requires multiple modems (e.g., Remote Access Systems (RAS): processing requirements are reduced due to reductions in processing overhead and program and data memory are reduced by sharing program and data memory buffers. For example, program memory is reduced when multiple like modems are executed simultaneously by a single DSP device. Interface and other miscellaneous glue logic are reduced by sharing the same logic between multiple modems, as well as better facilitating for statistical multiplexing and rate control.

In the near-term, the following situations win predominate, but these combinations will expand as DSP MIPS capabilities increase as a natural progression in the semiconductor industry: multiple voice-band modems in same DSP; voice-band and DSL modems in same DSP; voice-band and cable modems in same DSP; multiple DSL modems in same DSP; multiple cable modems in the same DSP; and/or any combination of the above.

Figure 5B:
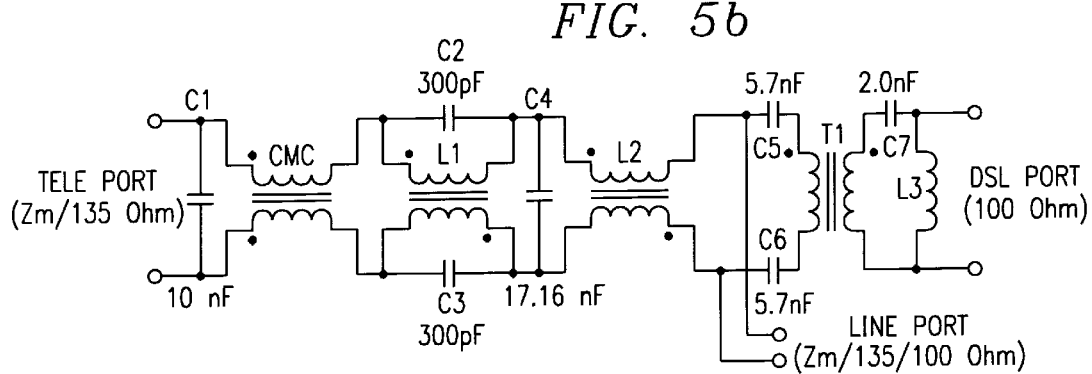

FIG. 5b shows a passive splitter circuit for separation of voice-band and higher frequency DSL band. The splitter also performs impedance matching and ensures an acceptable return loss value for POTS.

Referring now to FIG. 6a, there may be seen a schematic diagram of the interconnection of a telephone 212 and modem 500 to a central office 220, via a subscriber loop 140.

Systems based on the DSL technology and available today are ISDN Basic Rate Access Channel and Repeaterless T1. DSL systems under development are Asymmetrical Digital Subscriber Lines (ADSL), Symmetrical Digital Subscriber Lines (SDSL), and Very-high-bit-rate Digital Subscriber Lines (VDSL). The transmission throughput of a DSL system is dependent on the loop loss, the noise environment, and the transceiver technology.

The noise environment can be a combination of self or foreign Near End Crosstalk (NEXT), Far End Crosstalk (FEXT), and background white noise.

FIG. 6b depicts multiple subscriber loops 140 and, schematically how NEXT and FEXT are generated.

The transmission throughput of DSL for ISDN Basic Rate Access Channel is 160 Kbps. The transmission throughput of HDSL for repeaterless T1 is 800 Kbps. The transmission throughputs of ADSL are between 16 Kbps Ebps to 640 Kbps in the upstream (from a subscriber to a telephone central office) and between 1.544 Mbps to 6.7 Mbps in the downstream. The transmission throughputs of MDSL are presently believed to be 384 Kbps in the upstream and between 384 Kbps to 2.048 Mbps in the downstream.

A passband DSL system can be implemented with a single carrier using Quadrature Amplitude Modulation (QAM) or Carrierless AM/PM (CAP) line codes. A single carrier system depends on the adaptive channel equalizer to compensate for the channel distortion. The channel equalizer usually operates at a multiple of the signaling baud rate. FIG. 6c depicts a block diagram of a CAP transceiver.

More particularly, D/A 614 is connected to transmitter fitters 610, 612 and to filter 616. Filter 616 is connected to channel 620. Channel 620 is connected to filter 630 which is connected to A/D 632. A/D 632 is connected to equalizers 634, 636. A portion of the circuitry 638 recovers the time.

A DSL system can also be implemented with multiple carriers using the Discrete MultiTone (DMT) line code. A DMT system divides the channel into many subchannel carriers to better exploit the channel capacity and to reduce the channel distortion in addition to allowing for a relatively simple adaptive channel equalizer which only compresses the time spread of the channel impulse response rather than correcting it. A simple frequency domain equalizer completes the channel equalization. The signaling band rate of the DMT subchannels is much lower than the band rate of a single carrier system.

FIG. 6d depicts a block diagram of a DMT transceiver. More particularly, IFFT block 640 is connected to D/A 644, which is connected to transmit filter 646 which is connected to channel 650. Channel 650 is connected to alter 660 which is connected to A/D 632 which is connected to equalizer 664, which is connected to FFT block 666. Startup 642 and time recovery 668 circuitry is also included.

One MDSL modem embodiment uses frequency division fu duplex for lower hardware cost and lower crosstalk noise level. Such an MDSL modem will provide a minimum of 384 Kbps full duplex transmission link between a central office and a subscriber for a loop length of up to 21 kft. Under favorable subscriber loop conditions, this MDSL modem can provide a much higher transmission throughput which is limited by channel capacity or the hardware capabilities of the subscriber-end modem. A full feature version of a subscriber-end MDSL modem communicates with ADSL modems at the central office end. The transmitter and receiver parts of the MDSL modem are capable of implementing either CAP or DMT line codes.

Figure 6E:
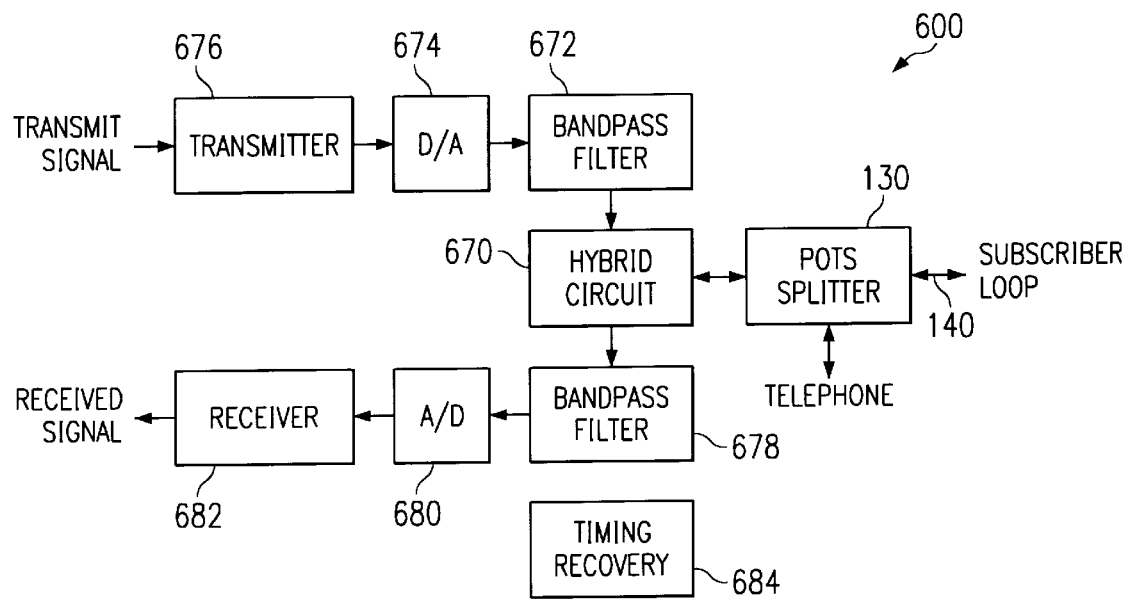

FIG. 6e depicts a block diagram of an MDSL modem 600. Modem 600 has a transmitter 676 connected to a D/A 674 which is connected to a filter 672 which is connected to hybrid circuit 670 which is connected to splitter 130. Hybrid circuit is also connected to filter 678 which is connected to A/D 680. A/D 680 is connected to receiver 682 which outputs the received signal. Timing recovery block 684 is used to recover the central office clock timing.

The purpose of the initialization process is to confirm the MDSL capability of the telephone subscriber loop 140 at both the central office 220 and the subscriber-end 210. The initialization process probes the channel 620, and produces information useful for transceiver training. The process then selects the line code, assuming multiple choices are available, and negotiates the transmission throughput based on the channel limit, traffic condition, or usage tariff.

The initialization process which is described later herein is: channel probing, line code selection, rate negotiation, and transceiver training.

An MDSL modem at the subscriber-end sends probing tones in the upstream band for a certain duration, with or without phase alternation for a part of these tones, according to a predefined time sequence. After the first time duration, the MDSL modem at the central office end responds with channel probing tones in the downstream band, again, with or without phase alternation for a part of these tones. This initial channel probing period may be repeated, if desired or necessary.

After the initial channel probing period, the MDSL modem at the subscriber-end has determined the line code capability of the central office end modem and has a channel model for the downstream band and, similarly, the MDSL modem at the central office end has determined the line code capability of the subscriber-end modem and has a channel model for the upstream band.

After the channel probing period, the MDSL modem at the subscriber-end should indicate/confirm its line code capability/preference by sending signature tones for a predefined time duration. Similarly, the MDSL modem at the central office end should respond/confirm the line code selection by sending signature tones for a predefined time duration. This signature tone exchange process is preferably repeated for a limited number of times to determine a particular line code choice.

Another set of signature tones is then exchanged between MDSL modems at both ends for the transmission rate negotiation. The MDSL modem at the subscriber-end sends its rate capabilities and its preference. The MDSL modem at the central office end responds with its capabilities and its rate selection. MDSL modems determine a rate choice with a predefined rate change procedure described later herein. The transmission rate preference at the subscriber-end depends on the line condition, hardware capability, and user choice or application requirements. The transmission rate preference at the central office end depends on the line condition and the traffic load. Preferably, rate change during a communication session due to line condition change or user choice is allowed.

After the rate negotiation, the MDSL modems at both ends start transceiver training according to the conventional methods. Different time domain training sequences may be used for different line codes. It is an option to use the channel models obtained during the channel probing step to speed up the transceiver training process.

Figure 6F:
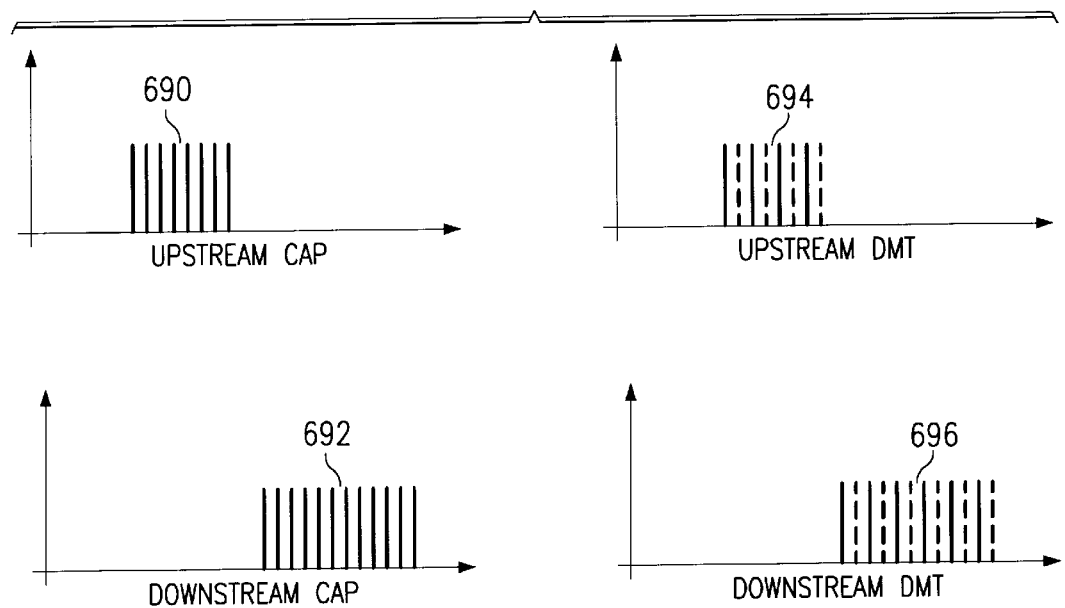

The spectra of upstream and downstream probing tones are depicted in FIG. 6f. The upstream CAP tones 690 and downstream CAP tones 692 are depicted on the left side, while the upstream DMT 694 and downstream DMT 696 are depicted on the right. The "broken" lines in the DMT spectra represent phase shifts.

For simplicity, all frequency tones are assumed to be equally spaced with frequencies $i\Delta f$, amplitude $a_i$, and phase $\Phi_i$ (usually it is either 0 or $\pi$). At the receiver, the amplitude and phase of the received tones may be detected. The detected amplitude and phase of i-th frequency tone are $b_i$ and $\phi_i$ respectively. Assuming that there are N probing tones, the frequency response of the equivalent channel including filters at frequency $i\Delta f$ is $$v_i = \frac{b_i}{a_i} \theta^{-j(\phi_i - \varphi_i)}, \; i = 0, \ldots, N-1. \tag{A}$$

The impulse response of the equivalent channel can be calculated by a fast Fourier transform as $$h_k = \sum v_i \theta^{-2j\pi\Delta fT/K}, \; k = 0, \ldots, m \tag{B}$$

where T is the sampling period. The frequency spacing $\Delta f$ depends on the spread of the channel impulse response. For a channel impulse response spread of n sampling periods, $$\Delta f \leq B|n = N\Delta f|n \tag{C}$$

where B is the total bandwidth of interest.

To distinguish from two different line codes, the phase of adjacent tones may be reversed by 180° for one of the line codes. This line code could be DMT. To identify different line codes after channel distortion, select $$\Delta f = \frac{B}{2n}.$$

For a channel spread of 30 samples and a bandwidth of 100 Khz, select $\Delta f \approx 1.7$ MHz and N as 64.

The channel probing tones should at least last more than a few times of the channel spread. With possible phase alternation, the channel probing tone duration should be 4 to 10 times of that necessary for the channel model recovery.

Using N tones, we can represent $M = 2^N$ different messages in a unit time period with constant tones. Because the available vocabulary grows exponentially with the number of tones used, the useful messages may be sent with a small set of tones, e.g. only two, three, or four different frequencies.

The following is a list of example messages.

384 Kbps/CAP
768 Kbps/CAP
1.544 Mbps/CAP
2.048 Mbps/CAP
384 Kbps/DMT
768 Kbps/DMT
1.544 Mbps/DMT
2.048 Mbps/DMT
Prefer Highest Rate
Prefer Best Price
Packet Multiplexing Allowed
Only Low Rate Available Tones can be generated by an IFFT operation as used for the DMT line code. A unit magnitude and zero/180° phase vector signal is fed into the IFFT operation for the channel probing purpose. Selected zero phase vectors are used for the generation of signature tones.

Tones can be recovered by an FFT operation also as used for the DMT line code. The amplitude and phase information of each tone is recovered as a complex vector. A common phase difference due to the random sampling phase is calculated. Compensation produces a complex vector which is then used for calculating the channel transmission throughput and the channel impulse response, which might be used for transceiver training.

If the MDSL service is available through the telephone loop, the MDSL modem at the central office end should be on and monitor the upstream frequency band for probing tones.

Once power is on or a user service request is made, the MDSL modem at the subscriber-end sends upstream probing tones for a predefined time period and then monitors downstream probing tones. The MDSL modem at the central office end detects the probing tones, compensates for the random phase, stores them, and calculates the upstream channel transmission throughput. Meanwhile, the central office end MDSL modem sends the probing tones in the downstream frequency band.

The MDSL modem at the subscriber-end detects the probing tones, compensates for the random phase, stores them, and calculates the downstream channel transmission throughput. The subscriber-end MDSL modem then sends signature tones in the upstream band to indicate line code and transmission rate preferences.

The MDSL modem at the central office end detects the signature tones and responds with signature tones corresponding to its preferred offering. The subscriber-end MDSL modem then sends signature tones to confirm the offering or to request offering modification. The MDSL modems go into a transceiver training period after the confirmation of modem offering.

The throughput capacity of the DSL communication channel will change with line conditions and/or network accessibility. Line conditions dictate the achievable throughput of the physical connection between the CO and the residence. Network accessibility describes the capability of the service provider's connection lining the DSL channel to the backbone network. The invented rate negotiation method incorporates a detailed understanding of the capacity-limiting factors of a DSL system.

DSL systems are traditionally engineered for the worst-case line condition for which service is to be provided. This approach simplifies the general installation procedure for telephone companies. However, restricting the DSL transmission throughput to that achieved in the worst-case line condition leaves most DSL systems operating well below their potential. The invented method provides a systematic procedure for maximizing the physical transmission throughput of each Local loop, enabling most DSL modems to operate at much higher rates than traditionally engineered. In fact, this method enables a majority of DSL modems to achieve a transmission throughputs which are only limited by the capabilities of the modem hardware. The rate negotiation method also provides time-varying adaptation in order to maintain the highest possible throughput as Line conditions or network accessibility changes.

Figure 4A:
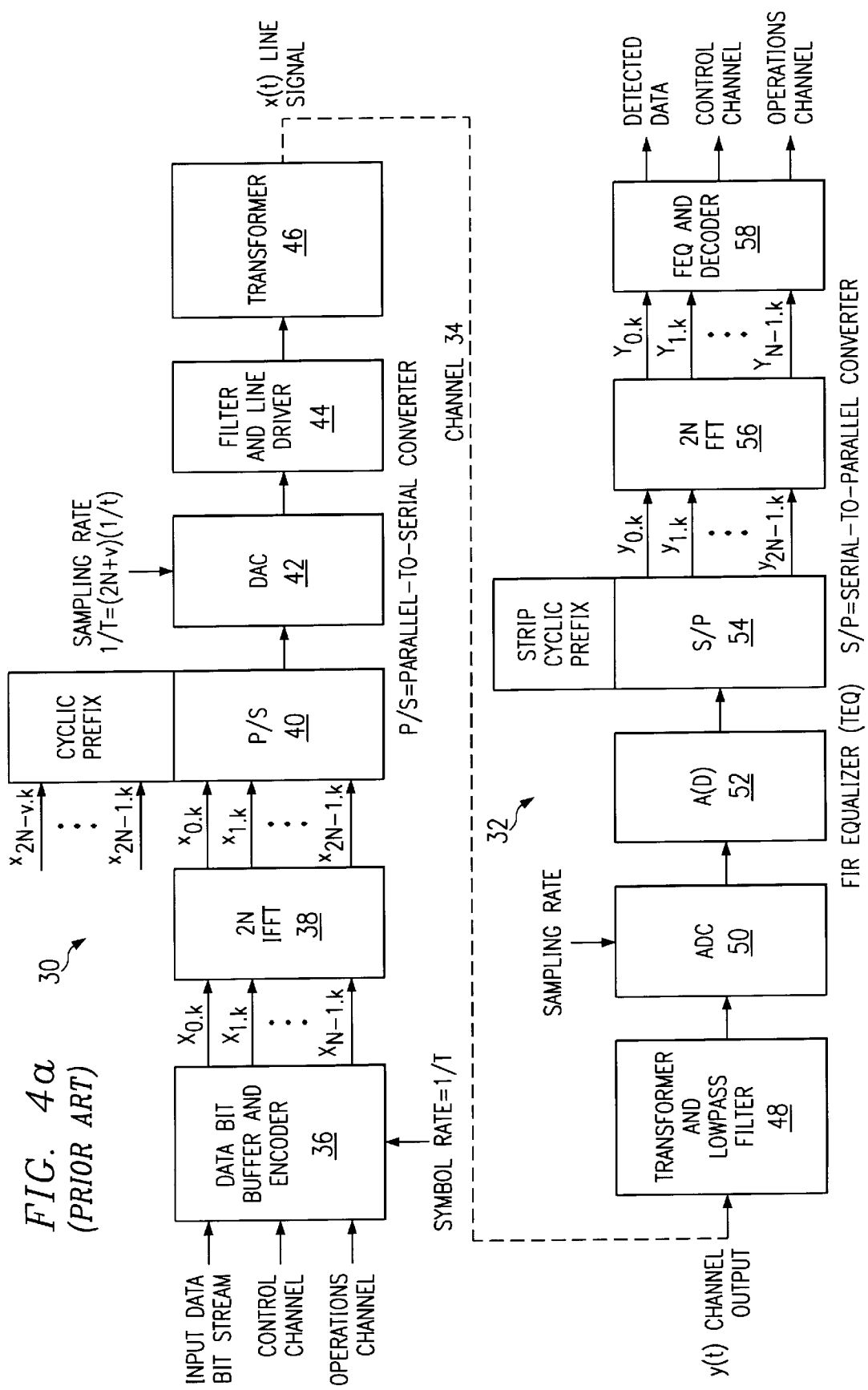
FIGS. 4a–c show prior art modems plus subscriber line capacity.
Figure 4B:
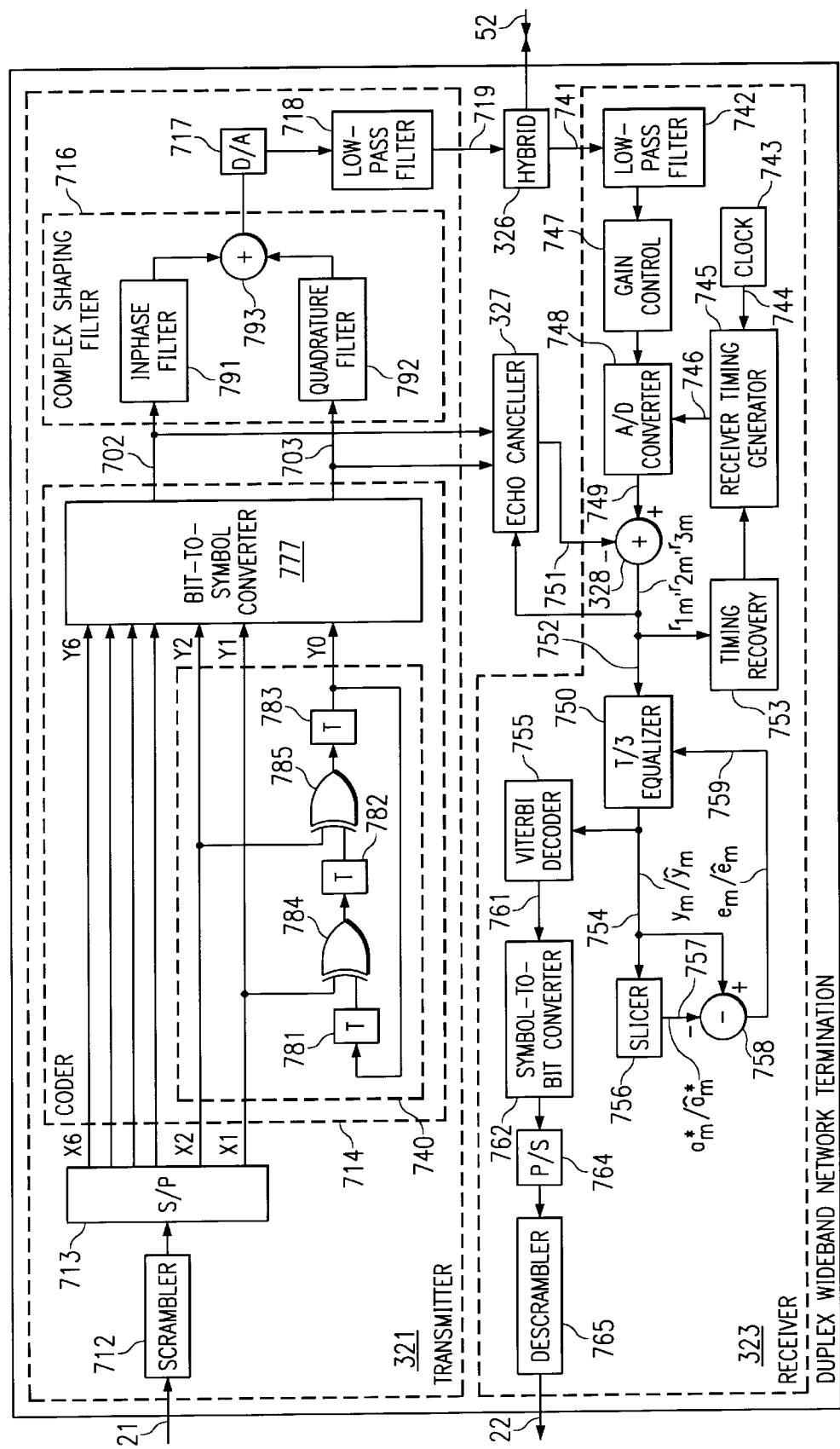
Figure 4C:
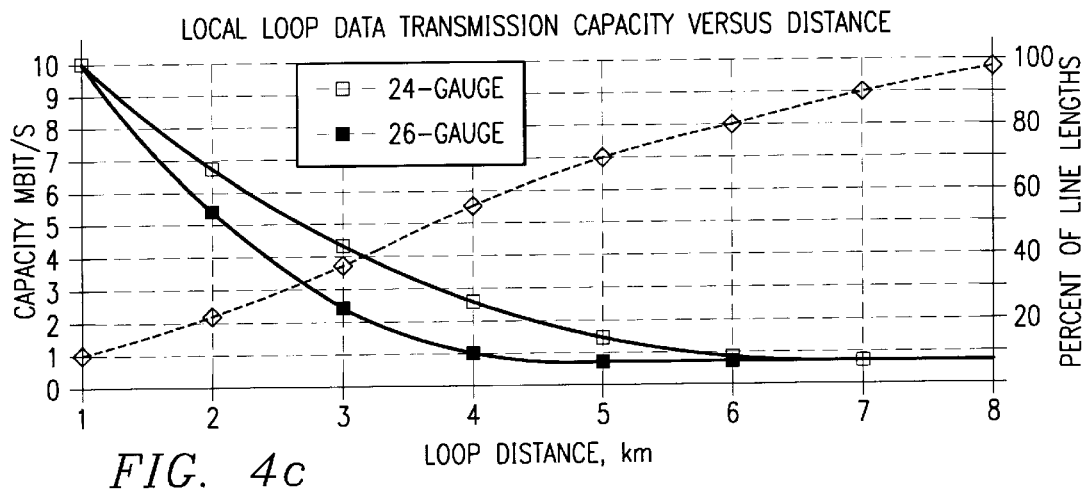

The physical throughput of the twisted-pair DSL channel is limited by the receiver's ability to reliably distinguish the transmitted signal in the presence of noise and interference. The maximum possible throughput is upper bounded by the theoretical channel capacity of the physical link, such as depicted in FIG. 4c. The channel capacity of the link is determined by the bandwidth used, the received signal characteristics, and the noise and interference. The rate negotiation method will increase the DSL reach by providing low-rate options that can be supported by extremely long telephone subscriber loops while providing high-rate options that allow DSL modems operating on shorter loops to achieve a higher throughput.

The rate negotiation method considers the dynamic nature of the DSL transmission medium. The DSL is a time varying channel whose capacity may change due to improving/degrading channel conditions. As the channel conditions change, the theoretical maximum throughput also changes. The time-varying nature of the channel characteristics dictates the need for rate negotiation techniques to achieve the most efficient use of the channel over time. This provides the capability for maintaining a DSL connection during periods of difficult channel characteristics by lowering the throughput. This also enables the modem to increase the throughput and make the best use of the connection during periods of favorable channel characteristics. Ideally, the transceiver at each end can monitor the channel and maximize their throughput as conditions vary. A practical transmitter/receiver can be designed that increases or decreases throughput of the physical channel based on the available capacity, the available signal processing resources, and the requirements of the specific applications. Several rate adaptation methods exist (e.g. the standard CCITT V.34 Voiceband Modem Standard), but two particularly convenient techniques are discussed later herein for two distinctly different modulation methods. However, the techniques for rate adaptation are easily extended to other modulation and coding schemes, and such extensions are considered part of the present invention.

Network accessibility in this context describes the rate and/or delay associated with the transfer of data from the local loop to the backbone network. This measure might be affected by the specific backbone network used (e.g. Internet, ATM, etc.), the bandwidth given by the service provider, and the amount of network traffic. The techniques defined in this invention are not restricted to use on a particular backbone network.

Although a VRDSL connection is capable of certain transmission throughput, the total throughput might not be connected to corresponding CO backbone networks at times. For VRDSL-provided services going through the PSTN (Public Switched Telephone Network), connections will be made only when services are initiated. For VRDSL-provided services terminated at the local CO, such as internet access, leased line or dial-up line connections with certain throughputs can be made depending on the preferred cost structure. The available CO backbone throughput to each VRDSL modem can be different at different times. The subscriber-desired throughput could also vary for different applications.

With actual throughputs lower than that provided by the VRDSL physical transmission Rink, traffic concentration can be realized at CO backbone networks. Statistical multiplexing can also be realized by using a separate analog front end for each CO VRDSL modem. The required number of corresponding digital portions can be less than the number of analog front-ends, depending on the traffic behavior. In the extreme case, the digital portion of the CO VRDSL modem can be multiplexed among active VRDSL links by using the voice-band as a traffic indicating channel and keeping a copy of the digital state portion of the modem inside RAM.

Figures 7A, 7B, 7C:
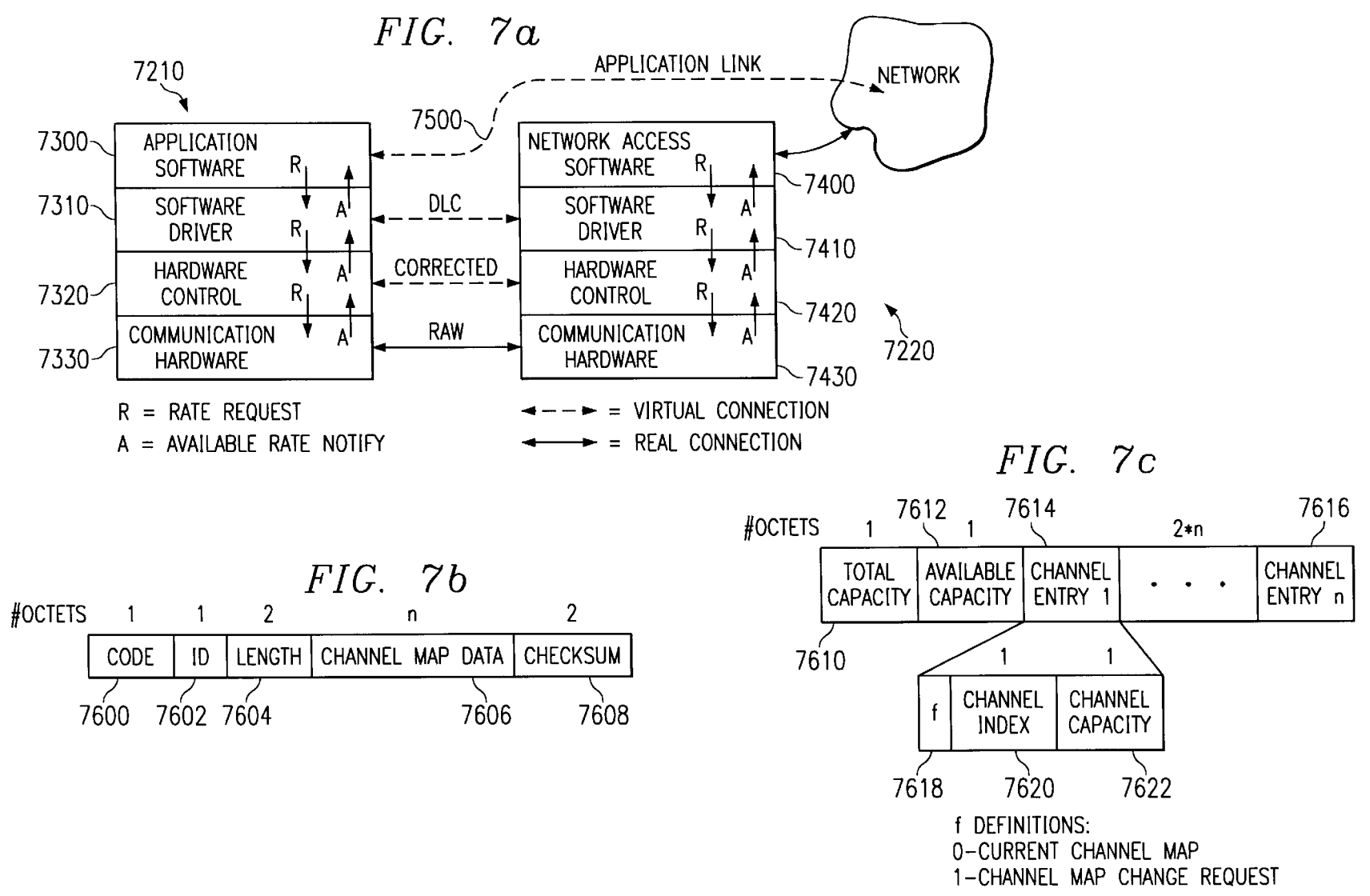

The VRDSL communications model is depicted in FIG. 7a. The sole purpose of this model is to aid in understanding the disclosed rate-negotiation technique. The model is composed of separate residence 7210 and central office 7220 layered representations of functional separation. The functionality of the residence terminal 7210 is shown on the left. The lowest layer 7330 is the Communication Hardware Layer, which contains the modulator/demodulator, signal conditioning, timing, synchronization, and error-correction coding. This layer can also be referred to as the data pump layer. The second layer 7320 is the Hardware Control Layer. This layer provides framing control and other data packaging functions that better organize the data received by the lower layer. The third layer 7310 is the Software Driver Layer. This layer provides an interface between the hardware levels and the application programs run at the residence. The fourth (top) layer 7300 is the Application Software Layer, which contains all functions provided by the application programs run at the residence. This layer encompasses both the software to manage the throughput allocated to different simultaneous applications as well as the application programs themselves. Conventional software application programs request a channel and accept the available throughput provided by the lower layers (no negotiation). Future generations of software application programs might have the requirement and capability for rate negotiation.

The CO 7220 portion of the model also contains four layers. The bottom three layers 7430, 7420, 7410 are very similar to the residence side of the model. (However, the actual implementation can be radically different.) The fourth (top) layer 7400 in the CO is called the Network Access Software Layer. This layer provides the functions required for interfacing the DSL connection to the backbone network.

In the rate negotiation method, each layer of the model communicates and interacts with the layer below and above. A standard protocol for communication between layers is defined. As shown in FIG. 7a, a layer can indicate R (Rate request) to a lower layer in order to initiate a rate negotiation; "R" is depicted in FIG. 7a along with a corresponding downward arrow. The lower layer can indicate A (Available Rate Notify) to the upper layer to inform the upper layer of the achievable rates; "A" is depicted in FIG. 7a along with a corresponding upward arrow. The meaning of the R and A information is different for the different layer interfaces, however, the process of negotiating is similar.

A rate table is defined as a common syntax for the R and A signaling sign between layers. The rate table defines the rates that a particular layer can attempt to achieve. (In general, this will be defined by the hardware limitations of the modem.) During a rate request (R), an upper layer might signal a lower layer of a desire to change the rate structure. If the lower layer is able to reconfigure itself to a new set of operating parameters and achieve the requested rate, then it will do so and indicate this to the upper layer. If the lower layer determines the requested rate to be unacceptable, the upper layer is informed along with information about the rates that are available under the present operating conditions (A).

A lower layer can also initiate rate negotiation if the operating conditions change due to lower or higher achievable throughputs. The upper layer is formed of the new set of achievable rates (A). The upper layer can then respond with a rate request based on the new conditions (R).

This common layer interface simplifies the rate negotiation method. Although the parameters of the rate table are different at each layer interface, the interaction methods are similar.

Each layer can conceptually view the communication link as being between it and the corresponding layer at the other end of the DSL connection.

As shown by the lines connecting the corresponding layers in the residence and central office:

1. The Communication Hardware Layers 7330, 7430 in the residence and CO are connected by a non-virtual 'Raw' connection. This is the physical connection over which the actual modulation occurs.
2. The Hardware Control Layers 7320, 7420 can view the communication link as a virtual 'Corrected' data stream. This is the actual throughput of the channel after the physical timing, synchronization, control, and error-correction coding redundancy symbols have been removed.
3. The Software Driver Layer 7310, 7410 views the connection as a virtual channel called the data link channel (DLC). For convenience, the DLC may be a frame structure that represents multiple N kbit/sec channels (N=16 or 64 e.g.). In addition, a control channel may be specified. This control channel may either be embedded in the lower layer channels or can be completely separated from the DSL connection. For example, the control signaling might be implemented hi the voice-band via a v.34 modem connection.
4. The Application Software Layer 7300 sees a virtual 'Application Link' 7500 to some data providing location of interest in the CO or the backbone network.

The basic requirement for rate adaptation is the rate table, a well-defined set of achievable rates that can be communicated to the upper layers of the DSL communication model. The rate-table is determined by the capabilities of the hardware at both ends of the connection. During startup or reset, a pair of modems must agree upon the rate table entries which they are both capable of supporting. The allowed rates under a given channel condition are then represented as legal states in the table. The different levels of the model can communicate via the rate-table syntax without concern for detail in other layers. This rate table can vary substantially from one modulation and/or coding scheme to the next, but the concept of allowed and disallowed rates depending on channel conditions does not change.

The following describes how rate negotiation between the Hardware Control Layer 7320, 7420 and the Communication Hardware Layer 7330, 7430 is performed in accordance with the teachings of the present invention. Modulation parameters are allowed to vary to accommodate various rates, and the layers interact using the rate. The following describes two possible modulation based rate adaptation techniques and examples of rate tables that can be shared between the bottom two layers in the DSL communication model.

In the case of high-rate serial transmission of digital data, digital symbols are chosen to represent a certain number of bits, say N. Groups of N bits are mapped into symbols which are transmitted over the channel. At the decoder, a decision is made to determine the transmitted symbols. If the correct decision is made, the transmitted bits are decoded correctly.

A method of changing the throughput changes the number of bits represented by each symbol while keeping the symbol rate constant. Increasing the number of bits represented in each symbol increases the number of transmitted bits, albeit at lower noise immunity. Decreasing the number of bits per symbol increases the noise immunity and improves the robustness of the transmission, but at the expense of a lower throughput. The bandwidth remains the same in either case.

Another straightforward method of varying the throughput is changing the bandwidth used in the transmission channel. By expanding the bandwidth, a greater number of symbols can be transmitted over the channel in a given interval. The symbol rate is roughly proportional to the bandwidth. However, the processing requirements of the DSL modem also increase with the bandwidth; higher bandwidth requires greater computation for modulation/demodulation. The maximum usable bandwidth might either be restricted by channel conditions or modem hardware processing capability constraints.

First, a set of parameters describing the communication link and the set of values which the parameters may assume is defined.

Let the nominal serial transmission rate be R. Define the minimum rate step by which a DSL modem can change as dR. If the minimum rate is $R-2*dR$ and the maximum rate is $R+2*dR$, then the set of achievable rates is given by $\{R-2*dR, R-dR, R, R+dR, R+2*dR\}$. For example, let R=300 kilo-symbols/second, and dR=100 kilo-symbols per second. The set of achievable rates become {100, 200, 300, 400, 500} kilo-symbols/second.

Let N represent the number of bits conveyed by each transmitted digital symbol. For example, a VRDSL modem might support operation with N in the set $\{2,3,4,5\}$. The higher values of N will convey more bits in a given period, but will also result in lower tolerance to noise.

Using the R and N rate parameters and assuming they are allowed to independently assume the values above, a rate table can be defined as follows:

TABLE 2

Serial transmission (e.g. CAP) rate table example.

|  | R = 1e5 | R = 2e5 | R = 3e5 | R = 4e5 | R = 5e5 |
| --- | --- | --- | --- | --- | --- |
| N = 2 | 200 Kbits/s | 400 | 600 | 800 | 1000 |
| N = 3 | 300 | 600 | 900 | 1200 | 1500 |
| N = 4 | 400 | 800 | 1200 | 1600 | 2000 |
| N = 5 | 500 | 1000 | 1500 | 2000 | 2500 |

The rates R in Table 2 are given in units of symbols/second and are illustrated in scientific notation in the table for brevity. The table entries show the achievable transmission throughputs in kilobits/second for a given rate R and N bits represented by each symbol.

Discrete multi-tone (DMT) modulation transmits low-rate data symbols over parallel subchannels. By splitting a high-rate serial data stream into multiple low-rate data streams that are transmitted in separate subchannels, the system can be tailored to better match a frequency selective channel. Good portions of the overall bandwidth (those subbands with high signal-to-noise ratio (SNB)) are used to transmit symbols with a larger number of bits/symbol. An unequal number of bits are assigned to different subchannels, depending on the available capacity of each subchannel. Essentially, the data can be distributed among subchannels in a manner allowing very efficient use of the overall bandwidth.

As with the high-rate serial data stream, the overall bandwidth of a DMT system can be increased or decreased according to the overall desired throughput, channel conditions, and modem hardware capabilities. Additionally, DMT modulation provides the capability of dropping or adding bandwidth a single subchannel at a time. For a DMT system with a large number of subchannels, this creates a very large selection of possible bandwidths. If desired, the number of subchannels can be varied while keeping the overall bandwidth fixed.

For simplicity, consider a DMT system where the subchannel bandwidth remains constant, but the overall channel bandwidth used is controlled by the number of subchannels used. Let T represent the number of subchannels or tones used in transmission. Let N represent the average number of bits/symbol across the subchannels. N is no longer restricted to be an integer as with the high-rate serial transmission system. For this example, however, consider N to be approximately an integer valued. The following is an example of a rate table for DMT:

TABLE 3

DMT transmission rate table example.

|       | T = 32     | T = 64 | T = 96 | T = 128 | T = 160 |
|-------|------------|--------|--------|---------|---------|
| N = 2 | 200 kbits/s| 400    | 600    | 800     | 1000    |
| N = 3 | 300        | 600    | 900    | 1200    | 1500    |
| N = 4 | 400        | 800    | 1200   | 1600    | 2000    |
| N = 5 | 500        | 1000   | 1500   | 2000    | 2500    |

The parameter T represents the number of subchannels where each subchannel has a bandwidth of approximately 3.3 Khz. N represents the average number of bits/symbol represented fin all the subchannels. The table entries are given in kilobits/second.

An actual DMT rate table might add or drop subchannels by increments of one. Also, the number of bits assigned to each subchannel can be independently controlled. Thus, the DMT rate table has the potential for very small rate increment adjustments.

The Software Driver Layer 7310, 7410 communicates with the Hardware Control Layer 7320, 7420 by means of a rate table very similar to those previously discussed. However, the table parameters and table entries will be different. After synchronization, demodulation, error-correction decoding, and the stripping of hardware control bits, the resulting rate table for either of the underlying modulation schemes considered above might be:

TABLE 4

Rate Table Used for Interaction Between
the Software Driver Layer and the Hardware Control Layer

|       | cr1        | cr2 | cr3  | cr4  | cr5  |
|-------|------------|-----|------|------|------|
| N = 2 | 192 kbits/s| 384 | 576  | 768  | 960  |
| N = 3 | 288        | 576 | 864  | 1152 | 1440 |
| N = 4 | 384        | 768 | 1152 | 1536 | 1920 |
| N = 5 | 480        | 960 | 1440 | 1920 | 2400 |

The column parameters are labeled as different channel resource modes (cr1, cr2 . . . cr5), while the row parameters correspond to the average number of bits represented by each symbol. The entries represent the achievable rates for the 'Corrected' data stream in the VRDSL model.

Rate adjustment information between the Application Software Layer 7300, 7400 and the Software Driver Layer 7310, 7410 can either be specified in terms of a rate table or the total available throughput. For simplicity, the Software Driver Layer can indicate the total available rate to the Application Software Layer. Management functions in the Application Software Layer allocate portions of the total throughput to various software application programs. The following provides a conceptual view of partitioning and managing the total data throughput.

Rate negotiation in the data link layer is initiated by the following events in VRDSL:

A request for changing the current allocation of the data connection or channels in VRDSL such as requesting a new channel or changing an existing channel rate When VRDSL physical layer detects a total channel capacity change either total channel capacity increase or decrease After the initialization of VRDSL, a control channel (for example, of 16 Kbps) has been allocated as an initial channel connection. This control channel will be reserved during the whole physical line connection time. It is used to send/receive all the control information including rate negotiation information.

Rate negotiation in the data link layer can be described as a number of signal data formats and a finite-state automation.

The rate negotiation signal data are encapsulated in the Data Link Control Protocol such as the information field of the PPP data link layer frame structure. The protocol field indicates type 0xc024 for VRDSL rate negotiation protocol. The packet format is depicted in FIG. 7b.

Code: The Code field is one octet and identifies the kind of rate negotiation packet. Code 1–11 has been reserved for PPP LCP. It has the following special definitions for VRDSL:

13 Channel map change Request

14 Channel map change Nak

15 Channel map change Reject

16 Channel map change Ack

ID: The ID field is one octet and aids in matching requests and replies

Length: The Length field is two octets and indicates the length of the whole rate negotiation signal data packet.

Channel Map Data: The Channel Map Data Field is 2 or more octets which reflects the current channel allocation in the VRDSL line and the request for a channel change. It contains its own header and two parts of information represented by channel entry field:

Current channel map

Channel map change request

These two parts of information are all described by the 2 octet channel entry field. The way to distinguish them is that for channel map change request, the most significant bit of the channel entry is set high.

The Channel Map Data field is depicted in FIG. 7c.

When the code is 14 (Channel Map Change Nak), the Channel Map Data field contains: Total Capacity, Available Capacity, the current channel map and one or more channel entries which have been Naked. These Naked channel entries are flagged by their most significant bit (msb). When the code is 15 or 16, the Channel Map Data field contains: Total Capacity, Available Capacity and current channel map data.

Checksum: The Checksum field is computed using the standard TCP/IP algorithm: the one's complement of the sum of all 16-bit integers in the message (excluding the checksum field).

Figure 7D:
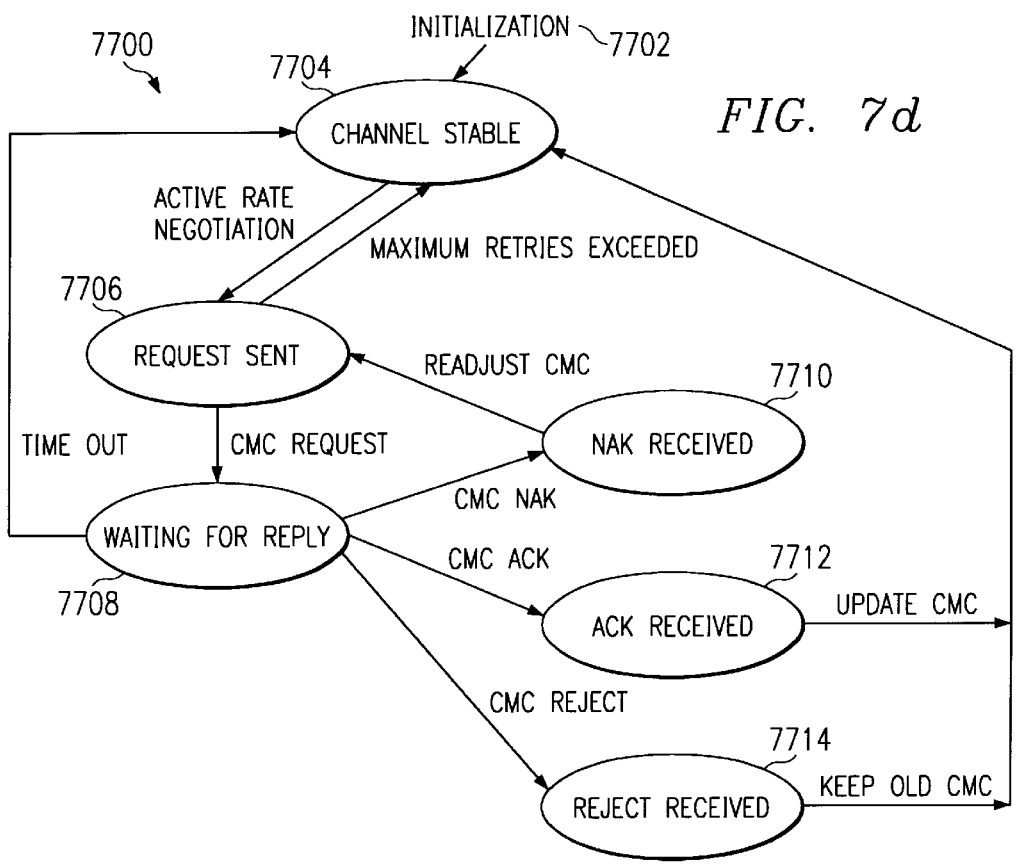
Figure 7E:
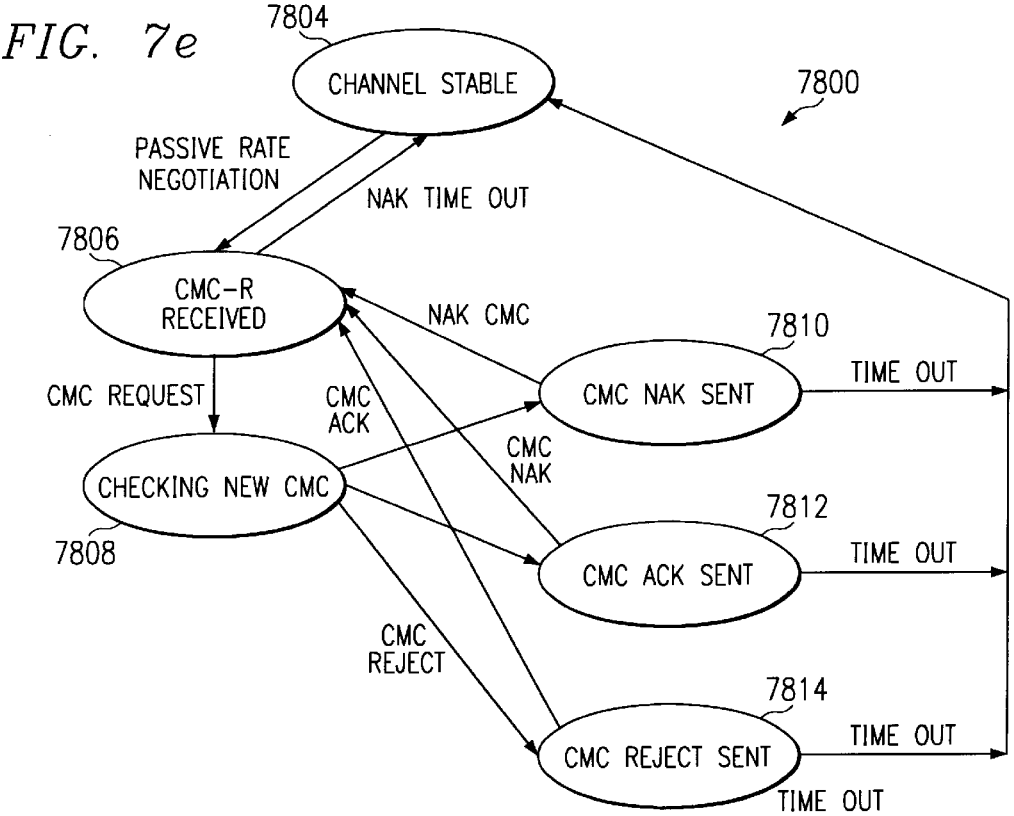

The Link Layer Rate Negotiation is also called Channel Map Change (CMC) in VRDSL. A CMC procedure is described by the state change triggered by a specific event and action. FIGS. 7d and 7e depict state diagrams for the link layer rate negotiation during an active and passive CMC process, respectively.

Figure 7F:
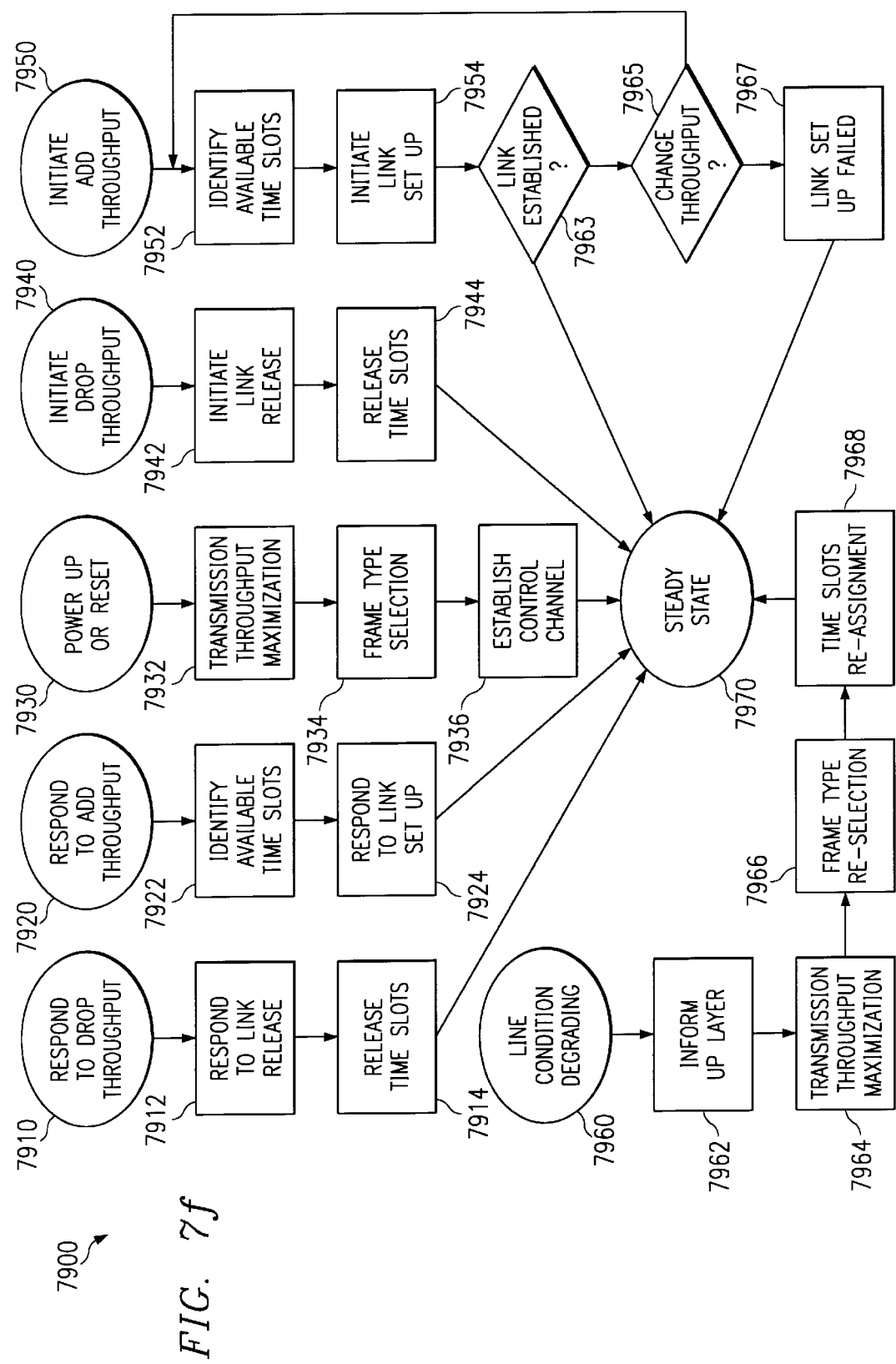

Based on the VRDSL communication model, modem hardware capable of varying the transmission rate, and variable-rate management software, the rate negotiation method shown in FIG. 7f may be employed. FIG. 7f depicts a simplified functional diagram of the overall rate negotiation method.

Figure 8A:
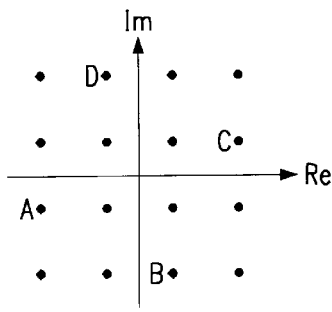
FIGS. 8a–c show preferred embodiment synchronization.

Current QAM based voice-band modems make use of a handshake sequence between calling and answering modems to initialize their communications. To gain synchronization, the answering modem transmits alternating symbols of the corresponding constellation points. As an example, V.32 modems use the constellation points A,B,C, and D in FIG. 8a in the synchronization process. The answering modem transmits alternating symbols ABABAB . . . for a duration of 256 symbols. After 256 symbols, the alternating symbols CDCDCD . . . is transmitted for 16 symbols. The transition period between the two symbol sequences provides a well-defined event that may be used for generating a time reference in the calling modem receiver. After the second symbol sequence the answering modem will start transmitting a symbol sequence that is known by both modems. This sequence is used to train the equalizer at the calling modem receiver. FIG. 8a depicts a V.32 training constellation.

Figure 8B:
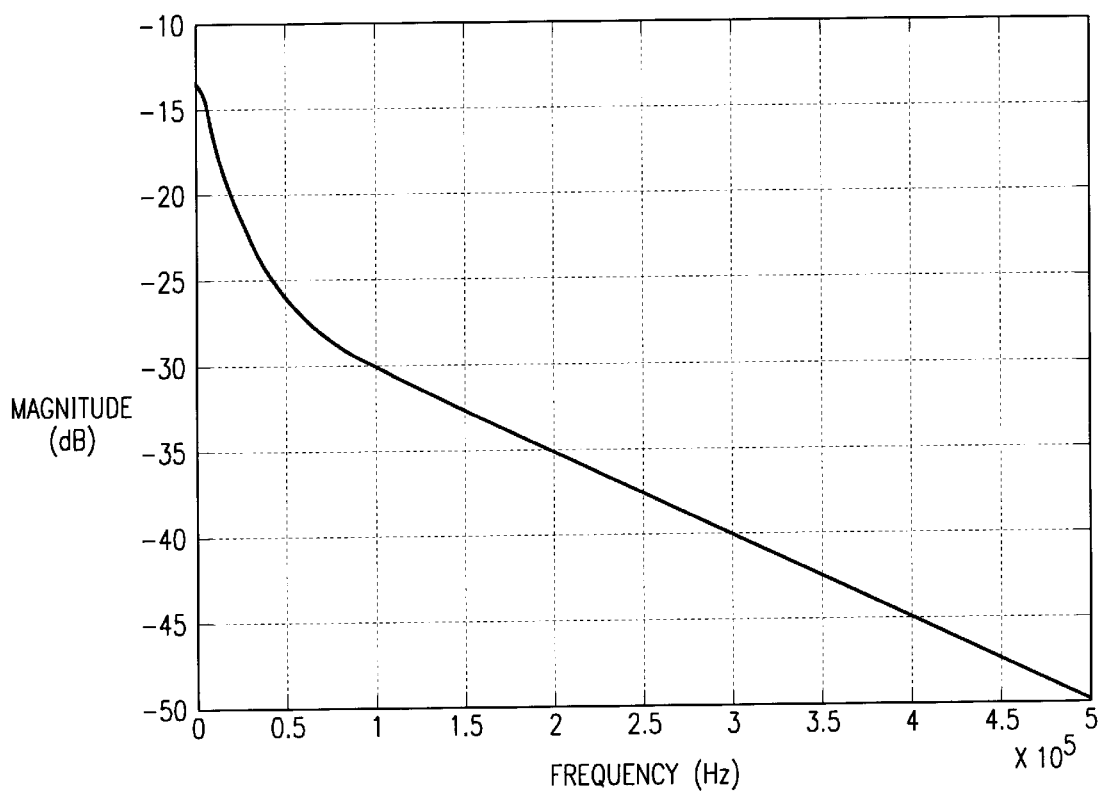

The frequency response of the voice-band channel (30 Hz to 3.3 KHz) is nominally flat. The alternating ABAB . . . and CDCD . . . symbols can be reliably detected before equalization of the channel. However, this is not the case for the MDSL modem. For a ¼ T1, modems use the spectrum up to 500 KHz of the telephone line. FIG. 8b shows the frequency response of a telephone CSA loop 6. A startup procedure that allows for partial equalization of the line is required before ting synchronization is attempted.

A preferred embodiment uses a startup handshake procedure for the MDSL modem. It uses an algorithm for implementation of the receiver portion.

Figure 8C:
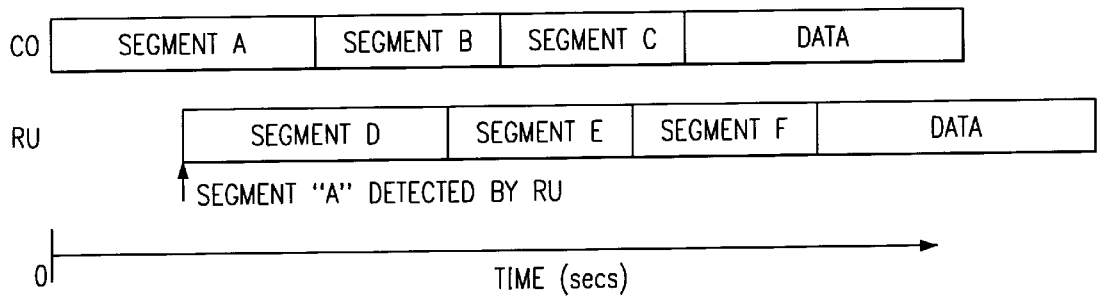

FIG. 8c shows the time line for the proposed startup procedure for the CO and RU MDSL modems using CAP line code. The table below identifies the various segments of FIG. 8c.

| Segment | Description |
|---------|-------------|
| A, D | One orthogonal channel is a repeating K-symbol sequence using the maximum value of the CAP constellation. For 16 constellation points, the channel can take on the values of +/−3. The other orthogonal channel is a random sequence using all possible points of the CAP constellation. For 16 constellation points, the channel can take on the values of +/−1, or +/−3. |
| B, E | One orthogonal channel is a length K sequence that is the inverted version of the K-symbol sequence used in segment A. The other orthogonal channel is a length K random sequence using all possible points of the CAP constellation. For 16 constellation points, the channel can take on the values of +/−1, or +/−3. |
| C, F | One orthogonal channel is a length L random sequence using all possible points of the CAP constellation. For 16 constellation points, the channel can take on the values of +/−1, or +/−3. The other orthogonal channel is a length L random sequence using all possible points of the CAP constellation. For 16 constellation points, the channel can take on the values of +/−1, or +/−3. |

The startup procedure is as follows:

CO MODEM
1. The CO modem is assumed to be always "on", but in an idle state. It continuously transmits segment A and listens for segment D.

RU MODEM
1. The RU modem comes on line and starts listening for segment A from the CO modem.
2. Once it detects segment A, it begins transmitting Segment D.

CO MODEM
2. Once the CO modem detects segment D from the RU modem, it transmits segments B,C, and valid data without further handshaking from the RU modem.

RU MODEM
3. The RU modem listens for segment B and once detected, it transmits segments E, F, and valid data without further handshaking from the CO modem.
4. The detection of segment B is the critical timing instant in the synchronization procedure. After it is detected, the RU modem begins training its equalizer using data from segment C.

CO MODEM
3. The CO modem listens for segment E from the RU modem. The detection of segment E is the critical timing instant in the synchronization procedure. After it is detected, the CO modem begins training its equalizer using data from segment F.

The receiver makes use of cyclical equalization techniques to obtain initial timing synchronization. On startup, the RU modem sets up a fractional spaced adaptive equalizer that is equal in time duration to K symbol periods, for example, K may be 15. This will be called the sync equalizer. If the sync equalizer is operated at two times the symbol period, the number of taps required is 2×K. For four samples per symbol period, the number of taps required is 4×K, and so on.

The receiver uses the same K-symbol sequence as the transmitter for the training data of the sync equalizer. Because the length of the equalizer is a multiple of the symbol sequence length, the relative phase between the transmitted sequence and the receiver reference sequence does not matter.

Once the sync equalizer mean square error fails below a threshold, segment A has been detected. The receiver stops the adaptation process and analyzes the coefficients. It then rotates the coefficients in a circular manner so that the N consecutive coefficients with the most energy are grouped at the front of the sync equalizer filter. N is the length of the orthogonal adaptive filters used in CAP demodulation, (see the following paragraphs). This aligns the symbol period of the receiver with the symbol period of the transmitter.

After rotation, the receiver continues to filter the signal, but does not update the sync equalizer coefficients. The output of the sync equalizer is then passed to a length K matched filter. The matched filter is used to detect segment B. Its coefficients are the transmitted channel sequence B. Since this sequence has only two values, a binary correlator could also be used.

When the output of the matched filter (correlator) is greater than a threshold. The receiver knows that the next symbol is the start of the training data. The receiver now implements the orthogonal adaptive filters used in CAP demodulation. They again are fractionally spaced adaptive equalizers whose lengths depend on the impulse response of the actual physical channel. These demodulation equalizers are trained using the known training data of segment C. After training has completed the demodulation equalizers enter a decision directed mode where the reference data comes from the CAP slicer.

Figure 9A:
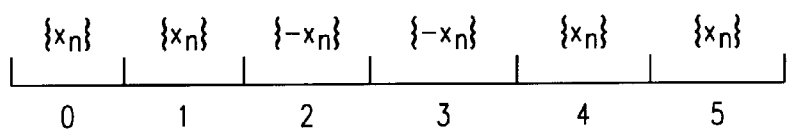
FIGS. 9a–d show preferred embodiment training.

Referring now to FIG. 9a, there may be seen a time domain equalizer training sequence for use with DMT line code.

The portion of this invention for DMT, instead of using the usual frequency domain training sequence, uses a time domain training sequence depicted in FIG. 9a. The basic unit of the training sequence is a random data block $\{x_n\}$, $0 \leq n < N$. The entire sequence is arranged so the random data block $\{x_n\}$ repeats in time with the sign of data block alternating every two blocks as shown in FIG. 9a.

For easy description purposes, the following notations are used: time domain equalizer taps $w_1$; channel impulse response (including time domain do equalizer) $h_k$; the receiver data before the equalizer $y_m[n]$, and after the equalizer $z_m[n]$, where m denotes the label on data block. The received signals corresponding to the transmitted signals in FIG. 9a are as follows: frame number $$1. z_1[n] = \sum_{k=0}^{n} x_{n-k} \cdot h_k + \sum_{k=1}^{\infty} x_{N-k} \cdot h_{n+k} + p_n$$

$$2. z_2[n] = -\sum_{k=0}^{n} x_{n-k} \cdot h_k + \sum_{k=1}^{\infty} x_{N-k} \cdot h_{n+k} + p_n$$

$$3. z_3[n] = -\sum_{k=0}^{n} x_{n-k} \cdot h_k - \sum_{k=1}^{\infty} x_{N-k} \cdot h_{n+k} + p_n$$

$$4. z_4[n] = \sum_{k=0}^{n} x_{n-k} \cdot h_k - \sum_{k=1}^{\infty} x_{N-k} \cdot h_{n+k} + p_n$$

$$5. z_5[n] = z_1[n]$$

where, $p_n$ is the pilot tone superimposing on the training sequence. The second terms on the right hand side of the equations are attribute to the inter-symbol interference from the previous frame. The second term can be separated from the first term by performing the operation: frame 4.–frame 1.

$$\text{err}[n] = z_4[n] - z_1[n] = -2\left(\sum_{k=1}^{\infty} x_{N-k} \cdot h_{n+k}\right) \tag{1}$$

Assuming prefix length is L, the ideal channel impulse response is $$h_k = \begin{cases} h_k & k < L \\ 0 & k \geq L \end{cases} \tag{2}$$

The condition (2) can be satisfied if the time domain equalizer $w_1$ is chosen such that $$\text{err}[n]=0, \text{ for } n \geq L-1. \tag{3}$$

It is easy to prove that equation (3) leads to a set of linear equations $$\begin{bmatrix} x_{N-1} & x_{N-2} & & & \\ 0 & x_{N-1} & x_{N-2} & & \\ 0 & 0 & x_{N-1} & & \\ \vdots & & & \ddots & \\ 0 & \cdots & & & x_{N-1} \end{bmatrix} \begin{bmatrix} h_L \\ h_{L+1} \\ H_{L+2} \\ \vdots \end{bmatrix} = 0 \tag{4}$$

If the training sequence is chosen such that $x_{N-1} \neq 0$, the unique solution of equations (4) will be $h_k=0$, for $k \geq L$. Which is the same as (2).

Since $$z[n] = \sum_{k=0} y_{n-k} \cdot w_k,$$

equation (1) can be alternately written as $$\text{err}[n] = \sum_{k} (y_4[n-k] - y_1[n-k]) \cdot w_k. \tag{5}$$

Combining (3) and (5) and using genera LMS algorithm, $w_1$ may be found by doing iterations:

$$W_1[k+1]=W_1[k]-2 \cdot \mu \cdot \text{err}[n] \cdot (y_4[n-1]-y_1[n-1]), n \geq L-1. \tag{6}$$

The frame boundary information can also be derived from above training sequence. As seen in Eq. (1), if the block of the training sequence is much longer than the channel impulse response, err[n] approaches zero as $h_{N-k} \rightarrow 0$ when n increases to the end of frame 4. However, when data starts in frame 5, $$\text{err}[n] = z_5[n] - z_2[n] = 2\left(\sum_{k=0}^{n} x_{n-k} \cdot h_k\right). \tag{7}$$

Figure 9B:
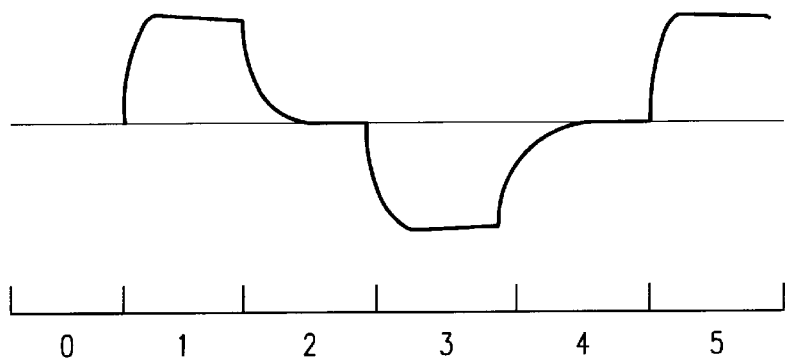

For ADSL applications, since there is high attenuation in copper wire at high frequency, the channel impulse response $h_k$ does not expect to flip the sign very frequently. If the values of $x_n$ at the beginning of the training block $\{x_n\}$ have the same sign, the summation in equation 7 will be constructive. Consequently the amplitude of err[n] starts to increase at frame boundary n=0. FIG. 9b shows the time sequence of err[n]. As shown in FIG. 9b, the rising edge of the derived sequence err[n] can be used for frame synchronization, and the training edge of err[n] can be used for time domain equalizer training. For the same reason as that of in the rising edge of err[n], to make the summation in equation (1) constructive the elements of the training sequence at the end of block $x_{N-k}$ should also have the same sign.

The above sequence can also be easily detected by doing the operation $$\det[n]=z_3[n]+z_1[n]=2 \cdot p_n. \tag{8}$$

Figure 9C:
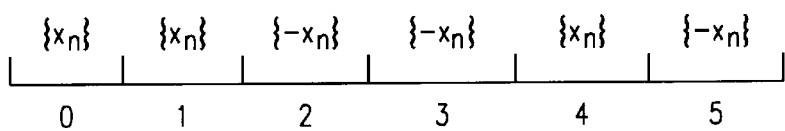

Comparing the power of frame det[n] pwr_det to the power of frame z[n] pwr, if pwr_det<<pwr, it indicates that the training sequence has been detected. To end the training sequence, one can send the data block pattern as shown in FIG. 9c. Then the corresponding received signal are:

Frame:

$$3. z_3[n] = -\sum_{k=0}^{n} x_{n-k} \cdot h_k - \sum_{k=1}^{\infty} x_{N-k} \cdot h_{n+k} + p_n$$

$$5. z_5[n] = -\sum_{k=0}^{n} x_{n-k} \cdot h_k + \sum_{k=1}^{\infty} x_{N-k} \cdot h_{n+k} + p_n$$

In this case the detection signal is $$det[n] = z_5[n] + z_3[n] = -2 \cdot \sum_{k=0}^{n} x_{n-k} \cdot h_k + 2 \cdot p_n. \quad (9)$$

The power of this detection frame is greater than that of the data frame, pwr_det>pwr. Once pwr_det>pwr is detected in the received data stream, the DMT receiver determines that it is the end of training sequence. Since the data pattern for the end of the training sequence is inserted in the frame 5, which is used for frame boundary detection rather than time domain equalizer training, it will not affect time domain equalizer update.

Figure 9D:
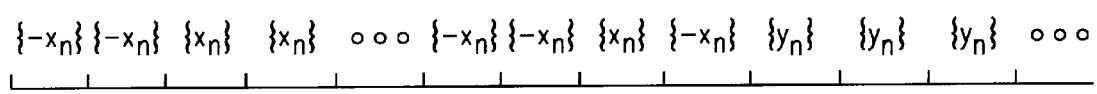

Following the time domain equalizer training, the transmitter should send another sequence $\{y_n\}$ to train the frequency domain equalizer. The frequency domain equalizer training sequence can be made of exactly the repeatable block $\{y_n\}$. FIG. 9d shows the entire training sequence. In the regime of training sequence $\{y_n\}$ pwr_det remains high.

The line management part of the MDSL allows the host software to preconfigured the MDSL to work under Leased Line with Single Link mode. Currently, MDSL uses the following modes:

Leased line with single link (LLSL)
Leased line with multiple links (LLML)
Switched line with soft dial (SLSD)
Switched line with hard dial (SLHD)

Under the LLSL mode, the telecommunication line is solely committed to the MDSL communications with a remote MDSL system. Only one data link is allowed under this line connection mode. So the link management is the same as the line management.

The LLML mode works the same as the LLSL except that it allows multiple link connections at different speeds within the same leased line. The number of links and the link speed can be configured dynamically to the capacity of the line speed. Under its mode, each link works like an in dependent leased line and follows the same line management scheme, except that it is ink oriented.

The SLSD mode works on a switched MDSL line on which the MDSL-R modem is dialed automatically by the MDSL-C which is controlled by a remote server. Under this mode, the line management follows a special MDSL dial-up procedure that is independent from the Plain Old Telephone Service (POTS) line. The MDSL modem dial-up procedure is defined by the MDSL modem's internal initialization process. It has 2 dial-up IDs, one related to the MDSL-C port and the other related to the MDSL-R modem. The ID for MDSL-C port could be just the subscriber phone number plus 1 digit; by choosing it to be 0 and the ID for the MDSL-R modem could be the subscriber phone number also plus 1 digit selected to be 1. The other 8 values, from 2 to 9, are reserved.

The SLHD mode works in a way similar to that of voice-band modem but with MDSL dial-up procedure. The MDSL modem will either store a phone number or be dialed manually by an application.

The following sections will describe the MDSL line connection management under Leased Line with Single Link mode as an example of mode operations.

The MDSL Line Management Host Interface allows the host software to configure a line to be ready to send/receive data packets. Host software can also manually halt the line connection to stop the data flow.

Figure 10A:
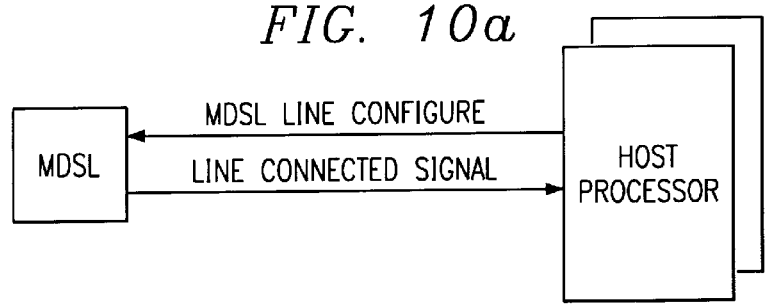
FIGS. 10a–h show preferred embodiment line connection management.

The line configuration command in MDSL Line Management Host Interface is used for host software to configure a line into one of the MDSL supported line modes. Under LLSL mode, it also sets up the sending/receiving data rate, maximum frame size and data link protocol. This command is usually called during the MDSL initialization or error recovery process. After a successful execution of this command, the MDSL under configuration is ready to send/receive data packets through the line. For LLML, a data link has to be opened/created to allow the data flow. The line configuration of MDSL is an asynchronous procedure. The HOST will be notified that the line has been successfully configured by the "line connected" interrupt generated by MDSL. The line configuration process in MDSL is depicted in FIG. 10a.

Host Interface:
MdslLineConfigure(IN LineMode, IN TxSpeed, IN RxSpeed, IN MaxTXFrameSize, IN MaxRxFrameSize, IN TxProtocol, IN RxProtocol)

The LineMode input parameter specifies which line mode the MDSL is to be configured for. It has the following definitions:

0—leased line with single link
1—leased line with multiple links
2—switched line with soft dialup
3—switched line with hard dialup The TxSpeed and RxSpeed give the upstream and downstream line speed.

The MaxTxFrameSize and MaxRxFrameSize parameters specify the maximum frame for sending and receiving data.

The TxProtocol and RxProtocol define the physical layer framing protocol used for transmitting data. Currently it has the following definitions:

Bit 0–Bit 1 define framing protocol name:
00—Raw MDSL (no data packetizing)
01—MDSL specific packetizing
10—HDLC (High-level Data Link Control)
Bit 2 indicates if there is packet header compression.
Bit 3 indicates if there is packet data compression.
Bit 4 indicates if the data is encrypted.

Figure 10B:
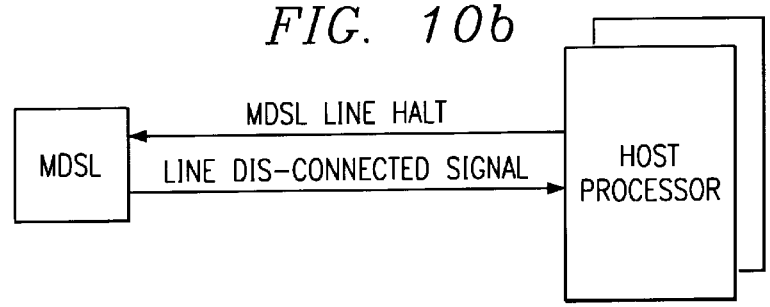

In MDSL Line Management Host Interface, the Halt Line command tells MDSL to stop sending/receiving data for the data flow control. It flushes an the internal data transmit buffers and status flags and sends a message to the remote MDSL to notify the request and manually put the line into "line disconnected" state. This command will take effect only when the line is in "line connected" state. Otherwise, it will return error. Halt Line is an asynchronous process, the HOST will be notified when the line has been put into the "line disconnected" state as depicted hi FIG. 10b.

Host Interface:
MdslHaltLine( )

Inside MDSL there is a line state engine used to monitor the line status for reporting line hanging or unexpected incidents. In MDSL leased line mode the following line states are defined:

Line Drop—line is unplugged or broken, no physical signal is received
Line Disconnected—line is physically connected but is not ready for data transmission
Line Connected—line is ready for sending/receiving data packets MDSL Line Management Host Interface provides two ways to get the line status information.

One way is calling Get Line Status command:
MdslGetLineStatus(OUT LineStatus, OUT LineConfigure)

The LineStatus parameter returns the MDSL line status information described above. The LineConfigure is a structure which is used to store the line configuration information set by MdslLineConfigure( ) command.

The other way for the host software to be notified of the line status change is by registering the line management events. MDSL will allow host software to be interrupted when certain events happened. The events related with line management are:

Line connected: A line connection has just been established

Line disconnected: A previously connected line has been disconnected by either MdslLineConfigure( ) call or some un-expected incidents.

Line dropped: A line has been physically disconnected. No signal can be received in the line.

Figure 10C:
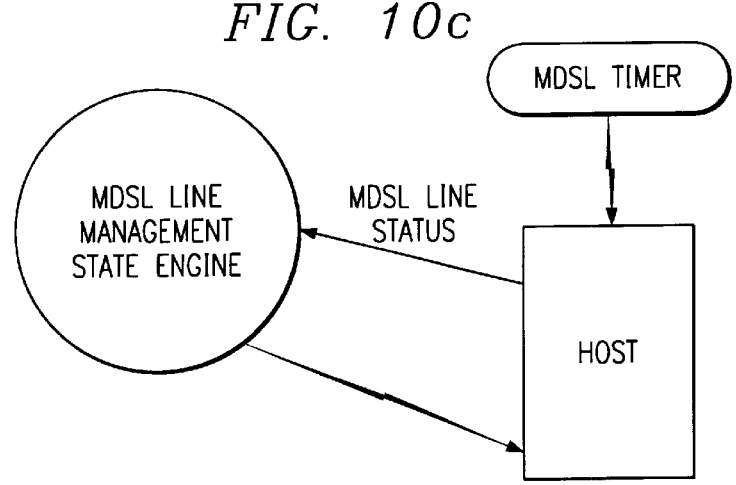

There is also a timer interrupt provided by MDSL to allow the host software to poke the line status periodically, as depicted in FIG. 10c.

The line connection messages need to be exchanged between two MDSL ends connected to each other. These messages are defined as special line management packets in MDSL.

In order to exchange Line Connection Management Information between MDSL-C and MDSL-R, the following kinds of Line Control Message Packets are defined:

Line Configuration Command Packet

Line Halt Command Packet

Acknowledgment Packet

Figure 10D:
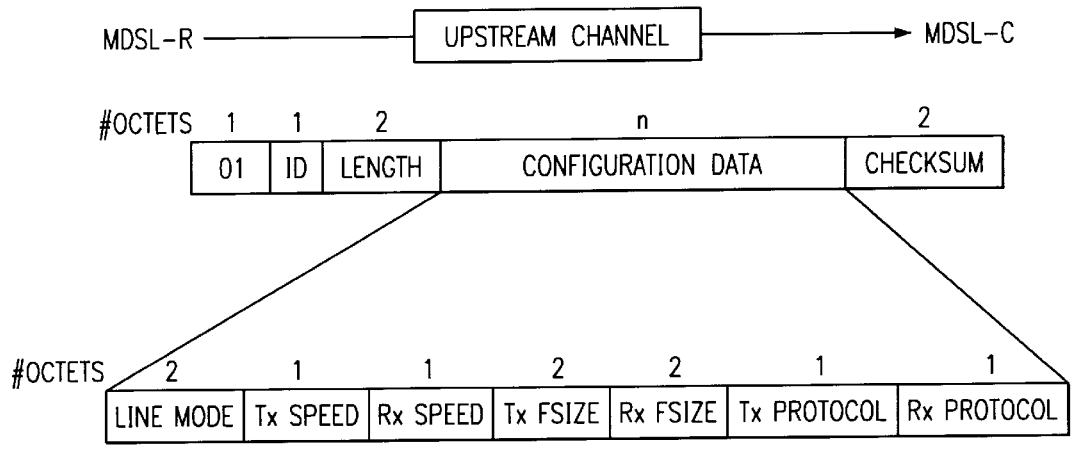

Referring now to FIG. 10d, there may be seen a depiction of the format for the line configuration command packet.

ID is 1 octet and aids in matching commands and replies.

Length is the packet length in octets.

Configuration Data Contains the following information:

Line Mode defined previously

Data Sending Speed

Data Receiving Speed

Maximum Sending Frame Size

Maximum Receiving Frame Size

Data Sending Protocol defined previously

Data Receiving Protocol defined previously

Checksum is computed using the standard TCP/IP algorithm: the one's complement of the sum of ail 16-bit integers in the message (excluding the checksum field).

Figure 10E:
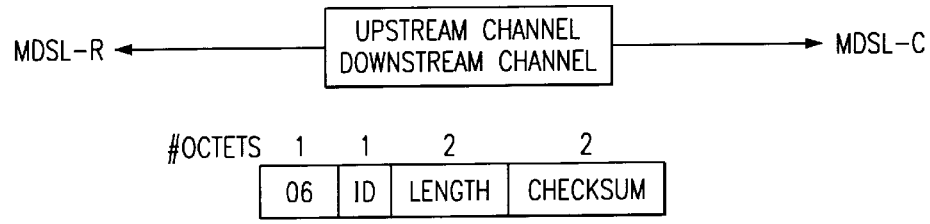

Referring now to FIG. 10e, there may be seen a depiction of the format for the line halt command packet.

ID is 1 octet and aids in matching commands and replies.

Length is the packet length in octets.

Checksum is computed using the standard TCP/IP algorithm: the one's complement of the sum of all 16-bit integers in the message (excluding the checksum field).

Figure 10F:
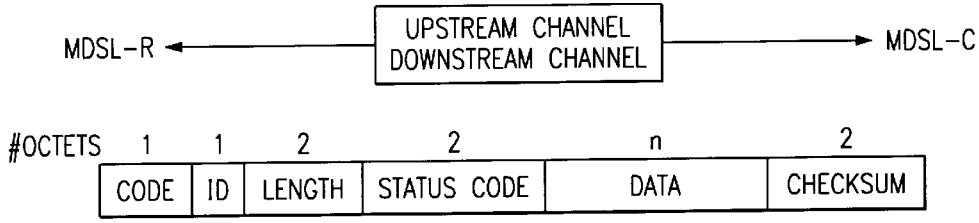

Referring now to FIG. 10f, there may be seen a depiction of the format for the acknowledgement packet.

Code defines what kind of acknowledgment packet it is. It has the following definitions:

2—Line configuration Acknowledgment
4—Line Configuration Reject
6—Line Halt Acknowledgment
ID is 1 octet and aids in matching commands and replies.
Length is the packet length in bytes.
Status Code has the following deletions:
SUCCESS
Unrecognized packet ID
Part of the configuration data is not acceptable
Configuration is completely rejected
Checksum error
Data contains 0 or even number of octets specifying which part of the configuration data is not acceptable on the remote end.

Checksum is computed using the standard TCP/IP algorithm: the one's complement of the sum of all 16-bit integers in the message (excluding the checksum field).

Figure 10G:
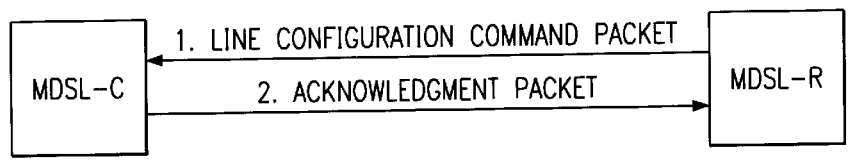

After power on, the MDSL-R automatically precedes with its internal initialization process. This process contains four steps: channel probing, line code selection, rate negotiation and transceiver training. After the initialization procedure, the MDSL-R transitions to a stand-by mode. The line state at this moment is "disconnected" as defined before. Upon detecting that the line has been physically connected, the HOST software will send a MdslLineConfigure( ) command to MDSL-R for line configuration. MDSL-R then sends out a line configuration command packet to MDSL-C with the configuration data. After receiving the line configuration command and checking the configuration data, MDSL-C will send out an acknowledgment packet to confirm the line configuration. If the MDSL-C cannot accept the configuration data, it will send a configuration reject packet. It will also give the status message specifying what kind error it is. If only part of the configuration data is not acceptable, the data field will contain the configuration data which is not acceptable, as depicted in FIG. 10g.

After the connection is established, it stays connected until the following events happen:

The line is unplugged or broken

The MDSL-R is powered down

The MDSL-C is out of service

Figure 10H:
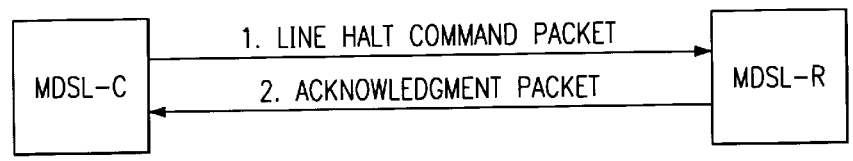

Whenever MDSL-C is going to shut down or MDSL-R is powered down, a Line Halt command packet will be sent out. The command sender will keep sending out the Line Halt command packet until either an acknowledgment packet has been received or Line Halt command timed out. At the receiver site, after sending an acknowledgment packet back to the message sender to confirm that the line is disconnect, it clears up all the internal data buffers and status flags. The line state then changed into "line disconnected" state. FIG. 10h gives an example of the MDSL-C sending out a Line Halt Command before it is out of service.

The MDSL host interface is intended to provide a simple, user friendly, efficient and low-cost interface to a 16-bit host controller. The host interface will provide the following functions:

Command/control communications between the host and the MDSL Network Interface Card (NIC)

Line connection management

Send/receive data packets

The host command/control communication functions include initializing the device, downloading DSP code to the local RAM if it is not in the EEPROM, sending commands to MDSL, monitoring and reporting status changes.

The line connection signaling between two MDSL-C and MDSL-R can be different according to different line modes: dialup-line mode and leased-line mode. The dialup-line mode will provide the basic telephony—a guaranteed set of functions that correspond to POTS. Under this mode, the system software and hardware has to work with the Telephony Application Programming Interface (TAPI) on the MDSL-R site and Telephony Service Provider Interface (TSPI) on the MDSL-C site to establish the connection. Under the Leased-line mode, the connection will be established immediately after the initialization of the MDSL. But it does not provide standard POTS service.

Physical layer packetizing is preferably used for MDSL (such as HDLC). The maximum packet size for the PPP is 1500 bytes, but it should allow 32 bytes overhead for the frame. MDSL will send data from packet buffer to the line and notify the host that the packet has been set out. It will also notify the host when a new packet has been put into the receiving buffer. The sending and receiving buffer can be a shared memory on MDSL.

The following commands and controls may be employed:

1. Reset

Syntax: Reset ( )

Description: Halts all of the command executions in the system. Flushes the transfer/receive buffer and performs an internal reset.

Parameter: None

Return: None

2. Load DSP Module

Syntax: LoadDspModule(ModuleAddr, ModuleSize)

Description: Loads the DSP module into the MDSL

Parameter: ModuleAddr—DSP module start address
ModuleSize—DSP module size

Return: None

3. Set Interrupt Mask

Syntax: SetInterruptMask(EventMask)

Description: Enable interrupt of host processor, based on occurrence of selected event(s)

Parameter: EventMask is a 16 bit integer value for the interrupt mask. Table 5 identifies the bits in the mask. A value of 1 for a bit enables the interrupt corresponding to that bit. All bits not defined in the table are reserved for future use and should be set to zero.

4. Get Interrupt Status

Syntax: GetInterruptStatus( )

Description: Get the interrupt status, based on the occurrence of the selected event(s).

Parameter: None

Return: EventStatus. MDSL will return a 16 bit status number which corresponds to the definition of the EventMask parameter in Table 5. Calling this function will clear the interrupts just fired.

The following Line Connection Management commands are available:

1. Line Configuration

Syntax: LineConfigure(LineMode)

Description: Configure the line to be ready to receive and send data packets Parameter: LineMode indicates what kind of fine mode MDSL is going to be configured. It is has the following bit definitions. All the undefined bits will be reserved for future use.

TABLE 5

Bit Definitions for EventMask Parameter

| Bit # | Mnemonic | Event | Event Definition |
|---|---|---|---|
| 0 | INTE | Interrupt Enable | This bit enables the interrupt set by the EventMask |
| 1 | LNC | Line Connected | A line connection has been established |
| 2 | LNDC | Line Disconnected | A previously connected line has been disconnected |
| 3 | BFOVF | Rx Buffer Overrun | The line receiving buffer is overrunning |
| 7 | BFEMP | Tx Buffer Empty[a] | The line transfer buffer is empty |
| 9 | PKARV | Packet Arrival | A packet has been put into the line receiving buffer |
| 10 | PKST | Packet Sent | A packet has been moved out of the data line sending buffer |
| 15 | TINT | Timer Expires | A preset timer count goes to 0 |

[a]This interrupt is redundant with the packet sent interrupt if transmit buffer can only hold one packet at a time.

TABLE 6

Bit Definitions For LineMode Parameter

| Bit # | Mnemonic | Event | Event Definition |
|---|---|---|---|
| 0 | | Line Mode | When this bit is set, the data line will work under the leased line mode. When this bit is cleared, the data line will work under dial-up mode. |
| 1 | | Voice Line Flag | When this bit is set, the voice signal transmission will function at the same time with the data signal transmission in MDSL. When this bit is cleared, the voice-band cannot function at the same time. |
| 2–6 | | Speed Definition | These bits define the speed for sending and receiving data. Bit 6 indicates if the speed is for sending or receiving. Bits 2 to 5 define 16 different speeds. |

Return: None

2. Get Line Status

Syntax: GetLineStatus( )

Description: This command will return a 16 bit number to indicate the current line status.
Parameter: None
Return: LineStatus. The definition of this returned number is in Table 7.

Figure 11A:
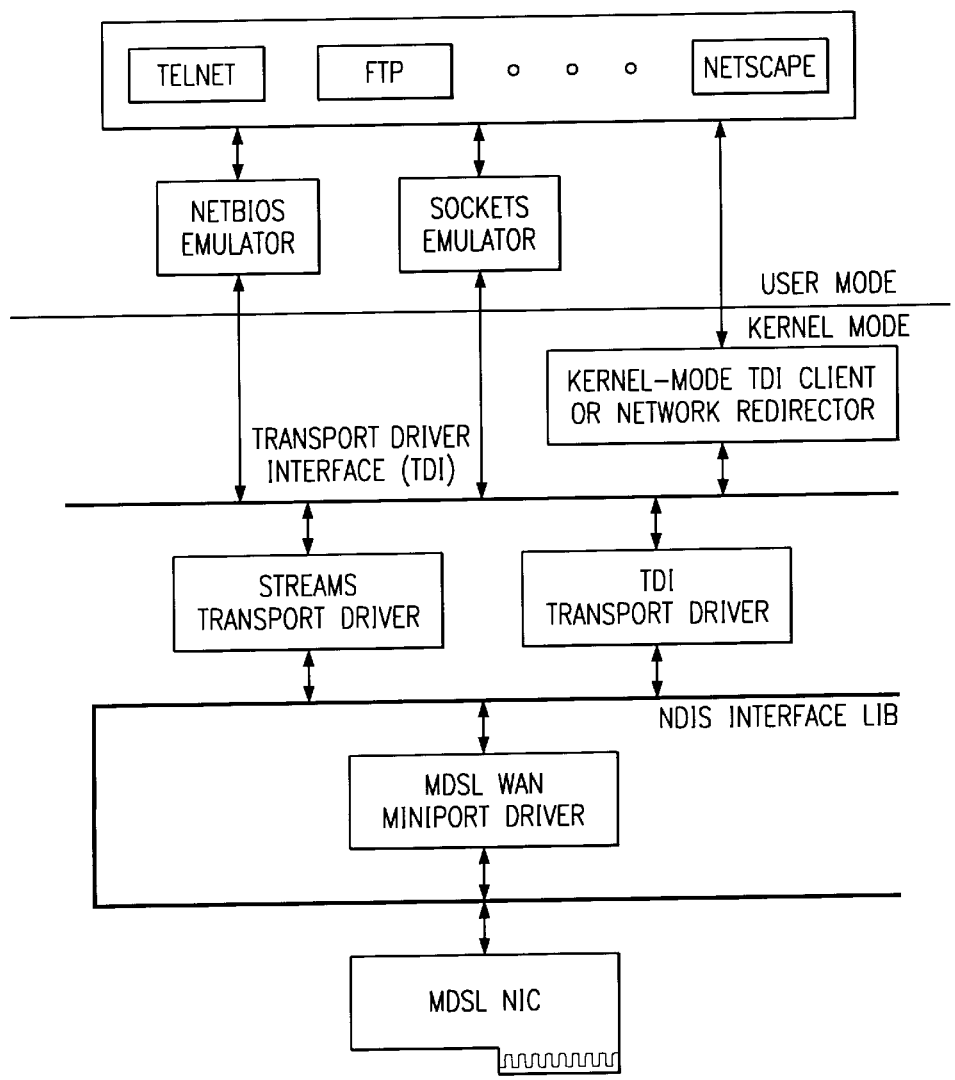
FIGS. 11a–n show preferred embodiment modem driver.
Figure 11B:
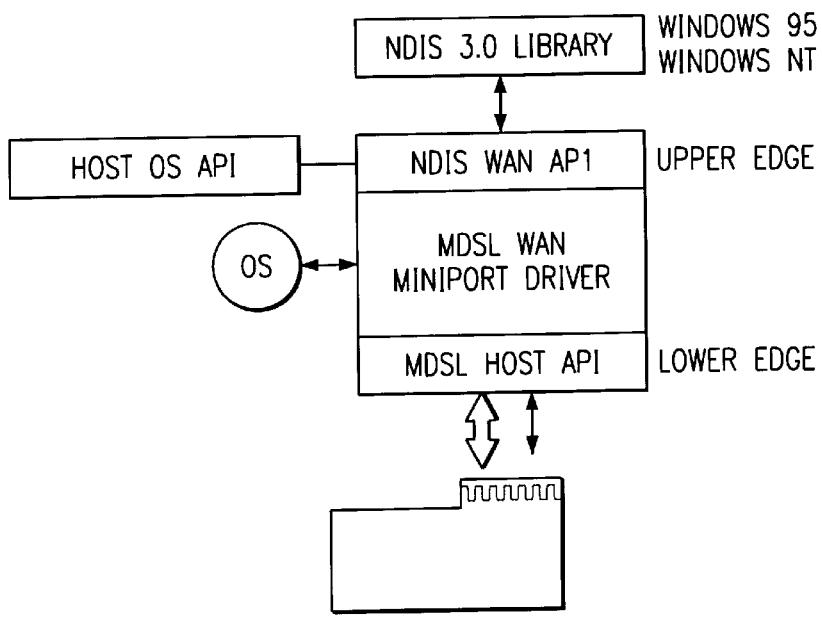
Figure 11C:
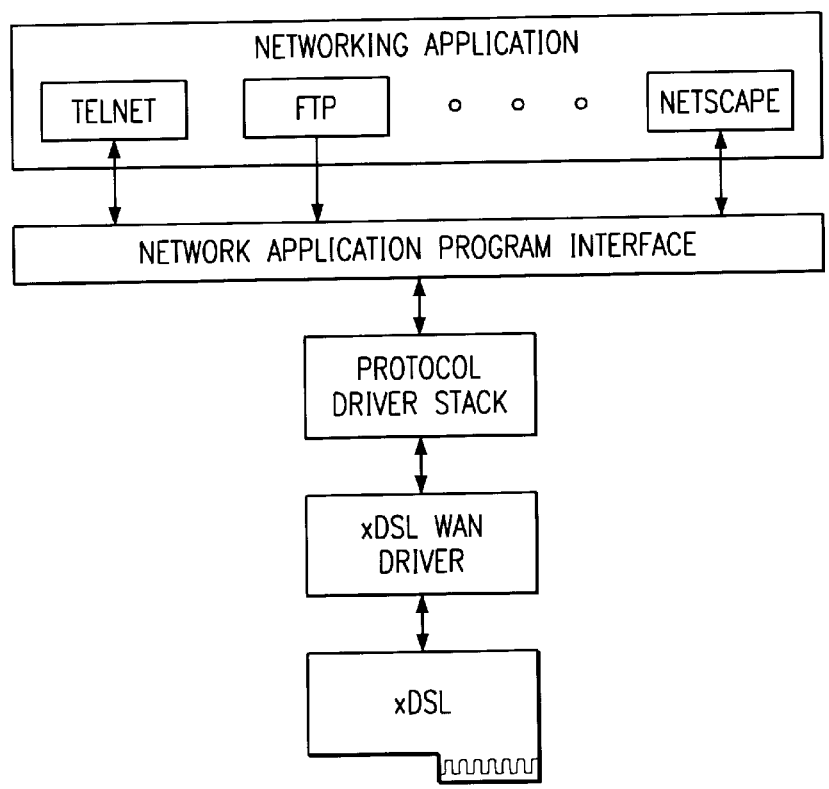

FIGS. 11a–b illustrate the software structure of the driver for modem 100 used with a host having a Windows 95 or Windows NT environment, as commonly would be the situation for a personal computer in a residence. FIG. 11c illustrates the software driver structure more generally.

TABLE 7

Bit Definitions For LineStatus

| Bit # | Mnemoinc | Event | Event Definition |
|---|---|---|---|
| 0–1 | | Line Status | These two bits indicate the following line states:<br>1. Line is down (no physical signal is received)<br>2. Line is disconnected (line is not ready for sending and receiving data)<br>3. Line is connected (line is ready for sending data) |
| 2 | | Line Mode | When this bit is set, the data line will work under the leased line mode. When this bit is cleared, the data line will work under dial-up mode. |
| 3 | | Vocie Line Flag | When this bit is set, the voice signal transmission will function at the same time with the data signal transmission in MDSL. When this bit is cleared, the vocie-band cannot function at the same time. |
| 4–8 | | Speed Definition | These bits define the speed for sending and receiving data. Bit 8 indicates if the speed is for sending or receiving. Bits 4 to 7 define 16 different speeds. |

3. Halt a Connected Line
Syntax: HaltLine( )
Description: Tell MDSL to stop sending/receiving data for the data flow control. It will flush all the internal buffers and manually put the line into a "disconnected" state.
Parameter: None
Return: None
The following Sending/Receiving Data Packet commands are available.
1. Send Packet
Syntax: SendPacket(DataPtr, Size)
Description: This command tells MDSL that one data packet has been copied into MDSL sending buffer. An interpret will be generated after the packet has been moved out of the buffer.
Parameter: DataPtr Points to the memory address of the sending buffer where the data packet is stored. The length of the packet should be less than or equal to the maximum allowed packet size.
Return: None
2. Check Receive Information
Syntax: CheckReceiveInfo(DataPtr, Size, ErrorFlag)
Description: This command returns TRUE (1) or FALSE (0) depending on if there is a packet in the receiving buffer.
Parameter: DataPtr is used to return the memory address where the packet is stored. Size is used to return the size of the packet received. ErrorFlag is set to non-zero if there is any error happened during the transmission.
Return:
1—There is data in the receiving buffer
0—No data is in the receiving buffer.
3. Check Sending Information
Syntax CheckSendInfo( )
Description: This command returns 0 if MDSL transmit buffer is empty.
Otherwise, it returns the number of bytes left in the buffer.
Parameter: None
Return: Sending buffer data size. It is 0 when the transmit buffer is empty.
Otherwise it is the number of bytes left in the transmit buffer.

The system software of the MDSL NIC has been implemented as an NDIS 3.0 WAN mini-port driver for Windows NT 3.5 and Windows 95 Operating Systems.
The following is broken down from the following three perspectives:
1. The functionality of the system by virtue of the system software being implemented as a mini-port device driver under Windows NT 3.51 and Windows 95
2. The input and output data processing that the system performs
3. The interaction of the system software with NDIS library The MDSL driver will be implemented as an NDIS miniport driver to control and manage the Media Access Control (MAC) sub-layer of the network system. It's structure is described in FIG. 11b. It will be a component within the Windows NT or Windows 95 Internet system software. The MDSL driver will follow the definitions of the interface and data structures specified in NDIS 3.0. The driver needs to be installed or integrated into the system in order to make it function.

The MDSL driver will function as a WAN Network Interface Card driver. It interacts with protocol drivers on the upper edge and controls the MDSL NIC on the lower edge. All these interactions and controls are going through the NDIS library or NDIS wrapper in Windows NT/Windows 95.

Figure 11D:
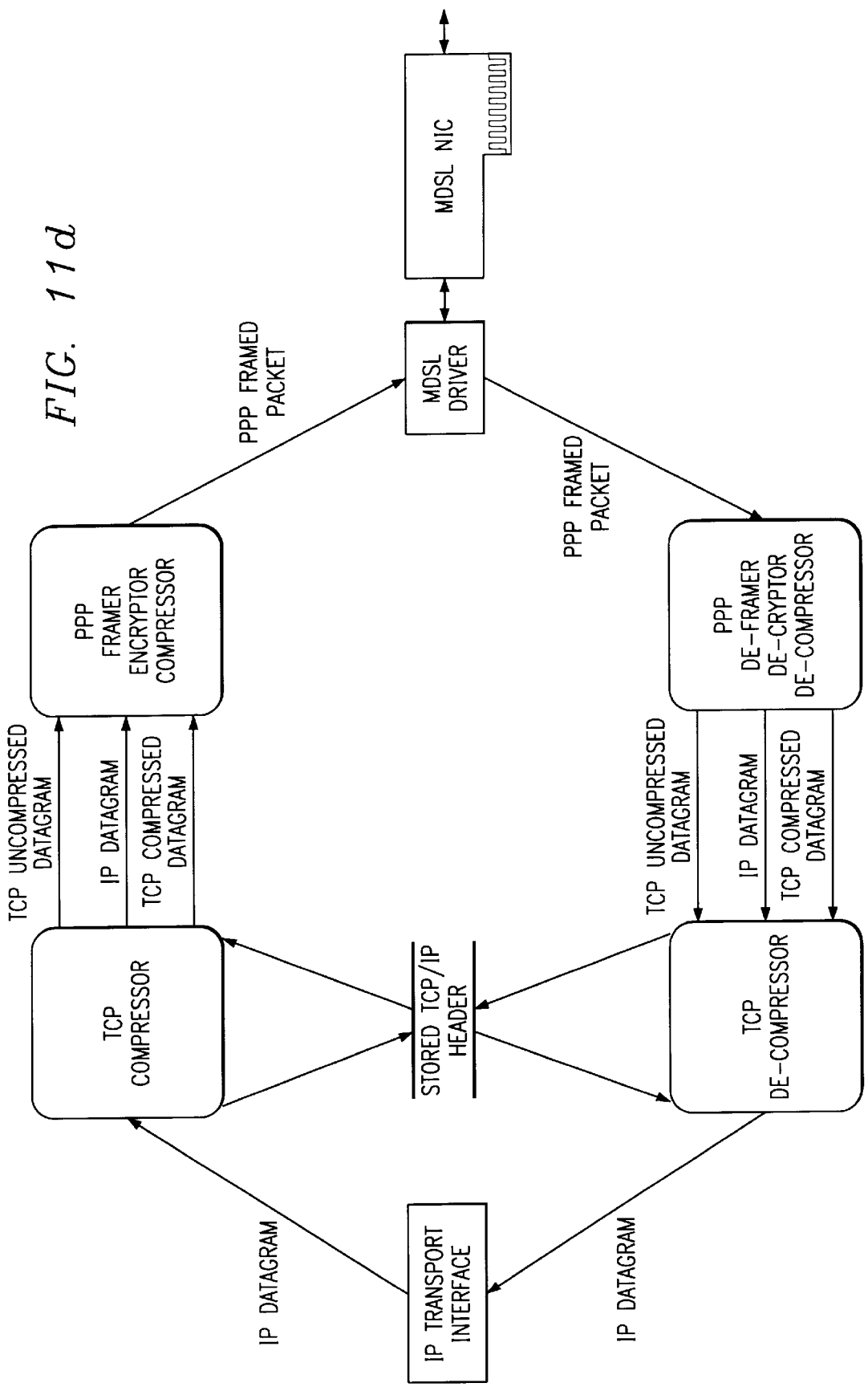

FIG. 11d depicts the data flow path in the system software. FIG. 11d depicts how incoming data is received by the NIC card and passed to the driver where it is passed to the transport interface via various functions and how it is returned to the driver.

The MDSL driver will come with the MDSL network adapter. It can be installed together with the MDSL-R into a PC at home and connected with the MDSL-C the same driver although the MDSL-C modulation algorithm could be different. With an Internet router on the MDSL-C site, the MDSL-R can run a lot of internet applications such as TELNET, FTP and NetScape through MDSL NIC. The data communication and voice communication can occur simultaneously.

The following entry points or functions are completely compliant with NDIS 3.0 specification.

Driver Entry Point (Driver Entry) is the main entry point called by the operating system when the driver is loaded into memory.

Inputs

DriverObject: Pointer to driver object created by the operating system.

RegistryPath: Pointer to registry path name used to read registry parameters.

Outputs

Return Values: STATUS_SUCCESS or STATUS_UNSUCCESSFUL DriverEntry will do:
1. Call NdisMInitializeWrapper to initialize the NDIS WAN wrapper.
2. Initialize the characteristics table and export the MDSL driver's entry points to the NDIS WAN wrapper.
3. Call NdisMRegisterMiniport to register the MDSL driver to the NDIS WAN wrapper.

Figure 11E:
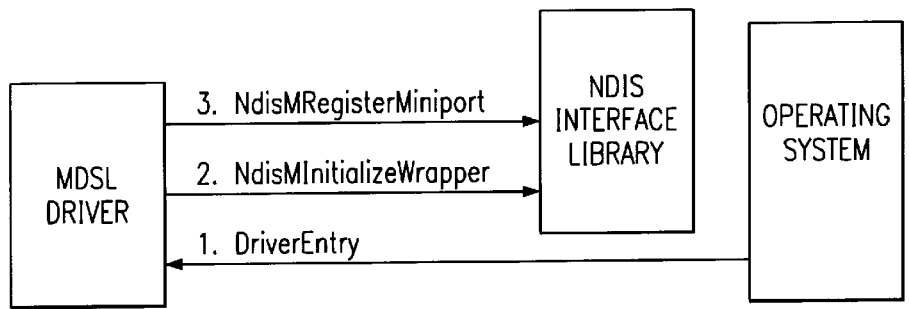

FIG. 11e depicts the interaction between the OS, NDIS library and MDSL driver for Driver Entry.

The initialization entry point (MdslInitialize) will be called by NDIS library to initialize the MDSL modem.

Inputs

MediumArray: All the networking media the NDIS library supported

MediumArraySize: The number of elements in the medium array

MdslAdapterHandle: A handle identifying the MDSL driver assigned by the NDIS library NdisConfigContext: A handle for NDIS configuration Outputs OpenErrorStatus: MDSL driver will set this parameter to a status value specifying information about the error if the return value is NDIS_STATUS_OPEN_ERROR.

SelectedMediumIndex: MDSL driver sets this index to the MediumArray that specifies the medium type of the MDSL driver.

Figure 11F:
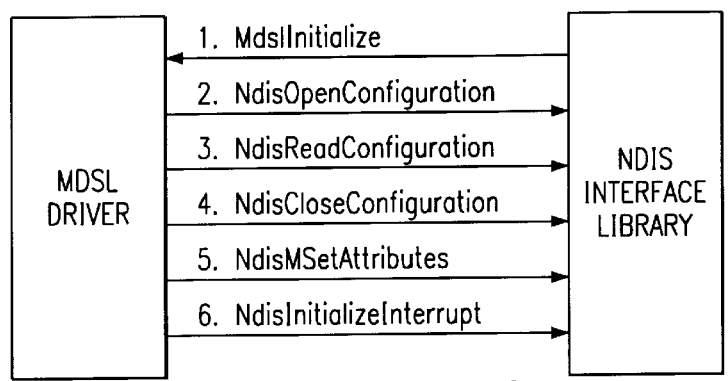

Return Values: MdslInitialize returns NDIS_STATUS_SUCCESS or it can return the following status values:
 NDIS_STATUS_ADAPTER_NOT_FOUND
 NDIS_STATUS_FAILURE
 NDIS_STATUS_NOT_ACCEPTED
 NDIS_STATUS_OPEN_ERROR
 NDIS_STATUS_RESOURCES
 NDIS_STATUS_UNSUPPORTED_MEDIA Processing The MdslInitialize will:
1. Search through the MediumArray to find its medium match. If no match is found NDIS_STATUS_UNSUPPORTED_MEDIA is returned.
2. Get ail the configuration information of MDSL NIC (interrupt number, board name, channel address or line address, switch type, etc.)
3. Allocate and initialize memory for MDSL driver data structures.
4. Inform NDIS wrapper the physical attributes of MDSL NIC including associate the MdslAdapterHandle with MDSL NIC
5. Map MDSL NIC's physical location into the system address space.
6. Reset or initialize the MDSL NIC
7. Setup and initialize the transmit queues
8. Initialize interrupt
9. Initialize line FIG. 11f depicts the interaction between the NDIS library and the driver for MdslInitialize.

Entry point (MdslReset) issues a hardware reset to the MDSL NIC and resets its software state.

Inputs

MdslAdapterContext: The handle initialized by MiniportInitialize

Outputs

AddressingReset: Set to TRUE if the NDIS library needs to call MdslSetInformation to restore addressing information to the current values.

Return Values: None

Processing

MdslReset will issue a software reset on the MDSL NIC. It may also reset the parameters of MDSL NIC. If a hardware reset of MDSL NIC resets the current station address, the MDSL driver automatically restores the current station address following the reset.

Figure 11G:
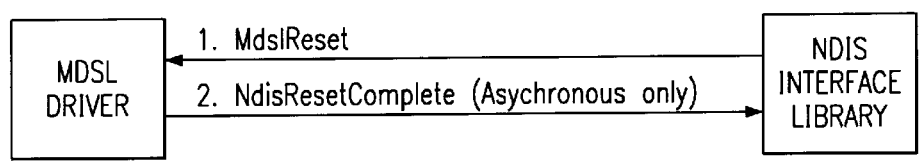

FIG. 11g depicts the interaction between the NDIS library and the driver for MdslReset.

Entry point (MdslReconfigure) is called by NDIS library to reconfigure the MDSL NIC to new parameters available in the NDIS library functions. It is used to support plug and play adapters and software configurable adapters, which may have the parameters changed during run time.

Inputs

MdslAdapterContext: The handle initialized by MiniportInitialize

WrapperConfigurationContext: The handle of NDIS configuration.

Outputs

OpenErrorStatus: This parameter is set by MDSL driver to specify the information about the error if the return value is NDIS_STATUS_OPEN_ERROR.

Return Values:
NDIS_STATUS_SUCCESS
NDIS_STATUS_NOT_ACCEPTED
NDIS_STATUS_OPEN_ERROR Processing Returns NDIS_STATUS_NOT_ACCEPTED.

Entry point (MdsHalt) is called by NDIS library to halt the MDSL NIC.

Inputs

MdslAdapterContext: The handle initialized by MdslInitialize

Outputs

None.

Process

Figure 11H:
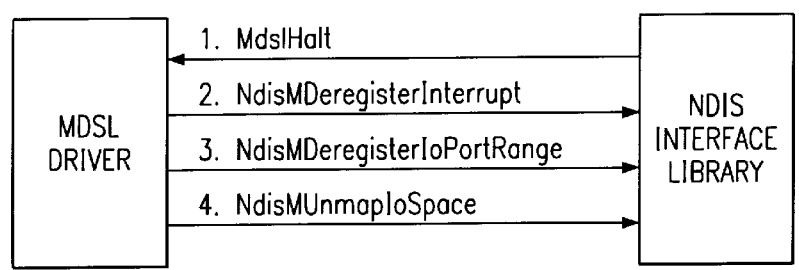

The MdsalHalt will:
1. Deregister the interrupt handling
2. Unmap the MDSL memory from the system
3. Free system memory FIG. 11h depicts the interaction between the NDIS library and the driver for MdsalHalt.

Entry point (MdslCheckForHang) is called by NDIS library periodically to check the state of MDSL NIC.

Inputs

MdslAdapterContext: The handle initialized by MdslInitialize

Outputs

Return Value: TRUE if the MDSL NIC is not operating

Processing

Checks the MDSL NIC status.

Entry point (MdslEnableInterrupt) is called by NDIS library to enable the MDSL NIC to generate interrupts.

Inputs

MdslAdapterContext: The handle initialized by MdslInitialize

Outputs

Return Value: None

Process

Enable the MDSL NIC hardware to generate interrupts.

Entry point (MdslDisableInterrupt) is called by NDIS library to disable the MDSL NIC from generating any interrupts.

Inputs

MdslAdapterContext: The handle initialized by MdslInitialize

Outputs

Return Value: None

Process

Disable the MDSL NIC hardware from generating any interrupts.

MdslISR is the MDSL driver interrupt service routine entry point.

Inputs

MdslAdapterContext: The handle initialized by MdslInitialize

Outputs

InterruptRecognized: If the MDSL NIC is sharing an interrupt line and it detects that the interrupt came from its NIC, MDSL driver will set this parameter to be TRUE.

QueueMdslHandleInterrupt: If MDSL NIC is sharing an interrupt line and if MslHandleInterrupt must be called to finish handling of the interrupt, this parameter will be set to be TRUE.

Return Value: None.

Processing

This function runs at a high priority in response to an interrupt. It leaves lower priority work to MdslHandleInterrupt. It will do:

1. Get interrupt reason
2. Clear interrupt in hardware
3. Set InterruptRecognized and QueueMdslHandleInterrupt accordingly.

Entry point (MdslHandleInterrupt) is called by the deferred processing routine in the NDIS library to process an interrupt.

Inputs

MdslAdapterContext: The handle initialized by MdslInitialize

Outputs

Return Value: None

Processing

The MdslHandleInterrupt will do:

1. Check MDSL NIC to get the reason for the interrupts
2. Process the following possible interrupts one by one:
   A packet has just been put into the receiving buffer
   A packet has just been sent ou
   Line has just been connected
   Line is disconnected
   Line has been down
   receiving buffer over Entry point (MdslQueryInformation) is called by NDIS library to query the capabilities and status of the MDSL driver.

Inputs

MdslAdapterContext: The handle initialized by MdslInitialize

OID: Object ID of a managed object (or information element) in the Management Information Block where the driver stores dynamic configuration information and statistical information. Refer to NDIS 3.0 specification for its formats and definitions.

InformationBuffer: A buffer that will receive information

InformationBufferLength: The length in bytes of InformationBuffer

Outputs

BytesWritten: The number of bytes actually written to InformationBuffer

BytesNeeded: The number of additional bytes needed to get the complete information for the specified object.

Return Values: MdslQueryInformation returns NDIS_STATUS_SUCCESS or the following status values:
NDIS_STATUS_INVALID_DATA
NDIS_STATUS_INVALID_LENGTH
NDIS_STATUS_INVALID_OID
NDIS_STATUS_NOT_ACCEPTED
NDIS_STATUS_NOT_SUPPORTED
NDIS_STATUS_PENDING
NDIS_STATUS_RESOURCES Processing MDSL driver will only acknowledge the following OIDs synchronously:

OID_GEN_HARDWARE_STATUS: check the hardware status of MDSL NIC

OID_GEN_MEDIA_SUPPORTED: return NdisMediumWan

OID_GEN_MEDIA_INUSE: return NdisMediumWan

OID_GEN_MAXIMUM_LOOKAHEAD: return maximum packet size (1532 bytes).

OID_GEN_MAXIMUM_FRAME_SIZE: return maximum frame size for MDSL (1500 bytes).

OID_GEN_LINK_SPEED: return link speed of MDSL (384000 bps).

OID_GEN_TRANSMIT_BUFFER_PACE: return maximum packet size (assuming there is only one packet allowed in the transmit buffer).

OID_GEN_RECEIVE_BUFFER_SPACE: return maximum packet size in receiving buffer (assuming only one packet is allowed).

OID_GEN_TRANSMIT_BLOCK_SIZE: return maximum packet size.

OID_GEN_RECEIVE_BLOCK_SIZE: return maximum packet size.

OID_GEN_VENDOR_ID: return vendor ID.

OID_GEN_VENDOR_DESCRIPTION: return vendor description string.

OID_GEN_CURRENT_LOOKAHEAD: return maximum packet size.

OID_GEN_MAC_OPTIONS: The following bits will be set:
NDIS_MAC_OPTION_RECEIVE_SERIALIZED,
NDIS_MAC_OPTION_NO_LOOPBACK and
NDIS_MAC_OPTION_TRANSFERS_NOT_PEND OID_GEN_DRIVER_VERSION: return MDSL driver major and minor version number.

OID_GEN_MAXIMUM_TOTAL_SIZE: return maximum packet size.

OID_WAN_MEDIUM_SUBTYPE: Since MDSL is not yet defined by MicroSoft, NdisWanIsdn is returned.

OID_WAN_GET_INFO: return NDIS WAN info structure.

OID_WAN_PERMANENT_ADDRESS: return WAN address.

OID_WAN_CURRENT_ADDRESS: return WAN address.

OID_WAN_GET_LINK_INFO: return MdslLinkContext

For all the other OIDs return NDIS_STATUS_INVALID_OID

Figure 11I:
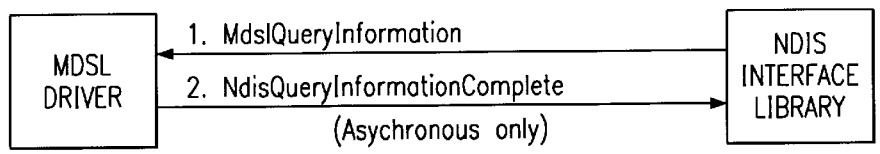

FIG. 11i depicts the interaction between the NDIS library and the driver for MdslQueryInformation.

Entry point (MdslSetInformation) is called by NDIS library to change the information maintained by the MDSL driver.

Inputs

MdslAdapterContext: The handle initialized by MdslInitialize

OID: Object ID of a managed object (or information element) in the Management information Block where the driver stores dynamic configuration information and statistical information. Refer to NDIS 3.0 specification for its formats and definitions.

InformationBuffer: A buffer that stores information

InformationBufferLength: The length in bytes of InformationBuffer

Outputs

BytesRead: The number of bytes read from InformationBuffer

BytesNeeded: The number of additional bytes needed to satisfy the OID.

Return Values: MdslQueryInformation returns NDIS_STATUS_SUCCESS or the following status values:
  NDIS_STATUS_INVALID_DATA
  NDIS_STATUS_INVALID_LENGTH
  NDIS_STATUS_INVALID_OID
  NDIS_STATUS_NOT_ACCEPTED
  NDIS_STATUS_NOT_SUPPORTED
  NDIS_STATUS_PENDING
  NDIS_STATUS_RESOURCES Processing MDSL driver will only acknowledge the following OIDs synchronously:

OID_GEN_CURRENT_LOOKAHEAD: return NDIS_STATUS_SUCCESS directly without doing anything since WAN drivers always indicate the entire packet regardless of the lookahead size.

OID_GEN_WAN_SET_LINK: copy the MdslLinkContext stored in the InformationBuffer into MDSL WanLinkInfo structure.

For all the other OIDs return NDIS_STATUS_INVALID_OID

Figure 11J:
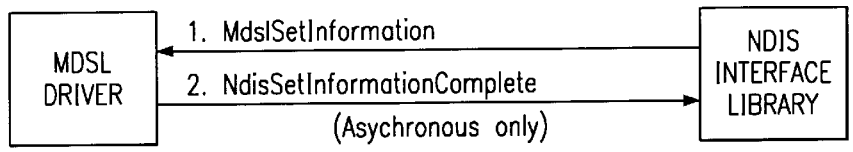

FIG. 11j depicts the interaction between the NDIS library and the driver for MdslSetInformation.

Function (MdslReceivePacket) is called by MdslHandleInterrupt to handle a packet receive interrupt. This function is used to replace NDIS MdslTransferData entry point since MDSL driver does not call NdisTransferData to transfer data from receiving buffer to the protocol stack.

Inputs

MdslAdapterContext: The MDSL adapter handle initialized by MdslInitialize

Outputs

None

Return Value: None.

Process

MdslReceivePacket will do:

1. Check receive status to see if there is any error during data transmission. Drop the bad packets and indicate the error to the NDIS wrapper.
2. Call NdisMWanIndicateReceive to indicate that a packet has arrived and that the entire packet is available for inspection.
3. If the above call returns NDIS_STATUS_SUCCESS, call NdisWanIndicateReceiveComplete to indicate the end of a receive event.

Figure 11K:
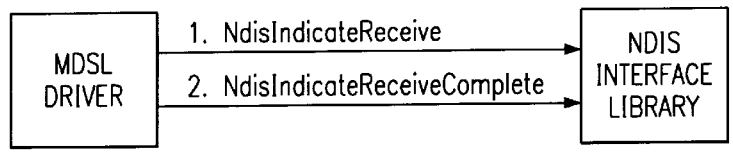
Figure 11L:
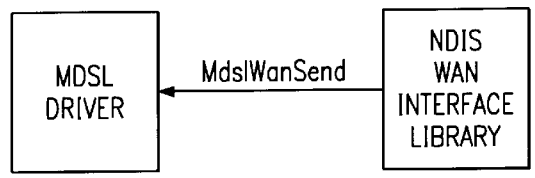

FIG. 11k depicts the interaction between the NDIS library and the driver for MdslReceivePacket.

Entry point (MdslWanSend) is called by NDIS library to instruct MDSL NIC driver to transmit a packet through the adapter onto the medium. If the medium is busy at the moment when this call comes, MDSL driver will queue the send command for a later time or lower the Maximum Transmit value.

Inputs

MdslBindingHandle: The handle returned from MdslInitialize

MdslLinkHandle: The handle returned from NDIS_MAC_LINK_UP indication when line is connected.

WanPacket: A pointer to the NDIS_WAN_PACKET structure containing a pointer to a contiguous buffer.

Outputs

Status: A status value specifying information about the error if the return value is not NDIS_STATUS_SUCCESS or NDIS_STATUS_PENDING Return Values: MdslWanSend returns NDIS_STATUS_SUCCESS or the following status values:
  NDIS_STATUS_PENDING
  NDIS_STATUS_FAILURE Processing MdslWanSend will do:

1. Check the packet size to make sure it is valid
2. Check if the line is currently connected
3. If medium is not currently busy, send the packet right away and return NDIS_STATUS_SUCCESS. If it is busy, put the packet in the transit list and return NDIS_STATUS_PENDING. After the this packet has been sent out, MDSL driver will call NdisWanSendComplete to indicate the completion of the sending event.

FIG. 11i depicts the interaction between the NDIS library and the driver for MdslWanSend.

System Integration

Figure 11M:
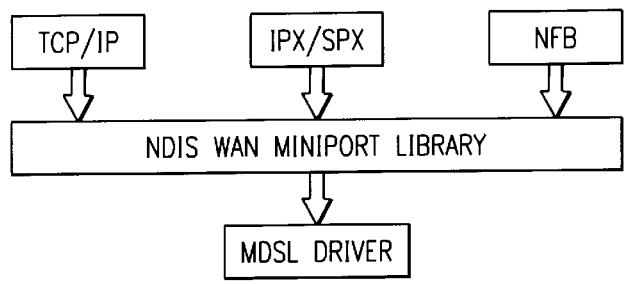

Under Windows NT or Windows 95, the various network software components are linked together, or bound into a logical hierarchy as depicted in FIG. 11m.

Figure 11N:
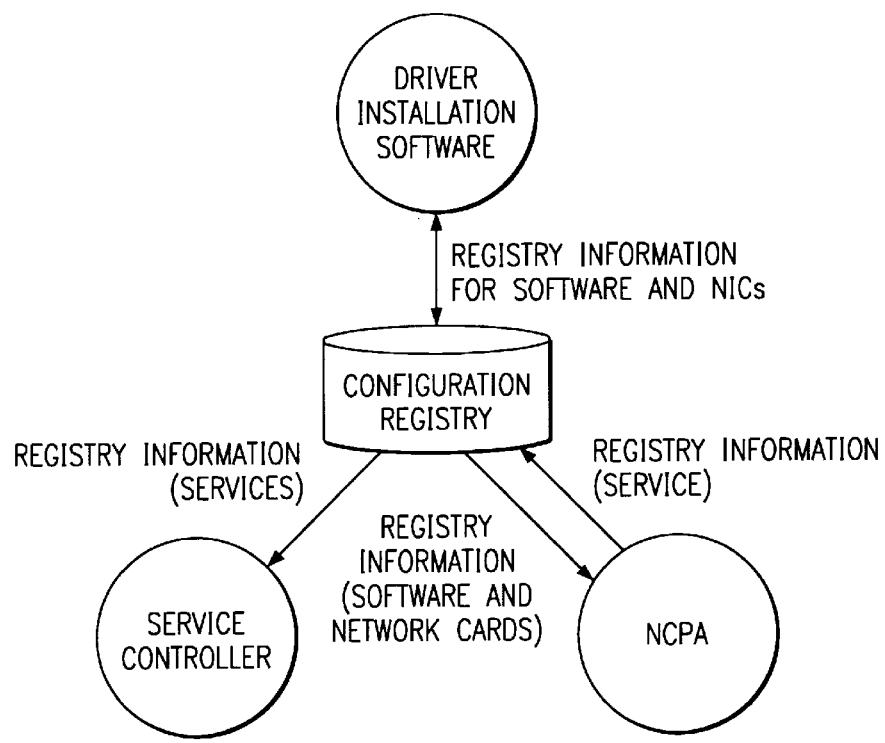

When network components are installed, information is written to the Windows NT Registry that describes the order in which the network components should be loaded, and how those network components are to be bound together. The Windows NT Control Panel Network Applet (NCPA) manages the network component installation and binding. The driver binding works as depicted in FIG. 11n.

The External Interfaces for the system are as follows:

User Interfaces

MDSL driver does not expose to the end users directly. It is bound with the protocol stack in the system through NDIS wrapper. Application win use it though different standard protocol APIs such as window socket, NetBIOS, RPC, etc.

Hardware Interfaces

The hardware interfaces of MDSL driver is described in MDSL Host Interface Requirement Specification.

Software Interfaces

MDSL driver provide 13 Upper-Edge Functions and one driver main entry point to the Operating System. It will call functions defined in ndis.lib and ndiswan.lib to implement a lot of tasks which are independent of a specific Network Interface Card (NIC).

Communication Interfaces

Packets being received and sent are in any format provided by NDIS WAN library. It can be IP data gram or other frame with or without header compression, Microsoft Point to Point compression, and encryption. It can also be a simple HDLC frame if the Simple HDLC Framing switch is turned on in NDIS WAN Library. All these higher layer framing are transparent to the MDSL driver.

Design Constraints

The design must be compliant with NDIS 3.0 WAN driver specification.

Attributes

Availability/Recovery

Errors during entry point processing will not result in catastrophic failure of the driver. The error will be passed to the calling entity and NDIS will perform appropriate processing. Failures in initializing the MDSL NIC or establishing a line connection will result in an error being returned to the calling entity. Errors during receiving/sending packets are logged.

Software acquisition

Figure 12:
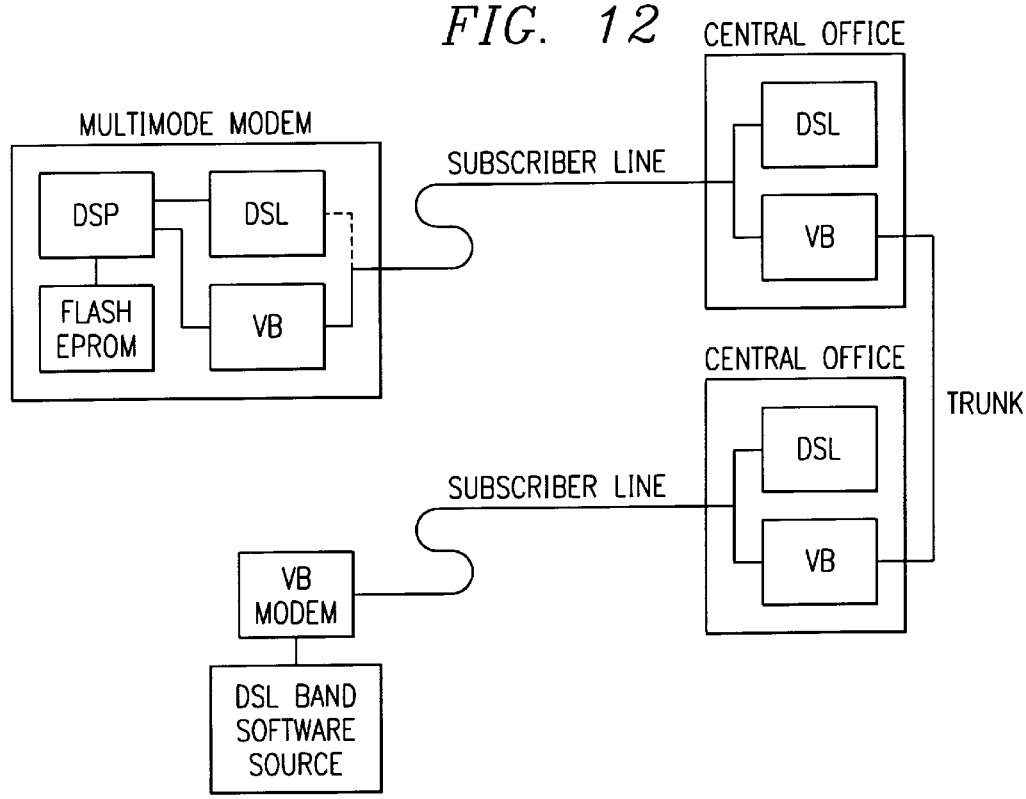
FIG. 12 shows preferred embodiment downloading.

The software to configure a multimode modem as to its DSL band operation can be acquired by downloading into a Flash EPROM (see FIG. 5a of a board version of a DSL modem enhanced to include Flash EPROM). This downloading can be performed by using the voice-band configuration (V.34) already in the multimode modem. In particular, a host can use voice-band modem operation to call a source telephone number which then can download the software for DSL band operation over the voice-band to the Flash EPROM. In the same manner, updates of the DSL band software can be downloaded either over voice-band or over DSL band. FIG. 12 illustrates such a downloading process.

Figure 13A:
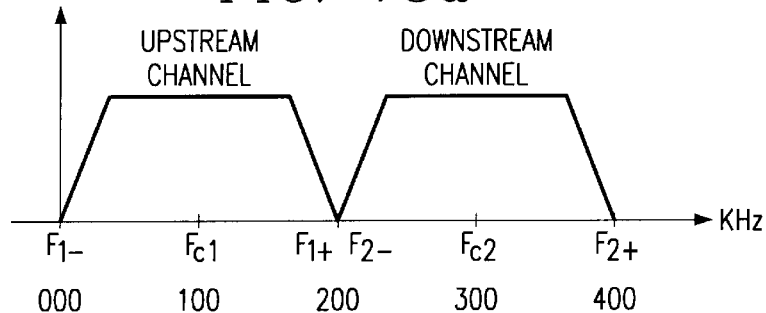
FIGS. 13a–g show preferred embodiment sampling rate conversion.

Referring now to FIG. 13a, there may be seen the MDSL frequency division for upstream and downstream. In voice-band modems, the highest frequency of interest is only 3.3 KHz. In MDSL, the highest frequency of interest can be hundreds of KHz. For example, for ¼ T1 rates, the center frequency of the upstream channel $F_{c1}$ is 100 KHz while the center frequency of the downstream channel $F_{c2}$ is 300 KHz. The bandwidth of each channel is 200 KHz and the highest frequency of interest is $F_{2+}$=400 KHz. The challenge is to be able to process the data with a low cost programmable digital signal processor (DSP). This invention addresses how to reduce the processing requirements by making either passband signal depicted in FIG. 13a appear identical to the DSP.

The MDSL modem has two modes the central office (CO) and remote user (RU) modes. In the CO mode, the modem transmits in the upper frequency band and receives in the lower frequency band. In the RU mode the reverse occurs. The modem transmits in the lower frequency band and receives in the upper frequency band.

Using the normal interpretation of the Nyquist Sampling Theorem, a minimum sampling rate twice the highest frequency of interest is required to process the data. For the CO modem, the analog-to-digital converter (ADC) can sample the received signal at twice $F_{1+}$. However, it must generate samples for the digital-to-analog converter (DAC) at twice $F_{2+}$. For the RU modem, the DAC can run at twice $F_{1+}$. However, the ADC must run at twice $F_{2+}$.

This invention makes use of digital sampling rate conversion to decrease the sampling rate and consequently the processing requirements for the implementation of the MDSL modem.

Figure 13B:
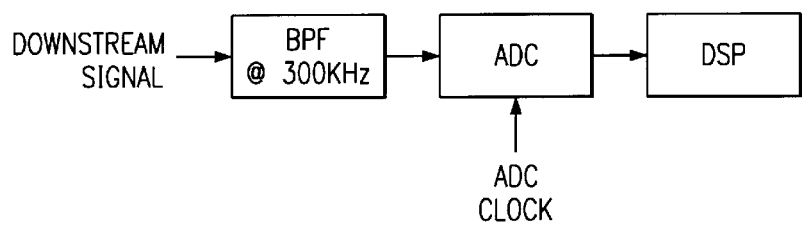

For the RU modem, the high sampling rate is connected with the analog-to-digital conversion process. The ¼ T1 example modem receiver front end is shown in FIG. 13b at the RU modem. The incoming analog signal, centered at 300 KHz is first bandpass filtered to maximize the signal to noise ratio by isolating the bandwidth of interest. The signal is then sampled by the ADC at the normal Nyquist rate of twice $f_{2+}$, 800 KHz.

Figure 13C:
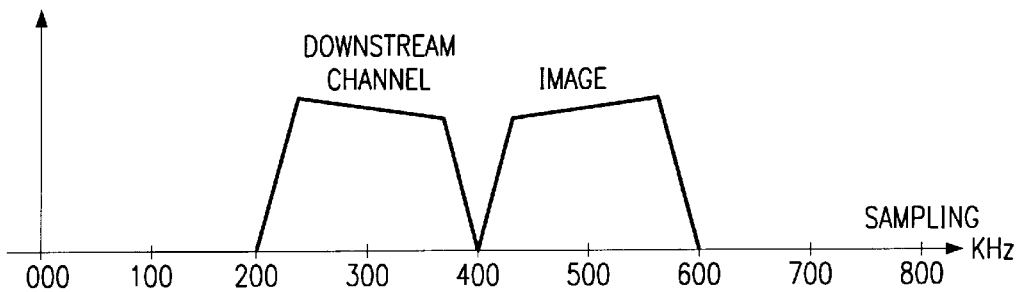
Figure 13D:
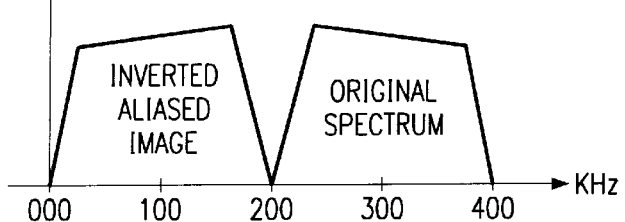

The sampled spectra in the digital domain is shown in FIG. 13c. Because there is no signal below $F_{sampling}/4$=200 KHz, the sampling rate can be safely reduced to 400 KHz by decimating the samples by two. Decimation by two generates an inverted image centered at 100 KHz as shown in FIG. 13d.

The original image can be obtained by multiplying every other sample of the decimated data stream by (−1). Since every other output from the ADC is being discarded, there is no need to generate them, i.e. the ADC can run at 400 KHz instead of 800 KHz.

Figure 13E:
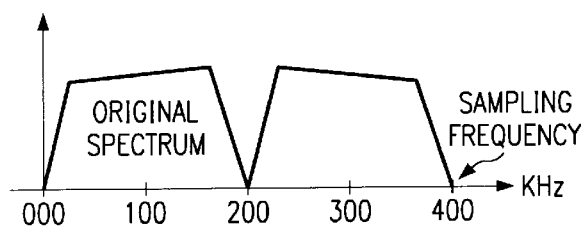

For the CO modem, the high output sampling rate is required in the digital-to-analog process. It would require a minimum sampling rate of 800 KHz to directly generate the output samples corresponding to the upper passband signal. It would be much better if the CO modem could generate the output samples in the lower frequency band, and somehow automatically translate the spectrum to the upper band. FIG. 13e shows the spectrum of the low band signal in the digital domain.

Figure 13F:
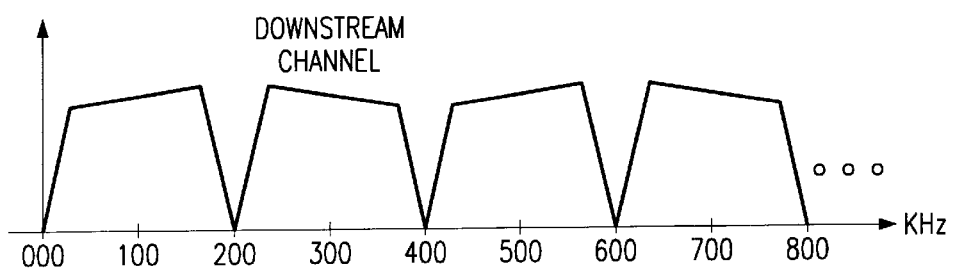
Figure 13G:
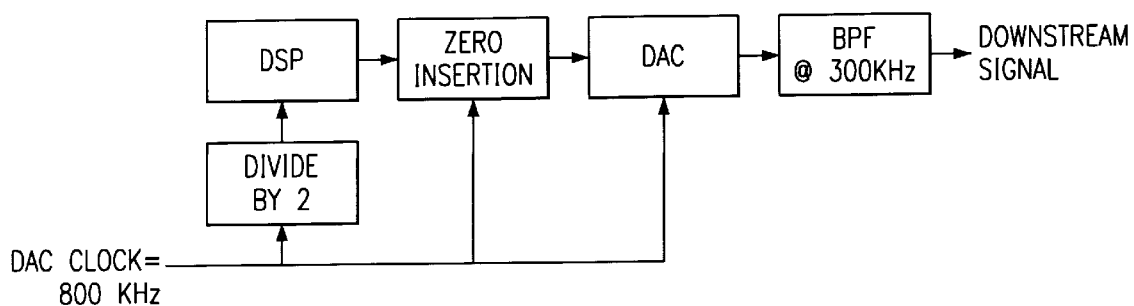

Translation can be accomplished by making use of the aliased images produced by digitally upsampling to a higher rate. Upsampling by two to 800 KHz consists of inserting a zero valued sample between the computed output samples. This generates images at harmonics of the original 400 KHz sampling Frequency. Even the new modified output data stream is passed to a DAC, the analog output spectrum shown in FIG. 13f is generated. (The since roll-off characteristic imparted by the conversion process has been left out of the figure). By the use of an appropriate analog bandpass filter, the inverted image centered at 300 KHz can be selected. Since the inserted values are zero, they need not be computed by the DSP. The inversion can be either corrected by multiplication of odd samples by (−1) or disregarded completely, since the spectrum is inverted again by the decimation process at the RU modem. As show in FIG. 13g, the zero sample interleaving process can be implemented by simple external logic outside the DSP.

In conclusion, the application of sampling rate conversion allows the DSP in the MDSL modem to assume that it is always transmitting and receiving only in the lower frequency band. Its computations are therefore based on a much lower sampling rate than would normally be dictated by the actual analog signal frequency content.

Discrete Multitone (DMT) has been chosen as the standard for Asymmetric Digital Subscriber Loops (ADSL) by the ANSI Standards Committee T1E1.4. Previous contributions to the T1E1 standards activity have made claims that 19-bit precision in the fast Fourier transforms FFT's is necessary to achieve adequate dynamic range for ADSL-2 bitrates (6–7 Mbps). The problem is how to implement the FFTs in a fixed point 16-bit processor and provide adequate dynamic range for the ADSL-2 bitrates.

Normally when implementing fixed point FFTs, the data is blindly down scaled down at each stage to prevent the fixed point values from overflowing during the multiply and add operations. If the range of data values is such that no overflow could occur during the stage, down scaling results in the unnecessary loss of precision.

The approach for solving this problem in accordance with the teachings of the present invention is preferably to implement both forward and inverse FFTs in 16-bit field point using a variable scaling scheme which examines the data before each FFT stage and scales down the data only if an overflow is possible during the stage. This removes the unnecessary loss of precision which would be caused by the 'bind' down scaling when an overflow would not occur. The need for scaling is determined by looking at the number of sign bits in the FFT data before each stage. The data is scaled by right shifting. Tests were conducted by shifting by 1 bit or 2 bits at a time. Although, in general, both shift amounts worked, in certain cases where the data values were a maximum value and with specific sine/cosine values, the single shifted value could still overflow.

The total amount of scaling during the FFT is maintained so that the FFT output data can be normalized (rescaled) at the completion of the FFT. Attached as an Appendix is the test version of C code used to test the solution. The variable scaling method does require more processing power than the "blnd" scaling, since all the data must be examined before each stage of the FFT. Simulation results show that 19-bit field point fixed scaling FFTs are only marginally better, in the expected signal-to-noise operating range, than the 16-bit variable scaled fixed point FFT.

The variable scaling of the fixed point FFT provides an advantage in any application which the data range is such that an overflow would not occur on every stage and additional processing power is available for improved precision.

In the central office end, a modem pool can be used to handle multiple MDSL lines. Although a dedicated line coupling and front end circuit is necessary for each MDSL line, the signal processing power of a high performance DSP chip can be shared among multiple MDSL lines. The multiple line capability of an MDSL modem pool can be further enhanced by incorporating multiple DSP chips within a single modem pool unit.

Figure 14A:
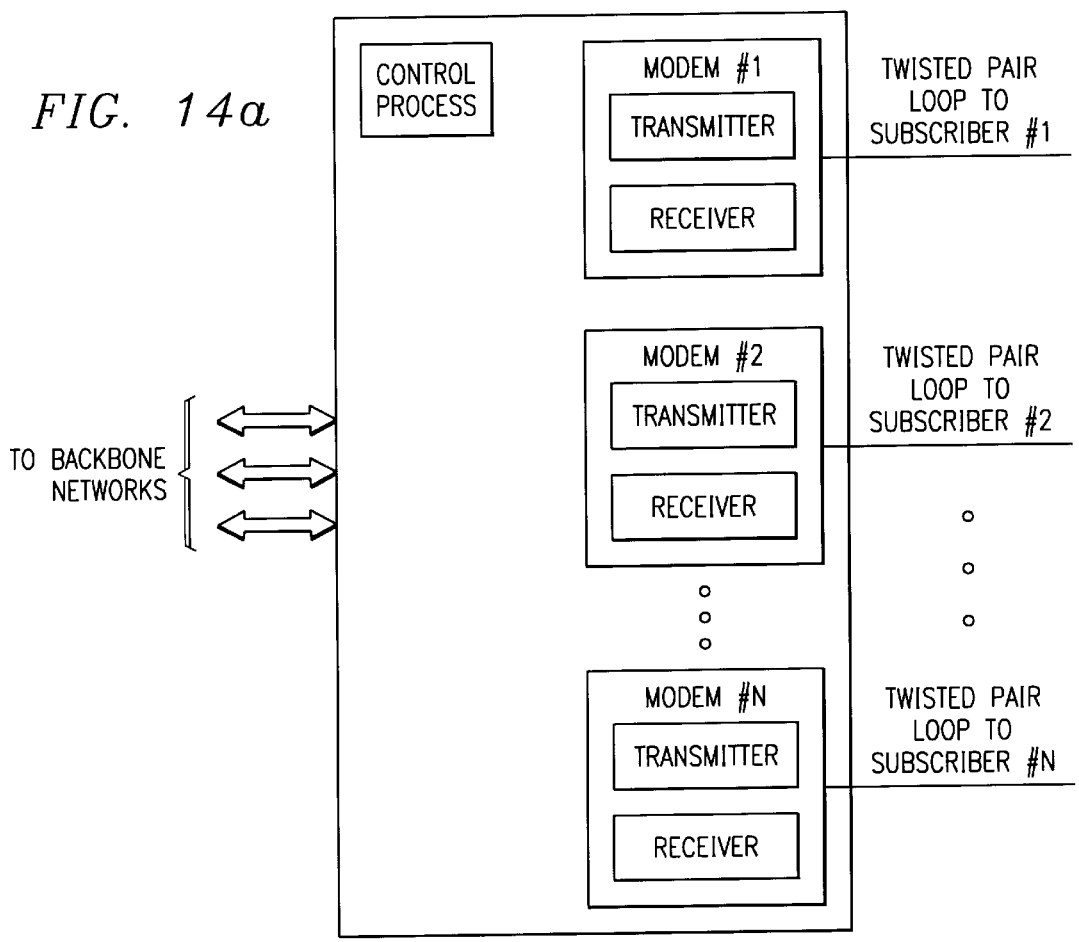
FIGS. 14a–e show preferred embodiment modem pool.

FIG. 14a shows that an MDSL modem pool can have N logical MDSL modems, each consisting of a transmitter part and a receiver part. Due to the location of the modem pool, transmitters can be synchronized to the same central office clock. Because of the MDSL line concentration and the shared modem pool architecture, data symbols of the transmit signal and samples of the received signal are readily accessible among all logical modems. The transmit signal synchronization and the transmit and received signal accessibility enable the adaptation of NEXT cancellation technique. A multiple input-multiple output NEXT canceller can be implemented in conjunction with an MDSL modem pool.

Figure 14B:
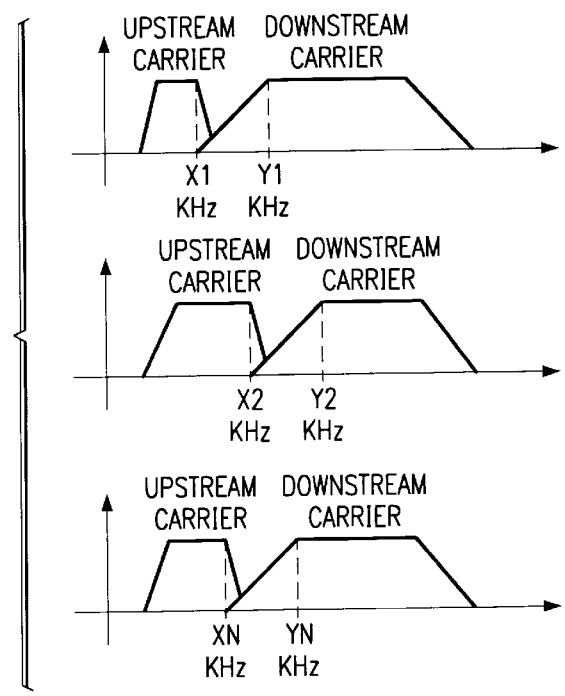

To avoid the NEXT and the cost of echo cancellation hardware, a preferred MDSL modem uses frequency division duplex for transmission from a central office to a subscriber in the downstream direction and vice versa in the upstream direction. The downstream transmission normally occupies the higher frequency part of the MDSL spectrum. The frequency separation between the downstream and the upstream directions is based on the use of high order bandpass filters. FIG. 14b shows that a guardband is used between the upstream frequency band and the downstream frequency band spectrum. Furthermore, the bandwidth of each downstream spectrum can be different for different modems. This might be necessary because the spectral allocation could be optimized according to the individual line conditions and downstream to upstream throughput ratio.

Because of the finite amount of attenuation in the bandpass filter stopband and the closeness between downstream and upstream spectra, there will always be some residue noise from the reverse channel. Due to the heavy subscriber line attenuation, the relative strength of residual noise might not be negligible compared with that of the received signal. Because of the possibility of upstream and downstream spectra overlapping among different MDSL lines, the NEXT noise can occur within the region of guardband. Hence, the NEXT cancellation can be used to minimize the interference of reverse channel residual noise of the same MDSL line and the interference of reverse channel NEXT noise from adjacent MDSL lines.

Figure 14C:
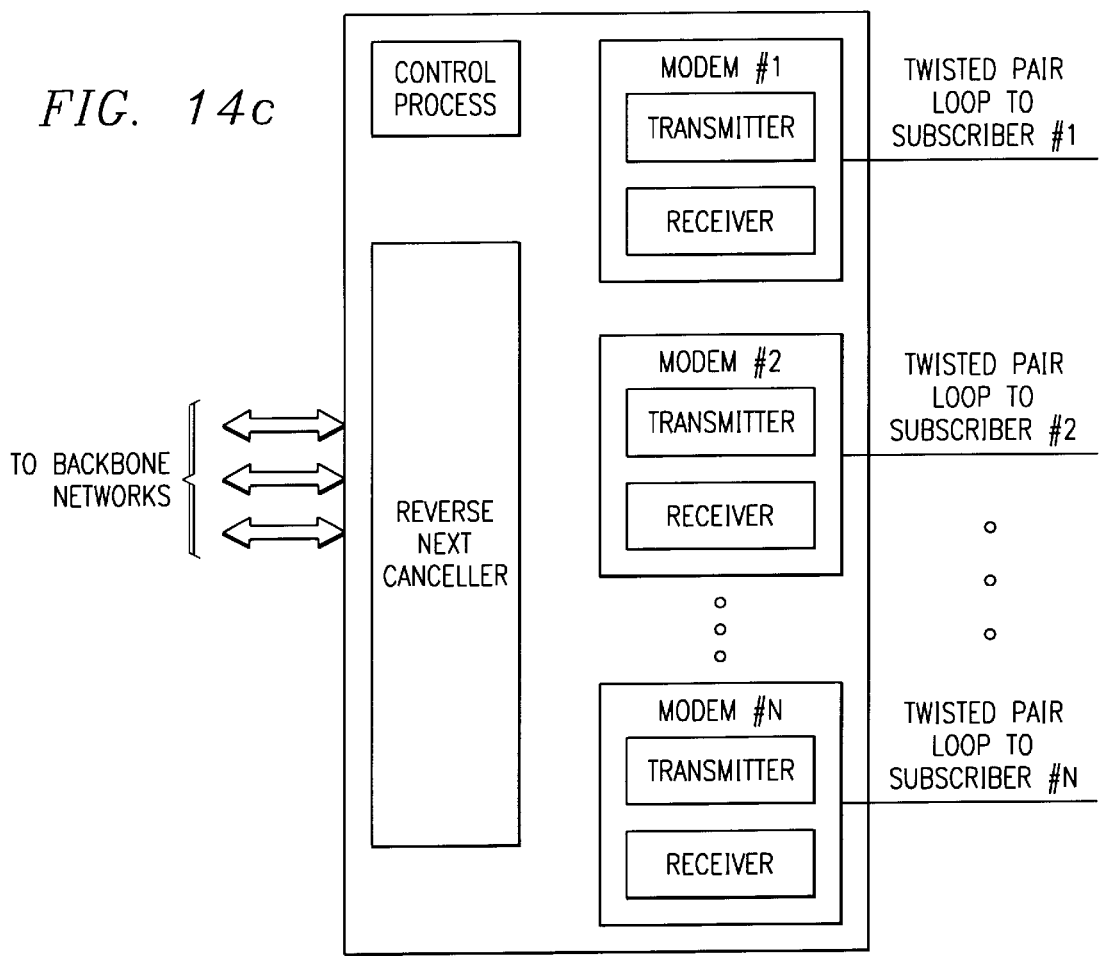
Figure 14D:
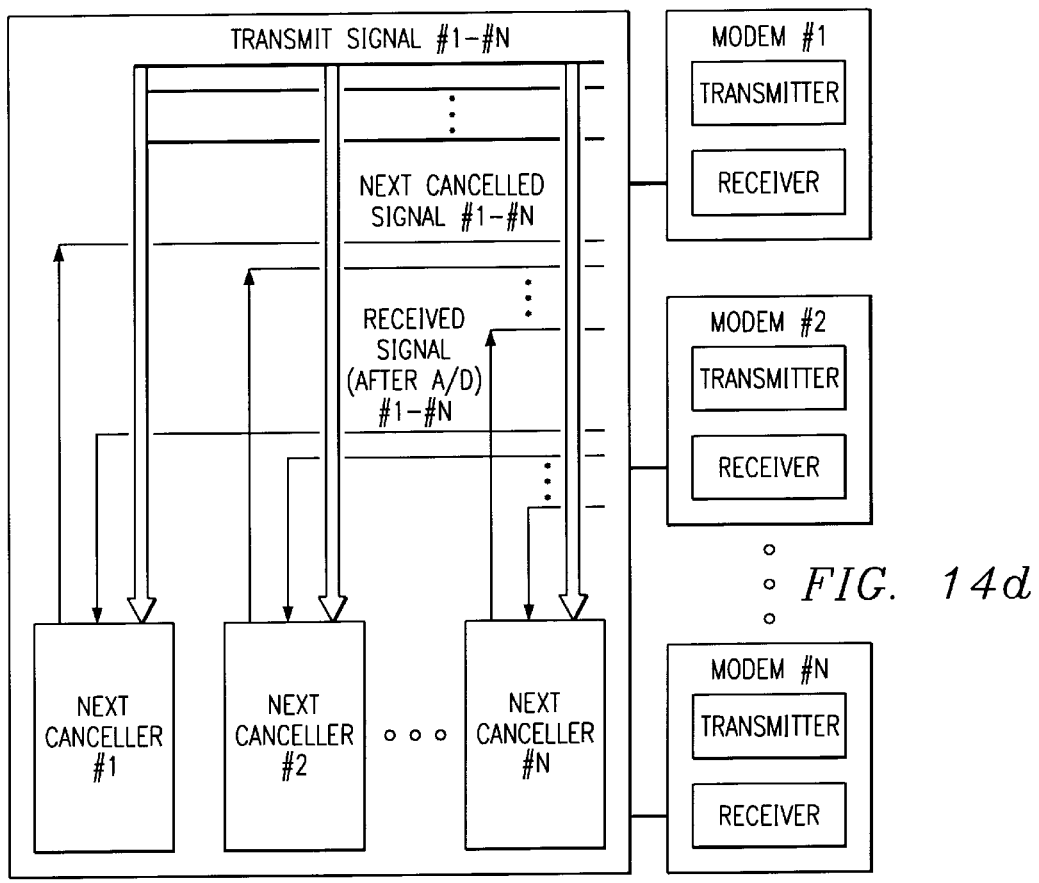
Figure 14E:
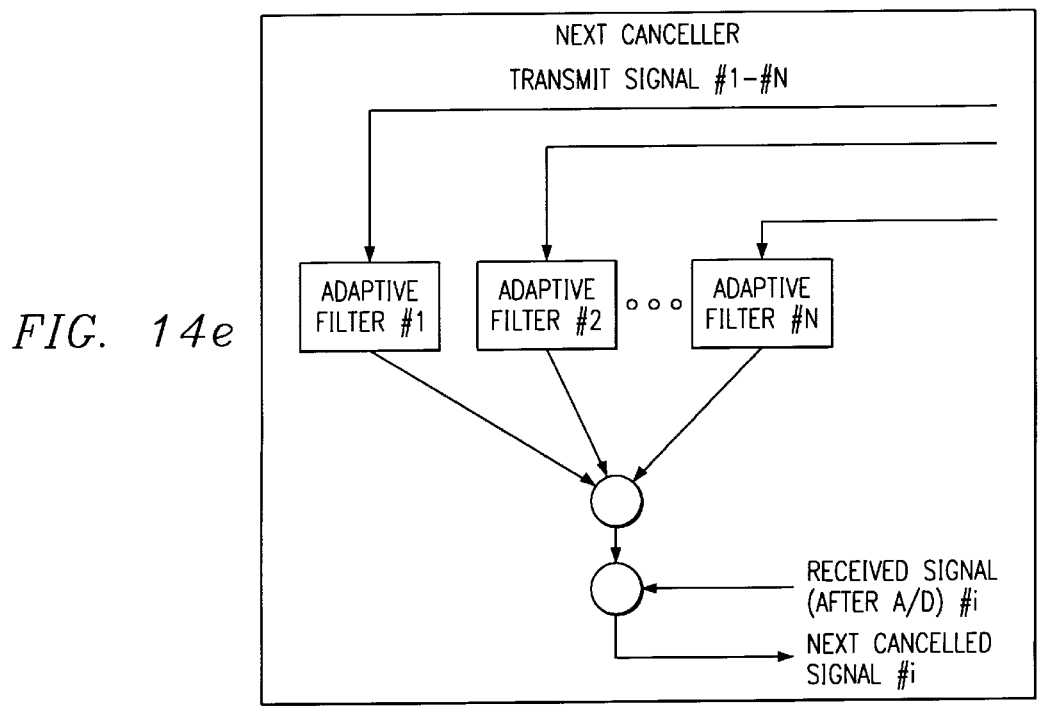

FIG. 14c shows that a reverse channel NEXT canceller bank can be implemented within the same MDSL modem pool unit with or without additional DSP chips. The NEXT canceller bank needs the access to the transmit signal and the digitized received signal of all modems. The NEXT canceller bank has N NEXT cancellers as depicted in FIG. 14d corresponding to N MDSL modems. Each canceller has N adaptive filters of size M. Outputs of all N adaptive filters are appropriately combined to form the NEXT cancellation signal for the corresponding modem. Each adaptive filter is adapted according to the error signal between the received signal and the NEXT cancellation signal and the corresponding transmit signal as the correlation vector as depicted in FIG. 14e.

Unshielded twisted pairs can be used for high data rate digital transmission. For the case of Digital Subscriber Lines (DSL) extensive digital signal processing, such as transmit signal shaping and received signal equalization, is employed to exploit the full capacity of the twisted pair transmission medium. Therefore, the cost of modems at both ends of the twisted pair become a significant part of the total cost of the transmission system. When the transmission distance is relatively short, a simple analog line driver is used for the transmitter and a simple threshold device is used for the receiver. By avoiding the use of extensive digital signal processing, the transceiver cost can be kept at a minimum level.

Using the observation that the high-rate high-precision A/D and subsequent high-precision digital signal processing is an expensive channel distortion compensation approach, a direct equalization method of the present preferred embodiment utilizes symmetrical twisted pair transmission channels that extends the transmission distance while keeping cost minimal. This direct equalization method can also be applied to non-twisted pair symmetrical transmission channels.

Many short distance twisted pair based transmission systems, such as 10 BaseT and 100 BaseT Ethernet, ATM 55 Mbps Physical Layer, IEEE 1394, IEEE 1355, etc., have a symmetrical channel response. Because there are no bridged taps, channel transfer functions in opposite directions are identical for time-division duplex systems. In these cases, the channel response can be identified by examining the received signal. Specifically, it can be identified by transmitting training sequences during idle time between data transmission periods. Easily distinguished binary training sequences are preferred for channels with severe distortion.

Figure 15A:
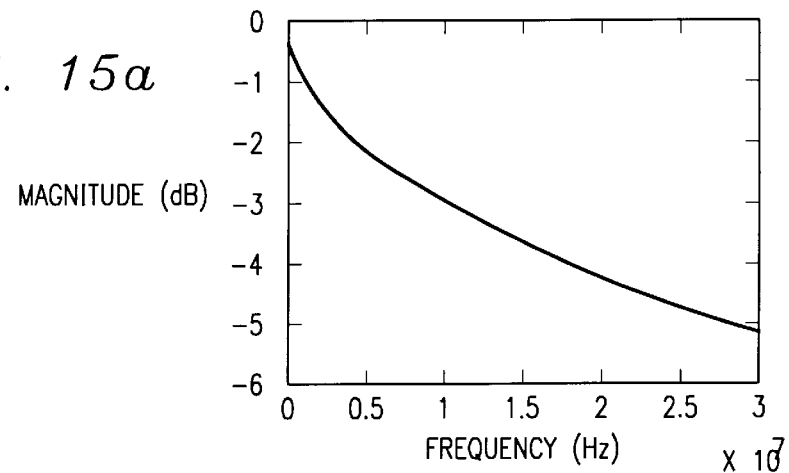
FIG. 15a shows a channel transfer function of a 24 gauge 50 meter twisted pair.
Figure 15B:
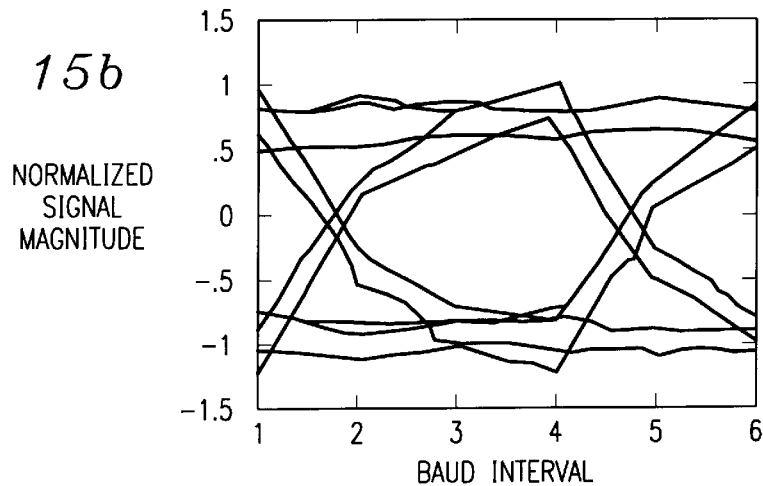
FIG. 15b shows an eye pattern without channel distortion compensation.

FIG. 15a shows the channel transfer function of a 50 meter 24 gauge twisted pair. The channel distortion is caused by differences in attenuation and phase delay at different frequencies. The channel distortion causes intersymbol interference which cause the eye pattern to close. FIG. 15b shows the eye pattern of the received signal at the end of a 50 meter 24 gauge twisted pair. The degree of the eye pattern closing can be judged by the relative signal level spread at the maximum eye opening point. The time interval at which the transmitted signal levels can be reliably determined is also very important. In a practical system, timing jitter exists between the transmitter and the receiver. A wider available decision window would decrease jitter requirements.

The eye pattern closing caused by channel distortion can be compensated by the use of a channel equizer. Specifically, the distortion compensation at the baud rate will reduce the spread of signal level at the optimal decision point. Furthermore, the above baud rate distortion can expand the available decision window. In other words, a baud rate equalizer can only maximize the eye opening at a particular decision point while a fractional spaced equalizer can maximize the eye opening at more than one point, thus expanding the optimal decision window.

Figure 15C:
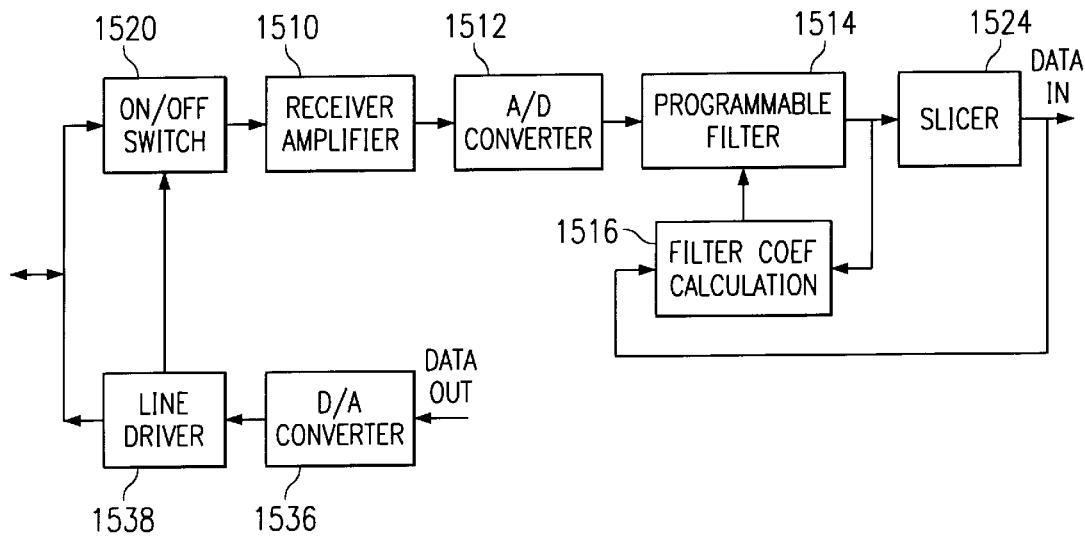
FIG. 15c shows the structure of a conventional equalizer.

A traditional channel equalizer implemented in the receiving path of a transceiver is seen in FIG. 15c. The received signal is amplified 1510 and converted into digital format 1512. A programmable filter 1514 with adjustable coefficients 1516 is used to compensate the channel distortion. These filter coefficients 1516 are calculated to minimize the mean squared error between the filter output signal level and the desired signal level. The calculation can be carried out based on the Least Mean Square (LMS) algorithm. Slicer 1524 quantizes to signal levels for decoding. Output data is converted to analog 1536, and line driver 1538 transmits them with switch 1520 providing isolation.

The realization of the conventional equalizer usually requires a full-precision programmable filter. Depending on the channel distortion and the number of signal levels, an A/D converter 1512 with 6 to 10 bits of resolution is necessary. This A/D converter must operate at or above the symbol rate. A baud rate based channel equalizer ranging from 10 MHz to 30 MHz also needs a highly accurate timing recovery circuit. The programmable filter 1514 after the A/D converter should have the same or higher bit resolution in the data path to make the equalization process effective. The high resolution and high operating rate A/D converter and the following programmable filter of the same resolution and the same operating rate translate into a high transceiver cost.

In a noiseless environment, the equalization function that compensates for the frequency distortion of the channel can also be performed using a programmable filter in the transmitter. These transmitter filter coefficients are adapted in real time by using a training sequence. During data idle time periods, a bi-level training sequence is transmitted for the purpose of filter coefficient adaptation. The receiver correlates the received training sequence with the known training sequence and updates the equalizer filter coefficients using an adaptation algorithm, such as the Least Mean Squared (LMS) algorithm. Since the channel is symmetrical, the identified equalizer coefficients are then used for the programmable transmitter filter.

Figure 15D:
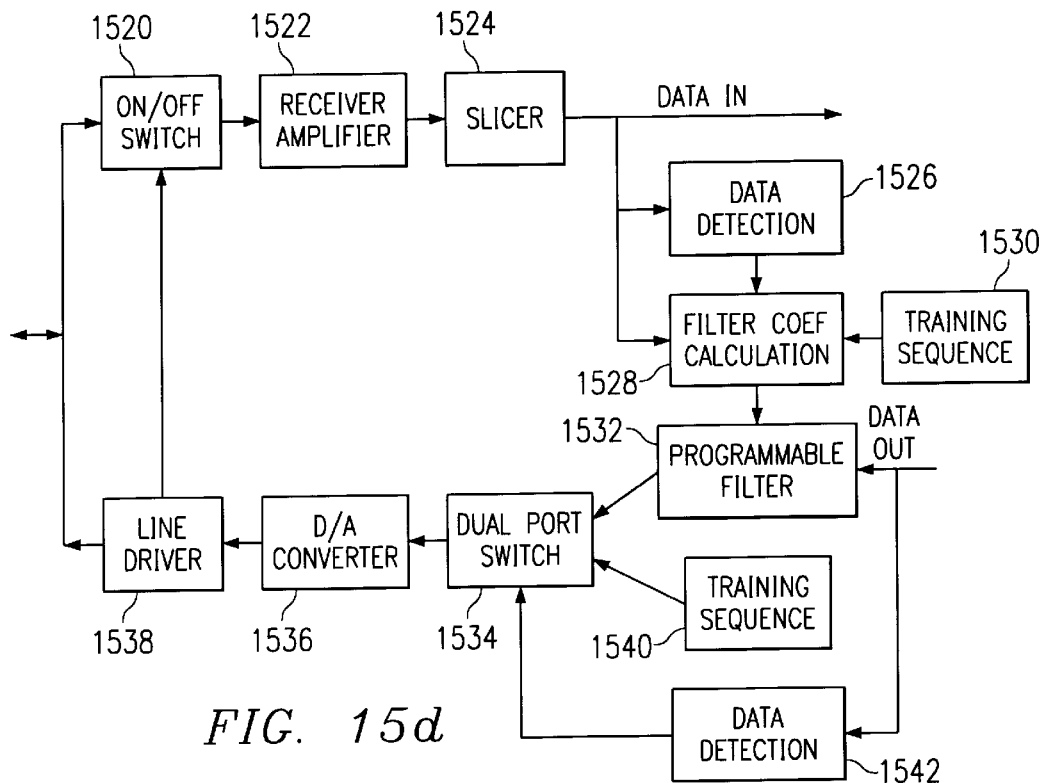
FIG. 15d shows the direct equalizer system.

The direct equalizer system of the present preferred embodiment includes a transmission path and a receiving path, as depicted in FIG. 15d. In the transmission path there is a switch 1534 controlled by the data buffer status to multiplex the training sequence 1540 and the data. When the data buffer is idle the training sequence is linked to the D/A conversion device 1536. To avoid transmission collision, a higher layer protocol algorithm is also necessary to regulate the transmission of training sequences at both ends. In the receiving path, a received data detection function is necessary to control the adaptation of the transmitter filter coefficients. The combination of the transmit filter 1532 and its adaptation mechanism forms a direct channel equalizer. The filter coefficients can he updated periodically using a Digital Signal Processor (DSP) in a few baud intervals.

The direct equalizer of FIG. 15d also includes isolation switch 1520, amplifier 1522, slicer 1524, incoming data detection 1526, filter coefficient calculator 1528, timing sequence 1530, outgoing data detection 1542, digital-to-analog converter 1536 and line driver 1538.

Figure 15E:
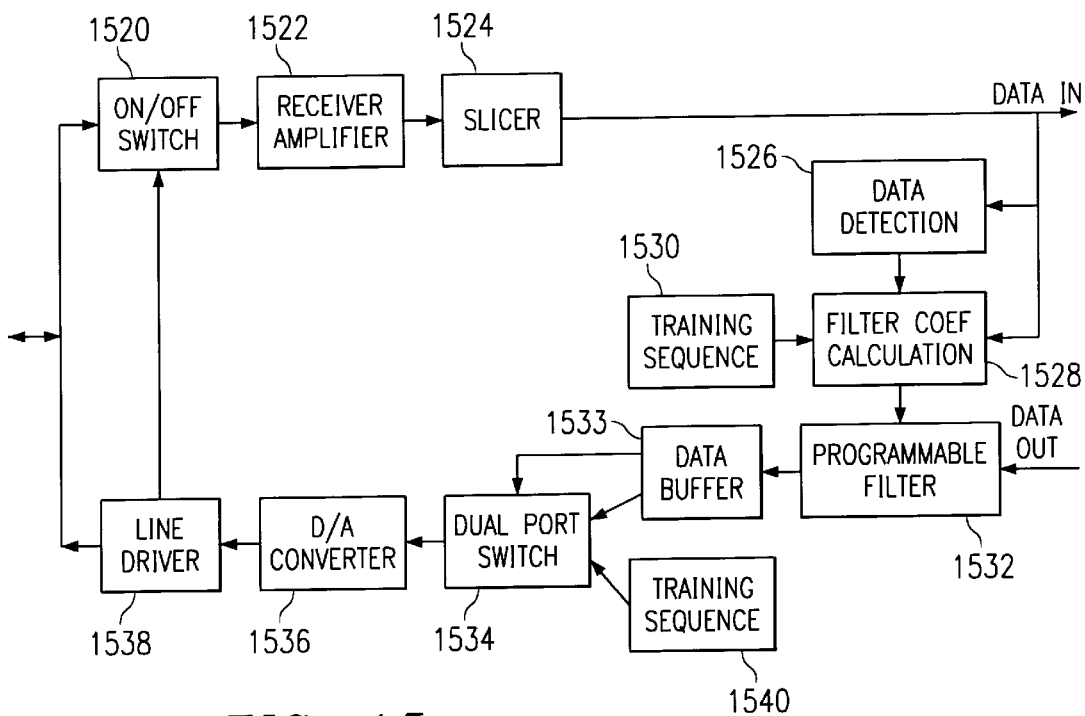
FIG. 15e shows the direct equalizer with buffer.

In place of a high cost high speed digital programmable filter, a data buffer 1533 can also be used, as shown in FIG. 15e. The data buffer 1533 can be periodically filled with data filtered by a DSP. This buffered approach may introduce DSP processing speed dependent transmission delay. However, a high transmission rate on the twisted pair can be maintained.

Figure 15F:
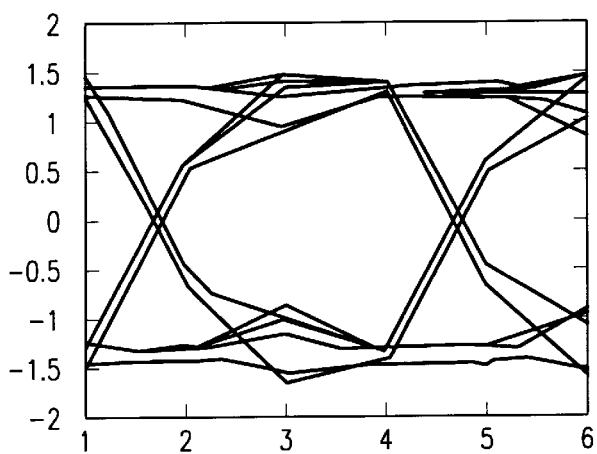
FIG. 15f shows the effect of baud rate equalization.

A baud rate equalizer, either at the receiver or at the transmitter, can only compensate for channel distortion at its precise sampling points. Hence, a receiver needs an accurate timing recovery circuit to keep track of these optimal sampling points (FIG. 15f).

Figure 15G:
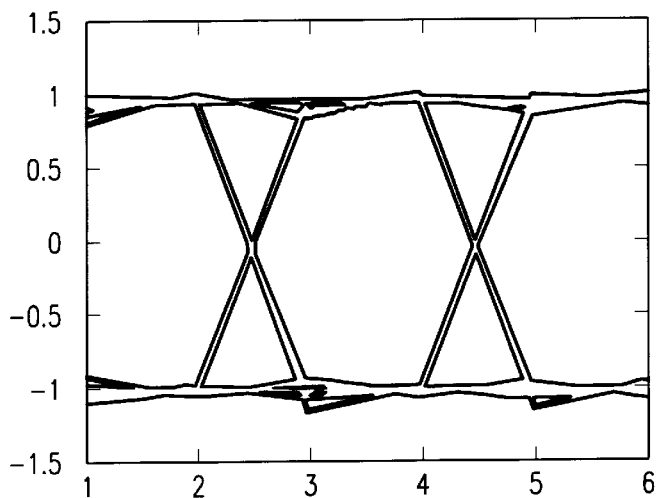
FIG. 15g shows the effect of double baud rate equalization.
Figure 15H:
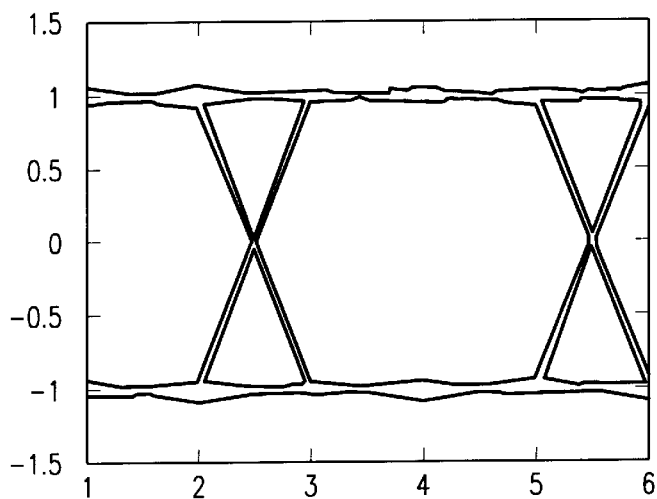
FIG. 15h shows the effect of triple baud rate equalization.

The optimal sampling window size can be expanded using a fractionally spaced direct channel equalizer. FIGS. 15g and 15h show the effects of fractionally spaced direct equalizer for equalizer operating rates of 2 times and 3 times the baud rate. Above baud rate direct channel equalizers can create optimal sampling window sizes of 50%, 66.6%, or more.

Filter coefficients for a baud rate equalizer can be calculated as $$H_{K+1} = H_k + \mu X_k (d_k - H_k^T X_k)$$

for $$H_k = \begin{bmatrix} h_1 \\ h_2 \\ \vdots \\ h_n \end{bmatrix}_k \quad X_k = \begin{bmatrix} x_k \\ x_{k-1} \\ \vdots \\ x_{k-n+1} \end{bmatrix}$$

where $H_k$ is the baud interval spaced equalizer coefficient vector, $X_k$ is the baud interval spaced received signal vector, $d_k$ is the desired signal level available from the training sequence, and $\mu$ is the adaptation step size. The filter coefficient vector for the direct equalizer system is calculated using the LMS algorithm in conjunction with quantized data from the slicer. The use of the quantized data avoids the requirement of a higher precision A/D converter. The filter coefficient adaptation is similar to the sign LMS algorithm. One has $$H_{k+1} = H_k + \mu Q(X_k)(d_k - H_k^T Q(X_k))$$

where $Q(.)$ denotes the quantization operation and $d_k$ is either +1 or −1 due to the use of a binary training sequence. The filter coefficient vector for a double baud rate direct equalizer is calculated as $$H'_{k+1} = H'_k + \mu Q(X'_k)(d_k - H'^T_k Q(X'_k))$$

$$H''_{k+1} = H''_k + \mu Q(X''_k)(d_k - H''^T_k Q(X''_k))$$

for and $$H'_k = \begin{bmatrix} h'_1 \\ h'_2 \\ \vdots \\ h'_n \end{bmatrix}_k, \quad H''_k = \begin{bmatrix} h''_1 \\ h''_2 \\ \vdots \\ h''_n \end{bmatrix}_k, \quad X'_k = \begin{bmatrix} x'_k \\ x'_{k-1} \\ \vdots \\ x'_{k-n+1} \end{bmatrix},$$

-continued $$X''_k = \begin{bmatrix} x''_k \\ x''_{k-1} \\ \vdots \\ \vdots \\ x''_{k-n+1} \end{bmatrix}$$

$$H_k = \begin{bmatrix} h'_1 \\ h''_1 \\ \vdots \\ h'_n \\ h''_n \end{bmatrix}_k, \quad X_k = \begin{bmatrix} x'_k \\ x''_k \\ \vdots \\ x'_{k-n+1} \\ x''_{k-n+1} \end{bmatrix}$$

In other words, the double baud rate equalizer is the combination of two baud rate equalizers operating at different sampling phases. The filter coefficient vector for the triple baud rate equalizer can be similarly obtained.

The direct equalization approach will enhance the spectral density at the high frequency portion of the transmit power spectrum. However, depending upon the channel characteristics, the enhancement should be in the range of only a few dB.

The power spectrum of the multiple level Pulse Amplitude Modulation (PAM) signal is $$PSD_{PAM} = A \frac{\sin^2 \frac{\pi f}{f_0}}{\left(\frac{\pi f}{f_0}\right)^2}$$

where A is related to the signal amplitude and $f_0$ is the baud rate. The frequency response of the equalizer is $$C(f) = \left( \sum_{i=-\infty}^{\infty} H\left(f - \frac{i}{T_s}\right) \right)^{-1}$$

where H(f) is the channel transfer function and $T_s$ is the equalizer operating sample interval. One has $$T_s = \frac{1}{f_0}, \quad T_s = \frac{1}{2f_0}, \quad T_s = \frac{1}{3f_0}, \text{ etc.}$$

For a typical twisted pair channel, one has $$|H(f)| = e^{-\alpha fl}$$

Where $\alpha = 1.2924 \times 10^{-10}$ for the Category 5 UTP and l=150, one has $$|C(f)| = \left( \sum_{i=-\infty}^{\infty} e^{-\alpha l \left(f - \frac{i}{T_s}\right)} \right)^{-1} \approx \left( \sum_{i=-30}^{30} e^{-\alpha l \left(f - \frac{i}{T_s}\right)} \right)^{-1}$$

for the frequency region of our interests.

Figure 15I:
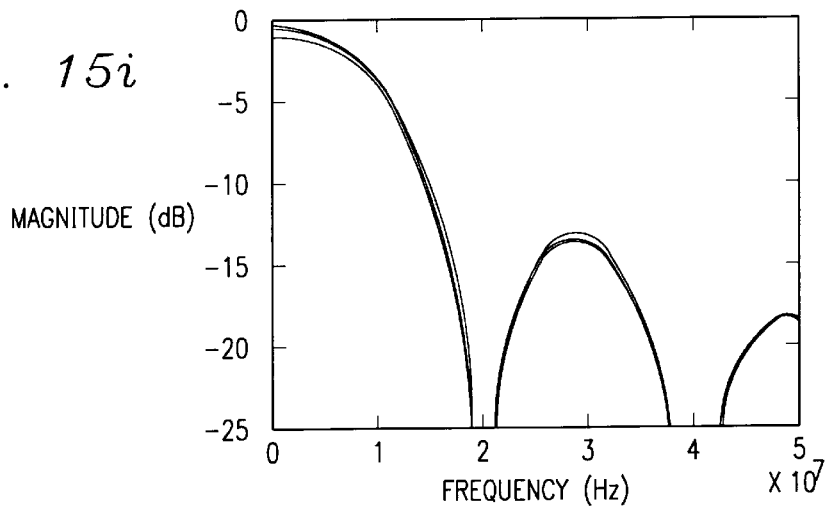
FIG. 15i shows the power spectra of direct equalized signal.

The power spectrum of equalized signal is the product of the PAM power spectrum and the squared transfer function of the eqiizer. FIG. 15i shows power spectra with direct equalizers of different operation rate. For the 50 meter CAT 5 UTP cable the power density differences are within 2 dB.

Figure 15J:
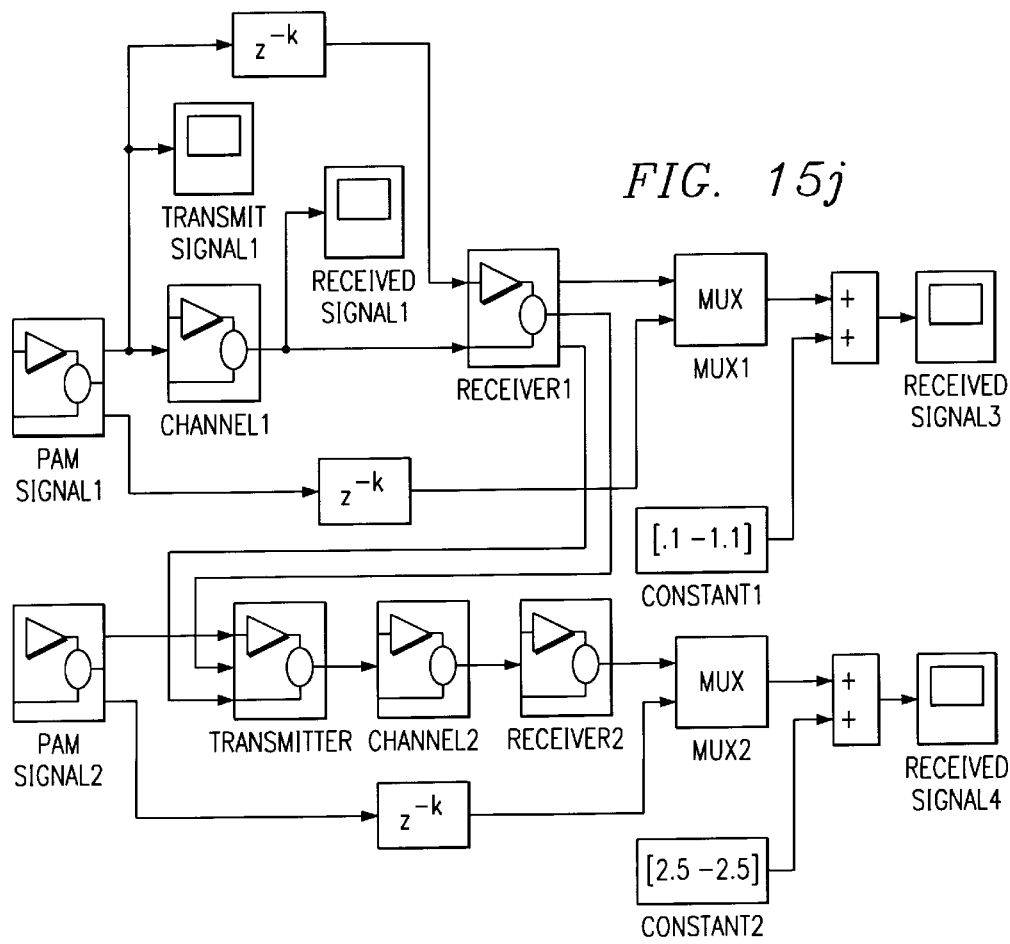
FIG. 15j shows a simulated direct equalization system method.
Figure 15K:
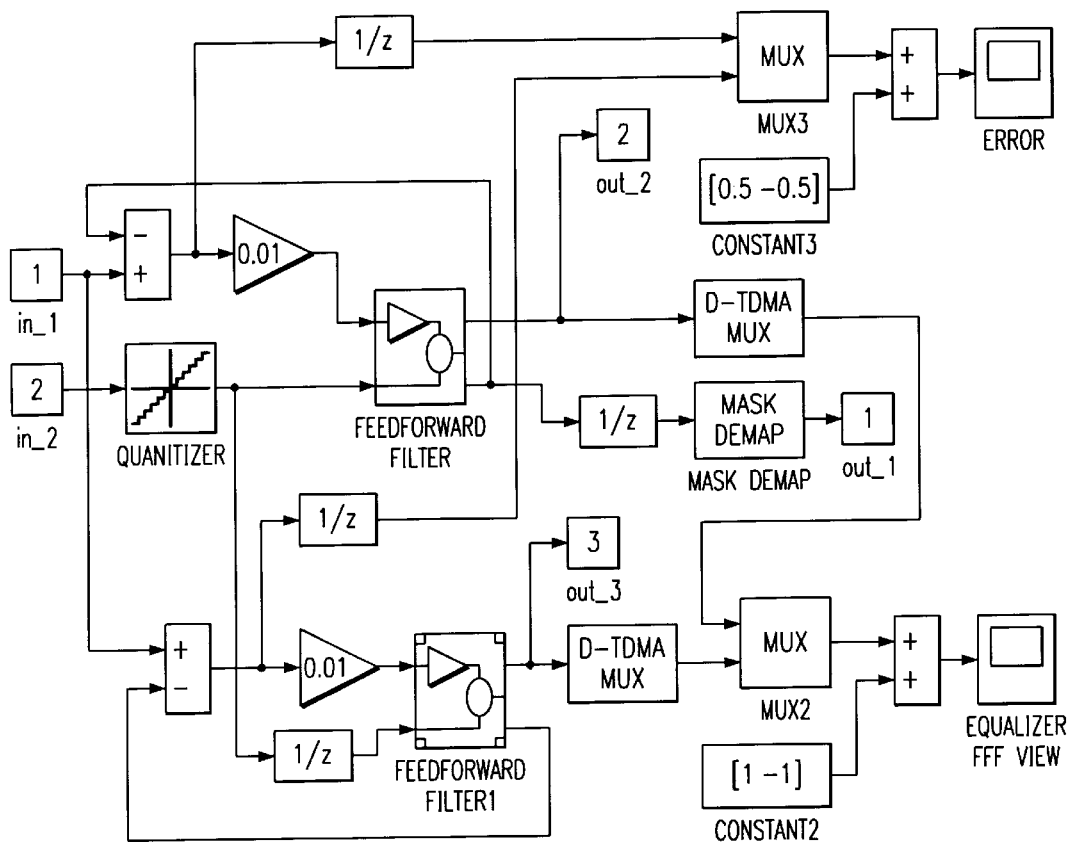
FIG. 15k shows an equalizer coefficient identification.
Figure 15L:
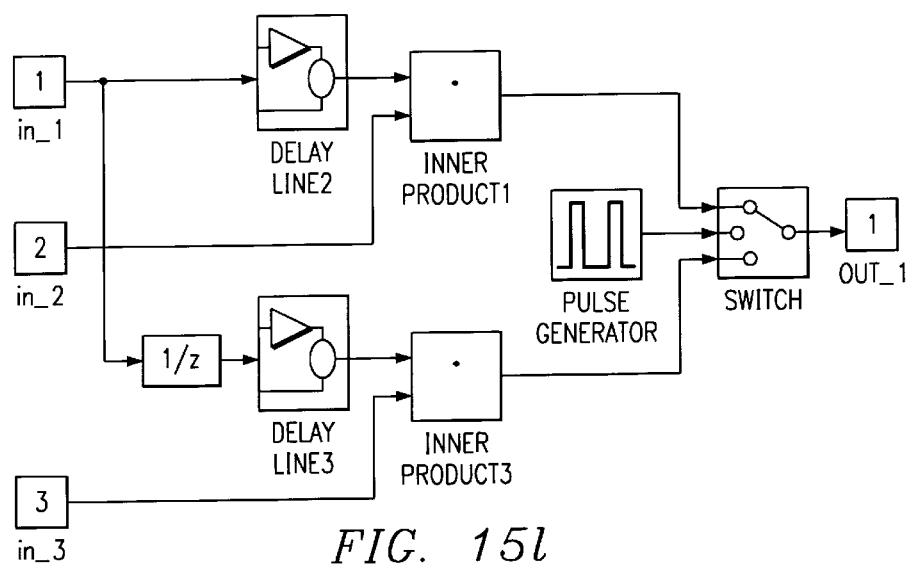
FIG. 15l shows an adaptive transmitter.

FIG. 15j shows a simulation system for the direct equalizer using PAM signals. In particular, the transmitted PAM signal is delayed ($z^{-k}$) and fed to receivers along with the through channel received signal. These receiver1 signals are used to control the transmitter for PAM signal2 to directly equalize; and this compensated signal through the channel at receiver2 is compared to the PAM signal2. FIG. 15k shows the interior of receiver1 of FIG. 15hj, and FIG. 15l shows the interior of the transmitter of FIG. 15j.

The following Terminology/Definitions has been used herein.

MDSL—Mid-band Digital Subscriber Line.
MDSL-C—The MDSL ruing on the Central Office site
MDSL-R—The MDSL running on the residential site
POTS—Plain Old Telephone Service. It only makes and receives phone calls.
NDIS—Network Device Interface Specification. A specification defined by Microsoft to provide a standard interface for network drivers to interact with each other and with Operating System.
NIC—Network Interface Card
WAN—Wide Area Networking
mini-port NIC driver—A network interface card driver developed as an extension to the NDIS 3.0 specification to allow developers to write only code that is specific to the hardware, merging the common concerns into the NDIS library or wrapper.

APPENDIX

@INPUT_DECLARATIONS:
STATIC Double I_clock;
STATIC Ovector I_real_in;
STATIC Double I_reset;
STATIC Double I_valid_in;
@OUTPUT_DECLARATIONS:
STATIC Ovector O_img_out;
STATIC Ovector O_real_out;
STATIC Double O_scaler;
STATIC Double O_valid_out;
@PARAMETER_DECLARATIONS:
{
STATIC Long P_fft_math;
}
@STATE_DECLARATIONS:
{
STATIC Long size ;

-continued

APPENDIX

```
STATIC Double *f_real ;
STATIC Double *f_img ;
STATIC short *i_real ;
STATIC short *i_img ;
STATIC long *l_real ;
STATIC long *l_img ;
STATIC Double *in_r ;
STATIC Double *out_i ;
STATIC Double *out_r ;
STATIC long flag ;
STATIC long clock ;
STATIC long ltemp ;
STATIC long lmax ;
STATIC int scale ;
STATIC int i ;
STATIC int j ;
STATIC int l ;
STATIC int max_bttr;
STATIC int j2 ;
STATIC int j11 ;
STATIC short temp ;
STATIC int k ;
STATIC double twopi ;
STATIC double tmp_real ;
STATIC double tmp_img ;
STATIC int doit ;
STATIC int Sine[256] ;
STATIC int Cosine[256] ;
STATIC FILE * file1 ;
STATIC int lmm ;
STATIC int lix ;
STATIC double scl;
STATIC int bttr;
STATIC int li ;
STATIC int power ;
STATIC int stage ;
STATIC double t1 ;
STATIC double t2 ;
STATIC double arg ;
STATIC double c ;
STATIC double s ;
STATIC int it1 ;
STATIC int it2 ;
STATIC int ic ;
STATIC int is ;
STATIC int arginc ;
STATIC int iarg ;
STATIC short tmp_r ;
STATIC short tmp_i ;
STATIC int itmp1re ;
STATIC int itmp1im ;
STATIC int itmp2re ;
STATIC int itmp2im ;
STATIC double pi ;
STATIC double c1 ;
STATIC double c2 ;
STATIC double wpr ;
STATIC double wpi ;
STATIC double wi ;
STATIC double wr ;
STATIC double wtmp ;
STATIC double tmp1re ;
STATIC double tmp1im ;
STATIC double tmp2re ;
STATIC double tmp2im ;
STATIC int length ;
STATIC int half ;
STATIC int halfpow ;
STATIC int DEBUG ;
STATIC long lt1 ;
STATIC long lt2 ;
STATIC long ls ;
STATIC long lc ;
STATIC long ltemp1 ;
STATIC long ltemp2 ;
STATIC long ltemp3 ;
STATIC long ltemp4 ;
```

-continued

APENDIX

```
STATIC long l_tmp_r ;
STATIC long l_tmp_i ;
STATIC long ltmp1re ;
STATIC long ltmp1im ;
STATIC long ltmp2re ;
STATIC long ltmp2im ;
STATIC double ftemp ;
}
@BLOCK_DECLARATIONS:
{
}
@INITIALIZATION_CODE:
{
DEBUG = 0 ;
    size = 512 ;
    power = 9 ;
    if(P_fft_math == 1)
        {
            f_real = (double *) malloc (size * sizeof(double)) ;
            f_img = (double *) malloc (size * sizeof(double)) ;
        }
        else
        {
            i_real = (short *) malloc (size * sizeof(short)) ;
            i_img = (short *) malloc (size * sizeof(short)) ;
            l_real = (long *) malloc (size * sizeof(long)) ;
            l_img = (long *) malloc (size * sizeof(long)) ;
        }
        twopi= 3.1415926536 * 2.0;
        pi = 3.1415926536 ;
        file1 = fopen("/home/mannerin/sincos1.txt","r") ;
        for(j=0 ; j <256 ; j++)
            {
                fscanf(file1, "%08x\n",&Cosine[j]) ;
            }
        for(j=0 ; j < 256 ; j++)
            {
                fscanf(file1, "%08x\n",&Sine [j]) ;
            }
        fclose(file1) ;
}
@RUN_OUT_CODE:
    {               /* start of run code */
        flag = 0 ;
        O_valid_out = 1.0;
        O_scaler = 0.0 ;
    @IF (I_clock == CONNECTED)
        clock = (long) I_clock ;
        flag |= (~clock & 1) ;
    @ENDIF
    @IF (I_valid_in == CONNECTED)
        flag | = (long) I_valid_in ;
    @ENDIF
    @IF (I_reset == CONNECTED)
        if(I_reset == 1.0)
            {
            }
    @ENDIF
    if(!flag)
        {   /* start of process input/output */
        /* read in input */
        in_r = (double *) OvGetStart(I_real_in) ;
        out_i = (double *) OvGetStart(O_img_out) ;
        out_r = (double *) OvGetStart(O_real_out) ;
        size = 512 ;
        power = 9 ;
    if(P_fft_math == 1)
    {    /*start of if floating */
/*
        for(i=0; i < size ; i++)
            { f_real[i]=in_r[i] ;
            }
*/
/******************************************************/
        length = 512 ;
        half = 256 ;
        halfpow = power - 1;
```

APPENDIX

```
            c1 = c2 = 0.5;
                for (i=0, j=0; i < half; i++, j += 2)
                {
                    f_real[i] = in_r[j] ;
                    f_img[i] = in_r[j + 1] ;
                }
                c2 = -c2;
    /* start of do floating fft */
/******************************************************************/
    size = 256 ;
    power = 8 ;
    max_bttr = size ;
    for (stage = 1; stage <= power; stage++) {
            lix = max_bttr;
            max_bttr /= 2;
            lmm = max_bttr;
            scl = ((double) (- twopi)/(double) lix);
            for(bttr = 1; bttr <= lmm; bttr++) {
                arg = (bttr - 1) * scl;
                c = cos (arg) ;
                s = sin (arg);
                for(li = lix; li <= size ; li += lix) {
                    j11 = li - lix + bttr - 1;
                    j2 = j11 + max_bttr;
                    t1 = f_real[j11] - f_real[j2] ;
                    t2 = f_img[j11] - f_img[j2] ;
                    f_real[j11] = f_real[j11] + f_real[j2] ;
                    f_img[j11] = f_img[j11] + f_img[2] ;
                    f_real[j2] = (c*t1 + s*t2);
                    f_img[j2] = (c*t2 - s*t1);
                }
            }
    }
    j = 0 ;
    for(i = 0; i < (size - 1); i++)}
        if(i < j) {
            tmp_real = f_real[j] ;
            tmp_img = f_img[j] ;
            f_real[j] = f_real[i] ;
            f_img[j] = f_img[i] ;
            f_real[i] = tmp_real;
            f_img[i] = tmp_img;
        }
        k = (size/2);
        while (k < (j + 1)) {j -= k; k/= 2; }
        j += k;
    }
/******************************************************************/
    /******************************************************************/
    /* Perform even/odd separation algorithm.         */
    /* Form an aray with N/2 + 1 elements.            */
    /******************************************************************
            arg = pi/half;
            wtmp = sin (0.5 * arg);
            wpr = - 2.0 * wtmp * wtmp;
            wpi = sin (arg);
            wr = 1.0 + wpr;
            wi = wpi;
            for (i = 1, j = (half - 1); i <= j; i++, j--)
            {
                tmp1re = (f_real[i] + f_real[j]) * c1;
                tmp1im = (f_img[i] - f_img[j]) * c1;
                tmp2re = (f_img[i] + f_img[j]) * -c2;
                tmp2im = (f_real[i] - f_real[j]) * c2;
                f_real[i] = (tmp1re + wr * tmp2re - wi * tmp2im);
                f_img[i] = (tmp1im + wr * tmp2im + wi * tmp2re);
                f_real[j] = (tmp1re - wr * tmp2re + wi * tmp2im);
                f_img[j] = (- tmp1im + wr * tmp2im + wi * tmp2re);
                wtmp = wr;
                wr += (wr * wpr - wi * wpi);
                wi += (wi * wpr + wtmp * wpi);
            }
    /******************************************************************/
    /* Compute the first pair of frequency cells,     */
    /* at the dc and the Nyquist point               */
    /******************************************************************/
            wr = f_real[0] ;
```

-continued

APPENDIX

```
                        f_real[0] = wr + f_img[0] ;
                        f_img[0] = f_img[0] - wr ;
/********************************************************************/
        for(i=0 ; i < size ; i++)
                {
                        out_r[i] = f_real[i] ;
                        out_i[i] = -f_img[i] ;
                }
} /* end of if floating */
/********************************************************************/
else
        if(P_fft_math == 2 )
{
                        /* start of int fft */
                length = 512 ;
                half = 256 ;
                halfpow = power - 1;
                        for (i = 0, j = 0; i < half; i++, j += 2)
                        {
                                l_real[i] = (long) (in_r[j] * 65536.0) ;
                                l_img[i] = (long) (in_r[j + 1] * 65536.0) ;
                        }
                lmax = 0 ;
                for (i = 0 ; i < half; i++)
                {
                        ltemp = l_real[i] ;
                        if(ltemp < 0) ltemp = -ltemp ;
                        if (ltemp > lmax) lmax = ltemp ;
                        ltemp = l_img[i] ;
                        if(ltemp < 0) ltemp = -ltemp ;
                        if (ltemp > lmax) lmax = ltemp ;
                }
                        scale = 0 ;
                        for(i=0;i <32 ; i++)
                                {
                                        lmax <<= 1 ;
                                        if (lmax < 0)
                                                break ;
                                        else
                                        scale++ ;
                                }
                                scale-- ;
                                scl = 1.0 ;
                        for(i=0 ; i < scale ; i++)
                                scl *= 2.0 ;
                lmax = 65536/(long)scl ;
                        for (i = 0 ; i < half; i++ )
                        {
                                i_real[i] = (short) (l_real[i]/lmax) ;
                                i_img[i] = (short) (l_img[i]/lmax) ;
                        }
                        /* do fft */
        size = 256 ;
        power = 8 ;
        arginc = 2 ;
        max_bttr = size ;
        scale = 0 ;
        for (stage = 1; stage <= power; stage++) {
        doit = 0 ;
        for(j= 0 ; j < size ; j++)
                { temp = (i_real[j] & (short) 0xc000) ;
                        if((temp != 0) && (temp != (short) 0xc000))
                                { doit = 1 ;break; }
                        temp = (i_img[j] & (short)0xc000 ) ;
                                if((temp != 0) && (temp != (short)0xc000))
                                { doit = 1 ;break; }
                }
        if(doit)
                {
                scale++ ;
                for(j=0 ; j < size ; j++)
                        { i_real[j]/= 2 ;
                        i_img[j]/= 2 ;
                }
        }
        for(j=0 ; j < size ; j++)
                {temp = (i_real[j] & (short) 0xe000) ;
```

APPENDIX
-continued

```
            if((temp != 0) && (temp != (short) 0xe000))
                    { doit = 1 ;break; }
            temp = (i_img[j] & (short)0xe000 );
            if (temp != 0) && (temp != (short)0xe000))
                    { doit = 1 ;break; }
        }
        if(doit)
            {
            scale++ ;
            for(j=0 ; j < size ; j++)
                    { i_real[j]/= 2 ;
                      i_img[j]/= 2 ;
                    }
            }
    }
    iarg = 0 ;
    lix = max_bttr;
    max_bttr/= 2;
    lmm = max_bttr;
    for(bttr = 1; bttr <= lmm; bttr++) {
            ic = (int) Cosine[iarg] ;
            is = (int) - Sine[iarg];
        iarg += arginc;
        for(li = lix; li <= size; li += lix) {
            j11 = li - lix + bttr - 1;
            j2 = j11 + max_bttr;
            it1 = i_real[j11] - i_real[j2] ;
            it2 = i_img[j11] - i_img[j2] ;
            i_real[j11] = i_real[j11] + i_real[j2] ;
            i_img[j11] = i_img[j11] + i_img[j2] ;
            i_real[j2] = (short) (((ic*it1) + (is*it2))/32768) ;
            i_img[j2] = (short) (((ic*it2) - (is*it1))/32768) ;
        }
        }
        arginc *= 2 ;
    }
    j = 0 ;
    for(i = 0; i < (size - 1); i++) {
        if(i < j) {
            tmp_r = i_real[j] ;
            tmp_i = i_img[j] ;
            i_real[j] = i_real[i] ;
            i_img[j] = i_img[i] ;
            i_real[i] = tmp_r ;
            i_img[i] = tmp_i ;
        }
        k = (size/2);
        while (k < (j + 1)) {j -= k; k/= 2;}
        j += k;
    }
/************************************************************/
/************************************************************/
/* Perform even/odd separation algorithm.        */
/* Form an array with N/2 + 1 elements.         */
/************************************************************/
            k = 1 ;
            for (i = 1, j = (half - 1); i <= j; i++, j--)
                {
    /*             wr => Costable[1 . . .] wi => Sintable[1 . . .] */
                is = Sine[k] ;
                ic = Cosine[k] ;
                itmp1re = (int)((i_real[i] + i_real[j]) >> 1) ;
                itmp1im = (int)((i_img[i] - i_img[j]) >> 1 ) ;
                itmp2re = (int)((i_img[i] - i_img[j]) >> 1)) ;
                itmp2im = (int) (-((i_real[i] - i_real[j]) >> 1)) ;
                i_real[i] = (short) (itmp1re + ((ic * itmp2re - is * itmp2im)/32768));
                i_img[i] = (short) (itmp1im + ((ic * itmp2im + is * itmp2re)/32768
));
                i_real[j] = (short) (itmp1re - ((ic * itmp2re - is * itmp2im)/32768));
                i_img[j] = (short) (-itmp1im + ((ic * itmp2im + is * itmp2re)/32768));
                k++ ;
            }
    /************************************************************/
    /* Compute the first pair of frequency cells,     */
    /* at the dc and the Nyquist point          */
    /************************************************************/
            is = i_real[0] ;
            i_real[0] = is + i_img[0] ;
```

-continued

APPENDIX

```
        i_img[0] = i_img[0] - is ;
/************************************************************/
    scl = 1.0 ;
        for(i=0 ; i < scale ; i++)
            scl *= 2.0 ;
        for(i=0 ; i < size ; i++)
            {
/*
            out_r[i] = (double) (i_real[i] << scale) ;
            out_i[i] = (double) (-i_img[i] << scale) ;
*/
            out_r[i] = (double) (i_real[i]) ;
            out_r[i] = (double) (-i_img[i]) ;
            out_r[i] *= ((scl * (float)lmax)/65536.0) ;
            out_i[i] *= ((scl * (float)lmax)/65536.0) ;
/*
            out_r[i] *= scl/(float)lmax ;
            out_i[i] *= scl/(float)lmax ; */
            }
} /* end of int fft */
O_valid_out = 0.0 ;
O_scaler = (double) scale ;
} /* end !flag */
}   /* end of run code */
@TERMINATION_CODE:
{
if(P_fft_math == 1)
    {
        free(i_real) ;
        free(f_img) ;
    }
    else
    {
        free(i_real) ;
        free(i_img) ;
        free(l_real) ;
        free(l_img) ;
    }
}
```

What is claimed is:

1. A data rate negotiation process for a pair of modems which comprises the steps of:

(a) providing a subscriber station having a first modem;

(b) providing a central station having a second modem;

(c) transmitting a signal from said first modem to said second modem requesting a first data transmission rate;

(d) transmitting a signal from said second modem to said first modem either accepting or rejecting said first data transmission rate;

(e) responsive to rejection of the requested first data transmission rate, repeatedly repeating steps (c) and (d) with a continually different requested transmission rate until said second modem accepts a said requested data transmission rate; and (f) then commencing non-rate negotiation communication between said first and second modems at the accepted negotiated rate; wherein rate adjustment is based upon a data rate table associated with each of said first and second modems indicating available data rates for respective modem, and further based upon at least one of line conditions between said first and second modems, backbone network accessibility, computational capabilities of the modems, and application requirements.

2. The process of claim 1 wherein the adjustment of the data rate comprises adjustment of the number of bits represented by each symbol.

3. The process of claim 1 wherein said subscriber station and said central station are each capable of communication at a plurality of data rates, said subscriber station and said central station being provided with additional hardware and at least one of said subscriber station and said central station being provided with software, at least one of said subscriber station and said central station adjusting request for a transmission rate to conform to the capabilities of additional hardware and software, if present.

4. The process of claim 2 wherein said subscriber station and said central station are each capable of communication at a plurality of data rates, said subscriber station and said central station being provided with additional hardware and at least one of said subscriber station and said central station being provided with software, at least one of said subscriber station and said central station adjusting request for a transmission rate to conform to the capabilities of additional hardware and software, if present.

* * * * *